United States Patent
Resconi et al.

(10) Patent No.: US 11,078,304 B2
(45) Date of Patent: Aug. 3, 2021

(54) PROCESS FOR PREPARING HETEROPHASIC PROPYLENE COPOLYMERS

(71) Applicant: BOREALIS AG, Vienna (AU)

(72) Inventors: Luigi Maria Cristoforo Resconi, Linz (AT); Wilfried Toltsch, Marchtrenk (AT); Ville Virkkunen, Porvoo (FI); Ismo Lehtiniemi, Porvoo (FI); Noureddine Ajellal, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/624,191

(22) PCT Filed: Jun. 14, 2018

(86) PCT No.: PCT/EP2018/065740
§ 371 (c)(1),
(2) Date: Dec. 18, 2019

(87) PCT Pub. No.: WO2019/007655
PCT Pub. Date: Jan. 10, 2019

(65) Prior Publication Data
US 2020/0131284 A1    Apr. 30, 2020

(30) Foreign Application Priority Data
Jul. 7, 2017 (EP) .................... 17180164

(51) Int. Cl.
| | |
|---|---|
| *C08F 4/64* | (2006.01) |
| *C08F 4/76* | (2006.01) |
| *C08L 23/16* | (2006.01) |
| *C08F 4/6592* | (2006.01) |
| *C08F 2/01* | (2006.01) |
| *C08F 2/34* | (2006.01) |
| *C08F 4/659* | (2006.01) |
| *C08F 210/06* | (2006.01) |

(52) U.S. Cl.
CPC .......... *C08F 4/65927* (2013.01); *C08F 2/01* (2013.01); *C08F 2/34* (2013.01); *C08F 4/65912* (2013.01); *C08F 210/06* (2013.01); *C08L 23/16* (2013.01); *C08L 2205/02* (2013.01); *C08L 2207/02* (2013.01)

(58) Field of Classification Search
CPC .. C08F 210/16; C08F 210/06; C08F 4/65927; C08L 23/16; C08L 2207/02
See application file for complete search history.

(56) References Cited

U.S. PATENT DOCUMENTS

| | | | | |
|---|---|---|---|---|
| 7,341,971 | B2 * | 3/2008 | Denifl ...................... | C08F 10/00 502/102 |
| 7,834,205 | B2 * | 11/2010 | Resconi .................. | C07F 17/00 |
| 8,729,206 | B2 * | 5/2014 | Resconi ................ | C08F 110/06 526/351 |
| 9,187,583 | B2 * | 11/2015 | Hafner .................... | C08L 23/12 |
| 9,701,772 | B2 * | 7/2017 | Resconi ................ | C08F 210/16 |
| 9,932,469 | B2 * | 4/2018 | Wang ......................... | C08J 5/18 |
| 10,053,568 | B2 * | 8/2018 | Wang ...................... | C08L 23/16 |
| 2010/0280166 | A1 | 11/2010 | Nenseth et al. | |
| 2015/0344596 | A1 * | 12/2015 | Resconi ................ | C08F 110/06 |
| 2016/0152810 | A1 * | 6/2016 | Resconi .................. | C08L 23/10 525/240 |
| 2019/0308995 | A1 * | 10/2019 | Ajellal .................... | C07C 45/68 |

FOREIGN PATENT DOCUMENTS

| | | |
|---|---|---|
| EP | 2383299 A1 | 11/2011 |
| JP | 2009533382 A | 9/2009 |
| JP | 2014525950 A | 10/2014 |
| JP | 2016524028 | 8/2016 |
| JP | 2017502163 A | 1/2017 |
| JP | 2017514926 A | 6/2017 |
| JP | 2019536779 A | 12/2019 |
| KR | 1020150103053 A | 9/2015 |
| KR | 20170073463 A | 6/2017 |
| WO | 02/02576 A1 | 1/2002 |
| WO | 2007/116034 A1 | 10/2007 |
| WO | 2010/052260 A1 | 5/2010 |
| WO | 2010/052263 A1 | 5/2010 |
| WO | 2010/052264 A1 | 5/2010 |
| WO | 2013/007650 A1 | 1/2013 |
| WO | 2014/096171 A1 | 6/2014 |
| WO | 2016/038211 A1 | 3/2016 |

OTHER PUBLICATIONS

Endres, et al., "Die fluorige Phase:Organische Chemie mit hochfluorierten Reagenzien and Losungsmitteln", 34 (6):382-393—Dec. 2000.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, 1128-1134.
H. N. Cheng, "I3C NMR Analysis of Ethylene-Propylene Rubbers", Macromolecules 1984, 17, 1950-1955.
Niifant'ev, et al., "5-Methoxy-Substituted Zirconium Bis-indenyl ansa—Complexes: Synthesis, Structure, and Catalytic Activity in the Polymerization and Copolymerization of Alkenes", vol. 31, No. 14, Jul. 23, 2012, pp. 4962-4970.
Kuklin, et al., "Quantitative structure-property relationships in propene polymerization by zirconocenes with arac-SiMe2[Ind]2based ligand framework", Chemical, vol. 412, Nov. 23, 2015 (Nov. 23, 2015).
Pierandrea Lo Nostro, "Phase Separation Properties of Fluorocarbons, Hydrocarbons and Their Copolymers", Aduances in Colloid and Interface Science, 56 (1995) 245-287.

(Continued)

*Primary Examiner* — Rip A Lee
(74) *Attorney, Agent, or Firm* — Tarolli, Sundheim, Covell & Tummino LLP

(57) ABSTRACT

Process for producing a heterophasic propylene copolymer using a specific class of metallocene complexes in a multi-stage polymerization process including a gas phase polymerization step. The invention further relates to the use of catalysts which comprise a specific class of metallocene complexes to produce a heterophasic propylene copolymer in a multistep process including a gas phase polymerization step.

14 Claims, No Drawings

(56) References Cited

OTHER PUBLICATIONS

Resconi, et al., "Selectivity in Propene Polymerization with Metallocene Catalysts", Chem. Rev. 2000, 100, 1253-1345.
Wang, et al., "Structural Analysis of Ethylene/Propylene Copolymers Synthesized with a Constrained Geometry Catalyst", Macromolecules 2000, 33, 1157-1162.
Zhou, et al., "A new decoupling method for accurate quantification of polyethylene copolymer composition and triad sequence distribution with 13C NMR", Journal of Magnetic Resonance 187 (2007) 225-233.
English Abstract for Endres, et al., "Die fluorige Phase: Organische Chemie mit hochfluorierten Reagenzien and Lösungsmitteln", 34(6):382-393—Dec. 2000.
Applicant: Borealis AG; "Process for Preparing Heterophasic Propylene Copolymers"; Korean Patent Application No. 10-2020-7002019; Office Action dated Feb. 19, 2021; 15 pgs.
Japanese Patent Application No. 2019-568190; Notice of Reasons for Rejection dated Jan. 12, 2021; 4 pgs.

\* cited by examiner

PROCESS FOR PREPARING HETEROPHASIC PROPYLENE COPOLYMERS

The present invention relates to a process for producing a heterophasic propylene copolymer using a specific class of metallocene complexes, preferably in a multistage polymerization process including a gas phase polymerization step.

The invention further relates to the use of catalysts which comprise a specific class of metallocene complexes to produce a heterophasic propylene copolymer, preferably in a multistep process including a gas phase polymerization step.

Metallocene catalysts have been used to manufacture polyolefins for many years. Countless academic and patent publications describe the use of these catalysts in olefin polymerization.

Metallocenes are now used industrially and polyethylenes and polypropylenes in particular are often produced using cyclopentadienyl based catalyst systems with different substitution patterns.

Metallocene catalysts are used in propylene polymerization in order to achieve some desired polymer properties.

However, there are some problems in using metallocene catalysts on industrial scale especially in multistage polymerization configurations.

Thus, there is room for improving the process and catalyst behaviour in the process.

Some multistage polymerizations utilise a slurry phase followed by a gas phase set up. One of the possible limitations of polymerization catalysts in general, and of metallocene-based catalysts in particular, is that when the catalyst has a high activity in slurry, e.g. bulk, the activity in gas phase is often low. This makes it difficult to achieve a low bulk-to-gas phase ratio of the produced material (the so-called bulk/GP split).

To be relevant for industrial polypropylene production, a metallocene catalyst must have good performance under all polymerization conditions, in particular in conditions, where polymerization temperature is at least 60° C., and in all actual polymerization reactors of the multistage process including both liquid (ideally bulk slurry) and gas phase reactors.

Especially in industrial production of heterophasic copolymers in a three stage polymerization a catalyst must have, inter alia, a long enough lifetime to have still acceptable activity in the third reactor, in which the rubber phase is produced. Here one problem is, that when the catalyst has a high activity in bulk and in the first gas phase (GPR1) reactors, the activity in the second gas phase reactor (GPR2) is often low, not allowing attainment of a high GPR2- to -bulk+GPR1 ratio of the produced material (the so-called rubber split). This means that strong (initial) activity in the bulk step can lead to faster catalyst deactivation, in turn leading to a poorly active catalyst in the second gas phase reactor.

Thus it is desired to find metallocenes, which provide high activity, especially in the case of copolymerization between propylene and α-olefins of 4 to 8 C atoms and/or ethylene to form propylene copolymers. The desired catalysts should also have improved performance in the production of high molecular weight polypropylene homopolymers and copolymers. Various prior art references aim for one or more of these features.

WO 02/02576 and WO 2014/096171 describe, inter alia, rac-Me$_2$Si[2-Me-4-(3,5-Me$_2$Ph)Ind]$_2$ZrCl$_2$ and its use in the manufacture of high Mw and high melting point polypropylene.

However, the metallocene catalysts of WO 02/025676, activated with MAO or a borate, are carried on a silica support. At polymerization temperatures of 60° C. or 70° C. they give iPP with Tm between 156° C. and 159° C. but at very poor catalyst activity.

The metallocene catalysts of WO 2014/096171 are produced with the Borealis Sirius catalyst technology, which enables the production of i-PP with higher Tm and at the same time higher activity compared to the metallocene catalysts of WO 02/025676.

WO 2007/116034 describes the use of the metallocenes rac-Me$_2$Si(2-Me-4-Ph-5-OMe-6-tBuInd)$_2$ZrCl$_2$ (I) and i.a. rac-Me$_2$Si(2-Me-4-(4-tert-butyl-Ph)-5-OMe-6-tBuInd)$_2$ZrCl$_2$ (II) for ethylene-propylene copolymerization in solution.

Molecular weights of the C$_2$C$_3$ copolymers produced with metallocene (I) range from iV 2.78 dL/g (C2=11.3 wt %) and iV 2.46 dL/g (C2=66.4 wt %) but have been obtained at higher comonomer concentration than in a gas phase reaction. No examples for gas phase polymerization have been shown, nor for the production of heterophasic copolymers.

WO 2016/038211 describes the use of metallocenes like rac-dimethylsilanediylbis[2-methyl-4-(4-tert-butylphenyl)-1,5,6,7-tetrahydro-s-indacen-1-yl] zirconium dichloride (A) or racemic dimethylsilylbis-(2-i-butyl-4-(4-tert-butylphenyl)-1,5,6,7-tetrahydro-s-indacen-1-yl)dichloro-zirconium (B), produced with the Borealis Sirius catalyst technology, for the preparation of heterophasic propylene copolymers. The molecular weight of the rubber produced with catalyst (A) varies between 2.7 and 2.0 dL/g, while the molecular weight of the rubber with catalyst (B) varies between 2.5 and 1.8 dL/g, depending on the ethylene content. Although these catalysts produce relatively high molecular weight rubber when the C2 content in the copolymer is below 30 wt %, their molecular weight capability (towards lower MFR) in propylene homopolymerization is limited.

Although a lot of work has been done in the field of metallocene catalysts, there still remain some problems, which relate mainly to the productivity or activity of the catalysts, in particular in multistage polymerization processes, since the productivity or activity has been found to be relatively low, especially when polymers of low melt index (MI) (i.e. high molecular weight, Mw) are produced. This problem is exacerbated when the target polymer is a heterophasic propylene copolymer comprising a matrix polymer and a propylene-ethylene copolymer rubber phase.

The inventors have identified a specific class of metallocene catalysts having improved polymerization behaviour, higher catalyst productivity, improved performance in the production of high molecular weight polypropylene homopolymers, and reduced chain transfer to ethylene, enabling the production of propylene-ethylene copolymers with high ethylene content at high Mw, thus being ideal for the production of high ethylene content heterophasic propylene/ethylene copolymers with increased molecular weight.

The catalysts used in this invention are not themselves new and other similar catalysts are known.

However, the use of the catalysts of the invention explicitly in a multistage polymerization process comprising at least one gas phase polymerization step for the production of the heterophasic propylene copolymers comprising a matrix polymer and a propylene-ethylene copolymer (i.e. ethylene-propylene rubber) with higher molecular weight (as measured by iV(EPR) is not known.

SUMMARY OF INVENTION

Thus, viewed from one aspect the invention provides a process for the preparation of a heterophasic propylene copolymer in the presence of a metallocene catalyst comprising (i) a complex of formula (I)

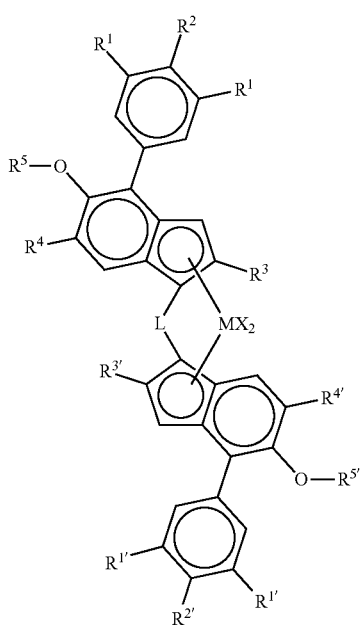

wherein
M is zirconium or hafnium;
each X independently is a sigma-donor ligand
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring;
$R^1$ and $R^{1'}$ are each independently hydrogen, $C_5$-$C_{10}$-aryl or a group —CH($R^x$)$_2$ wherein each $R^x$ is independently H or a $C_{1-10}$ hydrocarbyl group, and optionally the two $R^x$ taken together can form a ring,
$R^2$ and $R^{2'}$ are each independently hydrogen, $C_5$-$C_{10}$-aryl or a group —C($R^y$)$_3$ wherein each $R^y$ is independently H or a $C_{1-10}$ hydrocarbyl group, or optionally two or three $R^y$ groups taken together can form a ring
whereby at least one of $R^1$ or $R^2$ and one of $R^{1'}$ or $R^{2'}$ is different from hydrogen and whereby $R^2$ together with one of $R^1$, as well as $R^{2'}$ together with one of $R^{1'}$ can be part of a further mono- or multicyclic ring condensed to the phenyl ring
$R^3$ and $R^{3'}$ are each independently a linear $C_1$ to $C_6$ hydrocarbyl group or a branched or cyclic $C_4$ to $C_{10}$ hydrocarbyl group, whereby the groups are not branched in α-position
$R^4$ and $R^{4'}$ are each independently a tertiary $C_4$ to $C_{10}$ hydrocarbyl group
$R^5$ and $R^{5'}$ are each independently a linear or branched $C_1$ to $C_{10}$ alkyl group or an $C_5$-$C_{10}$-aryl group and
(ii) a cocatalyst comprising a compound of a group 13 metal.

The catalysts according to the invention are especially suitable in a multistage process comprising at least two reactors connected in series including at least one gas phase polymerization step.

The catalyst of the invention can be used in non-supported form or in solid form. The catalyst of the invention may be used as a homogeneous catalyst or heterogeneous catalyst.

The catalyst of the invention in solid form, preferably in solid particulate form can be either supported on an external carrier material, like silica or alumina, or, in a particularly preferred embodiment, is free from an external carrier, however still being in solid form. For example, the solid catalyst is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

Viewed from another aspect the invention provides the use in olefin polymerization of a catalyst as hereinbefore defined, for the formation of a heterophasic propylene copolymer comprising a matrix polypropylene homo- or copolymer and an elastomeric propylene copolymer (E) dispersed in said matrix (M),
wherein the elastomeric propylene copolymer (E) has
(i) an intrinsic viscosity (iV) determined according to DIN ISO 1628/1 (in decalin at 135° C.) in the range of from 3.1 to 8.0 dl/g,
(ii) an ethylene comonomer content in the range of from 10.0 to 80.0 wt %,
(iii) optionally a second comonomer selected from 1-butene in an amount of from 0.0 up to 20.0 wt % or 1-hexene in an amount of from 0.0 up to 10.0 wt % and
(iv) a xylene soluble (XS) fraction (determined according to ISO 16152 at 25° C.) of at least 50.0 wt % and
wherein the xylene soluble (XS) fraction (determined according to ISO 16152 at 25° C.) of the heterophasic propylene copolymer is in the range of from 5.0 to 50.0 wt %.

By using the catalysts of the present invention, a very high activity can be obtained e.g. in a multistage polymerization process, especially in the gas phase polymerization step and even in the second gas phase polymerization step, if present, much higher than the activity of the similar catalysts with a different substitution pattern. The advantage of having high activity in the first and in an optional second gas phase is not only in the higher overall productivity of the process, but also in the achievable range of polymer properties: for example a higher gas phase split enables the production of polypropylenes with broader molecular weight distribution. In the context of a heterophasic propylene copolymer, the control of the gas phase split allows manipulation of the xylene soluble content of the polymer, that is, its physical and mechanical properties.

DETAILED DESCRIPTION OF THE INVENTION

The complexes and hence catalysts of the invention are based on formula (I) as hereinbefore defined which, inter alia, combines the use of the indenyl ring structure with non-H substituents at the 2, 4, 5 and 6-positions.

The complexes of the invention can be asymmetrical or symmetrical. Asymmetrical means simply that the two indenyl ligands forming the metallocene are different, that is, each indenyl ligand bears a set of substituents that are either chemically different, or located in different positions with respect to the other indenyl ligand. Symmetrical complexes are based on two identical indenyl ligands.

Preferably the complexes used according to the invention are symmetrical.

The complexes of the invention are chiral, racemic bridged bisindenyl metallocenes. The metallocenes of the invention are either $C_2$-symmetric or $C_1$-symmetric. When they are $C_1$-symmetric they still maintain a pseudo-$C_2$-symmetry since they maintain $C_2$-symmetry in close proximity of the metal center, although not at the ligand periphery. By nature of their chemistry, both a meso form and a racemic enantiomer pair (in case of $C_2$-symmetric complexes) or anti and syn enantiomer pairs (in case of $C_1$-symmetric complexes) are formed during the synthesis of the complexes. For the purpose of this invention, racemic or racemic-anti means that the two indenyl ligands are oriented in opposite directions with respect to the cyclopentadienyl-metal-cyclopentadienyl plane, while meso or racemic-syn means that the two indenyl ligands are oriented in the same direction with respect to the cyclopentadienyl-metal-cyclopentadienyl plane, as shown in the Formulas A and B below.

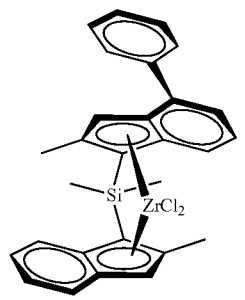

Racemic Anti (A)

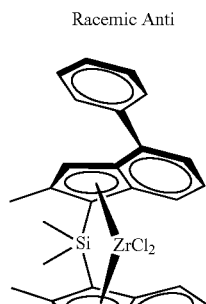

Racemic Syn (B)

Formula (I) is intended to cover all these configurations.

It is preferred, if the metallocenes of the invention are employed as the racemic or racemic-anti isomers. Ideally therefore at least 95.0 mol %, such as at least 98.0 mol %, especially at least 99.0 mol % of the metallocene is in the racemic or racemic-anti isomeric form.

In the catalysts of the invention the following preferences apply:

M is zirconium or hafnium, preferably zirconium.

In the definitions below the term hydrocarbyl group includes alkyl groups, alkenyl groups, alkynyl groups, cycloalkyl groups, cycloalkenyl groups, aryl groups, alkylaryl groups or arylalkyl groups or of course mixtures of these groups such as cycloalkyl substituted by alkyl.

Each X independently is a sigma-donor ligand.

Thus each X may be the same or different, and is preferably a hydrogen atom, a halogen atom, a linear or branched, cyclic or acyclic $C_{1-20}$-alkyl or -alkoxy group, a $C_{6-20}$-aryl group, a $C_{7-20}$-alkylaryl group or a $C_{7-20}$-arylalkyl group; optionally containing optionally containing one or more heteroatoms of Group 14-16 of the periodic table.

The term halogen includes fluoro, chloro, bromo and iodo groups, preferably chloro groups.

The term heteroatoms belonging to groups 14-16 of the periodic table includes for example Si, N, O or S.

More preferably each X is independently a hydrogen atom, a halogen atom, a linear or branched $C_{1-6}$-alkyl or $C_{1-6}$-alkoxy group, a phenyl or benzyl group.

Yet more preferably each X is independently a halogen atom, a linear or branched $C_{1-4}$-alkyl or $C_{1-4}$-alkoxy group, a phenyl or benzyl group.

Most preferably each X is independently chlorine, benzyl or a methyl group.

Preferably both X groups are the same.

The most preferred options for both X groups are two chlorides, two methyl or two benzyl groups.

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, and optionally two R' groups taken together can form a ring.

The term heteroatoms belonging to groups 14-16 of the periodic table includes for example Si, N, O or S.

Preferably L is dimethylsilyl, methylcyclohexylsilyl (i.e. Me-Si-cyclohexyl), ethylene or methylene.

$R^1$ and $R^{1'}$ are each independently hydrogen, $C_5$-$C_{10}$-aryl or a group —CH(R$^x$)$_2$ wherein each R$^x$ is independently H or a $C_{1-10}$ hydrocarbyl group, and optionally the two R$^x$ taken together can form a ring.

$R^2$ and $R^{2'}$ are each independently hydrogen, $C_5$-$C_{10}$-aryl or a group —C(R$^y$)$_3$ wherein each R$^y$ is independently H or a $C_{1-10}$ hydrocarbyl group, or optionally two or three R$^y$ groups taken together can form a ring.

At least one of $R^1$ or $R^2$ and one of $R^{1'}$ or $R^{2'}$ is different from hydrogen. This means that the phenyl-groups in position 4 of both indenyl ligands are substituted by at least one substitutent different from hydrogen.

The phenyl-groups in position 4 of both indenyl ligands can therefore be substituted by one, two or three substitutents different from hydrogen.

In another embodiments $R^2$ together with one of $R^1$, as well as $R^{2'}$ together with one of $R^{1'}$ can be part of a further mono- or multicyclic ring condensed to the phenylring. The new ring is preferably 5 or 6 membered or the groups preferably form two new rings such as one further five membered and six membered ring.

The new ring or rings can be aliphatic or aromatic.

In this way groups such as 2-naphthyl, 5- or 6-(indanyl), 5- or 6-(1,1-dialkyl-1H-indenyl), 6-(1,2,3,4-tetrahydronaphthyl), 6-(1,1,4,4-tetramethyl-1,2,3,4-tetrahydronaphthyl), 5- or 6-(N-alkyl-indolyl), 5- or 6-(N-alkylindolinyl), 2- or 3-(N-alkylcarbazolyl), 5- or 6-benzothiophenyl can be formed.

Preferably $R^1$ and $R^{1'}$ are the same and are either hydrogen or group —CH(R)$_2$ wherein each R$^x$ is independently either H or a $C_{1-3}$ hydrocarbyl group.

More preferably $R^1$ and $R^{1'}$ are either hydrogen or a group —CH(R)$_2$ wherein each R$^x$ is H, i.e. the group being methyl.

Preferably R² and R²' are also the same and are either hydrogen or group —C(R^y)₃ wherein each R^y is either H or a $C_{1-3}$ hydrocarbyl group.

More preferably R² and R²' are either hydrogen or a group —C(R^y)₃ wherein each R^y is a $C_1$-alkyl group, i.e. the group being a tert-butyl group.

It is especially preferred that in the complex of the formula (I) either R¹ and R¹' or R² and R²' are hydrogen.

In this case the phenyl-groups in position 4 of both indenyl ligands are both substituted either in position 4' of the phenyl groups or in position 3' and 5' of the phenyl groups.

It is within the scope of the invention for the two 4-phenyl groups to be different (e.g. 3,5-dimethylphenyl on one indene and 3,5-di-ethylphenyl on the other) or the same.

Alternatively, the two 3,5-substituents on each 4-phenyl group can be different (e.g. 3-methyl-5-propyl) or the same.

It is preferred if the two 3,5-substituents on each phenyl group are the same. It is preferred if the two 4-position phenyl groups are the same. More preferably the 4-phenyl groups are the same on both ligands and that both 3,5-substituents are the same.

Even more preferred is that the phenyl-groups in position 4 of the indenyl ligands are either both a 3,5-dimethylphenyl (3,5-Me₂Ph) group or both are a 4-tert-butyl-phenyl (4-tBu-Ph) group.

R³ and R³' are each independently a linear $C_1$ to $C_6$ hydrocarbyl group or a branched or cyclic $C_4$ to $C_{10}$ hydrocarbyl group, whereby the groups are not branched in α-position.

Suitable examples for linear $C_1$ to $C_6$ hydrocarbyl are alkyl groups like methyl, ethyl, n-propyl, n-butyl, n-propyl and n-hexyl.

Suitable examples for branched or cyclic $C_4$ to $C_{10}$ hydrocarbyl groups, which are not branched in α-position are benzyl, iso-butyl, isopentyl, isohexyl, 2-(cyclohexylmethyl), etc.

Preferably R³ and R³' are a linear $C_1$ to $C_4$ alkyl group, more preferably a $C_1$ to $C_2$ alkyl group and even more preferably a methyl group.

R³ and R³' may be the same or different, preferably they are the same.

R⁴ and R⁴' are each independently a tertiary $C_4$ to $C_{10}$ hydrocarbyl group.

Suitable examples for tertiary $C_4$ to $C_{10}$ hydrocarbyl groups are tert-butyl, 1-adamantyl, 1,1-dimethylbenzyl, etc.

Preferably R⁴ and R⁴' are a tertiary $C_4$ to $C_6$ alkyl group, more preferably a tert-butyl.

R⁴ and R⁴' may be the same or different, preferably they are the same.

R⁵ and R⁵' are each independently a linear or branched $C_1$ to $C_{10}$ alkyl group or an $C_5$-$C_{10}$-aryl group.

Preferably R⁵ and R⁵' are each independently a linear or branched $C_1$ to $C_6$ alkyl group or a phenylgroup and more preferably a linear $C_1$ to $C_4$ alkyl group.

Even more preferably R⁵ and R⁵' are the same and most preferably R⁵ and R⁵' are both methyl.

Particular compounds of the invention include:
rac-Me₂Si(2-Me-4-(3,5-Me₂Ph)-5-OMe-6-tBu-Ind)₂ZrCl₂ and
rac-Me₂Si(2-Me-4-(4-tBu-Ph)-5-OMe-6-tBu-Ind)₂ZrCl₂

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

Synthesis

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780 and WO2015/158790. The examples section also provides the skilled person with sufficient direction.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention.

The olefin polymerization catalyst system of the invention comprises (i) a complex in which the metal ion is coordinated by a ligand of the invention; and normally (ii) a cocatalyst comprising a compound of a group 13 metal, like an aluminium alkyl compound (or other appropriate cocatalyst), or the reaction product thereof. Thus the cocatalyst is preferably an alumoxane, like MAO or an alumoxane other than MAO.

Borate cocatalysts can also be employed, especially when supported or anchored on an inorganic or organic carrier. It will be appreciated by the skilled man that where boron based cocatalysts are employed, it is normal to pre-alkylate the complex by reaction thereof with an aluminium alkyl compound, such as TIBA. This procedure is well known and any suitable aluminium alkyl, e.g. $Al(C_{1-6}\text{-alkyl})_3$. can be used. Alternatively, when a borate cocatalyst is used, the metallocene complex is in its alkylated version, that is for example a dimethyl or dibenzyl metallocene can be used.

Boron based cocatalysts of interest include those of formula (II)

BY₃ (II)

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, iso-propyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl) phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris (3,4,5-trifluorophenyl) borane.

Particular preference is given to tris(pentafluorophenyl) borane.

However it is preferred that borates are used, i.e. compounds containing a borate 3+ ion. Such ionic cocatalysts preferably contain a non-coordinating anion such as tetrakis (pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include: triethylammoniumtetra(phenyl)borate, tributylammoniumtetra(phenyl)borate, trimethylammoniumtetra(tolyl)borate, tributylammoniumtetra(tolyl)borate, tributylammoniumtetra(pentafluorophenyl)borate, tripropylammoniumtetra(dimethylphenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl)borate, N,N-dimethylaniliniumtetra(phenyl)borate, N,N-diethylaniliniumtetra(phenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakist(pentafluorophenyl)borate, triphenylphosphoniumtetrakis(phenyl)borate, triethylphosphoniumtetrakis(phenyl)borate, diphenylphosphoniumtetrakis(phenyl)borate, tri(methylphenyl)phosphoniumtetrakis(phenyl)borate, tri(dimethylphenyl)phosphoniumtetrakis(phenyl)borate, triphenylcarbeniumtetrakis(pentafluorophenyl)borate, or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

Suitable amounts of cocatalyst will be well known to the skilled man.

It is also possible to use a mixture of Al based and B based cocatalysts.

The aluminoxane cocatalyst can be one of formula (III):

(III)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_{3-10}$-cycloalkyl, $C_7$-$C_{12}$-arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (III).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

The molar ratio of Al in the aluminoxane to the metal ion of the metallocene may be in the range 1:1 to 2000:1 mol/mol, preferably 10:1 to 1000:1, and more preferably 50:1 to 700:1 mol/mol.

In one embodiment the metal ion of the metallocene is Zr and the ratio of Al/Zr is preferably from 150 up to 1000 mol/mol, more preferably from 300 up to 800 mol/mol and even more preferably from 400 up to 600 mol/mol.

In an alternative embodiment, the metallocene (when X differs from alkyl or hydrogen) is prereacted with an aluminum alkyl, in a ratio metal/aluminum of from 1:1 up to 1:500, preferably from 1:1 up to 1:250, and then combined with a solution of the borane or borate cocatalyst dissolved in an aromatic solvent, either in a separate vessel or directly into the polymerization reactor. Preferred metal/boron ratios are between 1:1 and 1:100, more preferably 1:1 to 1:10.

Catalyst Manufacture

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856 (Mobil), WO95/12622 (Borealis) and WO2006/097497. The particle size is not critical but is preferably in the range 5 to 200 µm, more preferably 20 to 80 µm. The use of these supports is routine in the art.

In an alternative embodiment, no support is used at all. Such a catalyst can be prepared in solution, for example in an aromatic solvent like toluene, by contacting the metallocene (as a solid or as a solution) with the cocatalyst, for example methylaluminoxane previously dissolved in an aromatic solvent, or can be prepared by sequentially adding the dissolved catalyst components to the polymerization medium.

In one particularly preferred embodiment, no external carrier is used but the catalyst is still presented in solid particulate form. Thus, no external support material, such as inert organic or inorganic carrier, for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component(s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with a uniform particle size distribution can be obtained.

The process is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component(s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component(s). Said solvent is chosen so that it dissolves said catalyst component(s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e. g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerized in a "prepolymerization" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. $C_3$-$C_{30}$, such as $C_4$-$C_{10}$. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr.6, and of Pierandrea Lo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultrasonic wave, or by using a so called phase change method for preparing the emulsion by first forming a homogeneous system which is then transferred by changing the temperature of the system to a biphasic system so that droplets will be formed. The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, NH2, NR"2. —COOH, —COONH2, oxides of alkenes, —CR"=CH2, where R" is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, NH2, NR"2. —COOH, —COONH2, oxides of alkenes, —CR"=CH2, where R" is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. MAO and/or an aluminium alkyl compound and/or a transition metal compound).

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e. g. the surfactant solution first) to the immiscible solvent, or be combined together before the dispersing step.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences are typically of e.g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e.g. be subjected to an immediate (within milliseconds to few seconds) temperature change in order to achieve an instant solidification of the component(s) within the droplets. The appropriate temperature change, i. e. an increase or a decrease in the temperature of an emulsion system, required for the desired solidification rate of the components cannot be limited to any specific range, but naturally depends on the emulsion system, i. a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e. g. as stated above, whereby said temperature change of the emulsion system is sufficient to cause the rapid solidification of the droplets. The receiving medium can be gaseous, e. g. air, or a liquid, preferably a solvent, or a mixture of two or more solvents, wherein the catalyst component(s) is (are) immiscible and which is inert in relation to the catalyst component(s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e. g. perfluorinated hydrocarbon.

Alternatively, the temperature difference may be effected by gradual heating of the emulsion system, e.g. up to 10° C. per minute, preferably 0.5 to 6° C. per minute and more preferably in 1 to 5° C. per minute.

In case a melt of e.g. a hydrocarbon solvent is used for forming the dispersed phase, the solidification of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. organic solvents with fluorous solvents can be found from the literature and be chosen accordingly by a skilled person. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e.g. if the amount of the monomer used for the prepolymerization is relatively large.

The solid catalyst particles recovered can be used, after an optional washing step, in a polymerization process of an olefin. Alternatively, the separated and optionally washed solid particles can be dried to remove any solvent present in the particles before use in the polymerization step. The separation and optional washing steps can be effected in a known manner, e.g. by filtration and subsequent washing of the solids with a suitable solvent.

The droplet shape of the particles may be substantially maintained. The formed particles may have an average size range of 1 to 500 µm, e.g. 5 to 500 µm, advantageously 5 to 200 µm or 10 to 150 µm. Even an average size range of 5 to 60 µm is possible. The size may be chosen depending on the polymerization the catalyst is used for. Advantageously, the particles are essentially spherical in shape, they have a low porosity and a low surface area. The formation of solution can be effected at a temperature of 0-100° C., e.g. at 20-80° C. The dispersion step may be effected at −20° C.–100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 100° C., preferably at about 75 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerization process.

All or part of the preparation steps can be done in a continuous manner. Reference is made to WO2006/069733 describing principles of such a continuous or semicontinuous preparation methods of the solid catalyst types, prepared via emulsion/solidification method.

Catalyst Prepolymerization ("Off-Line Prepolymerization")

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process prepolymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Preferable embodiments of this aspect of the invention are described herein.

As monomers in the catalyst prepolymerization step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene.

The catalyst prepolymerization may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0 to 140° C., preferably 30 to 120° C., like 50 to 110° C.

Where the catalyst prepolymerization is done in fluorinated hydrocarbons, the temperature for the prepolymerization step is below 70° C., e.g. in the range of −30 to 70° C., preferably 0-65° C. and more preferably in the range 20 to 55° C. Pressure within the prepolymerization vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerization vessel is preferably kept in an inert atmosphere, such as under nitrogen or argon or similar atmosphere. Prepolymerization is continued until the prepolymerization degree (DP) defined as weight of polymer matrix/weight of solid catalyst before prepolymerization step is reached. The degree is below 25, preferably 0.5 to 10.0, more preferably 1.0 to 8.0, most preferably 2.0 to 6.0.

Use of the catalyst prepolymerization step offers the advantage of minimising leaching of catalyst components and thus local overheating.

After prepolymerization, the catalyst can be isolated and stored.

The metallocene catalysts used according to the present invention possess excellent catalyst activity and good comonomer response. The catalysts are also able to provide heterophasic propylene polymers of high weight average molecular weight Mw.

Moreover, the random copolymerization behaviour of metallocene catalysts used according to the invention shows a reduced tendency of chain transfer to ethylene. Polymers obtained with the metallocenes of the invention have normal particle morphologies.

In general therefore the invention catalysts can provide:
high activity in bulk propylene polymerization;
very high molecular weight capability;
improved comonomer incorporation in propylene copolymers;
good polymer morphology.

Polymerization

The present invention relates to a process for producing a heterophasic propylene copolymer using the specific class of metallocene complexes, as defined before.

Polymerization in the process of the invention preferably may be effected in at least two or more, e.g. 2, 3 or 4, polymerization reactors of which at least one reactor is a gas phase reactor. The process may also involve a prepolymerization step. This prepolymerization step is a conventional step used routinely in polymer synthesis and is to be distinguished from the catalyst prepolymerization step discussed above.

Preferably, the process of the invention employs two or three, more preferably three main reactors, provided that at least one reactor is a gas phase reactor. Ideally the process of the invention employs a first reactor operating in bulk and a second and third reactors being gas phase reactors. The process may also utilise a prepolymerization step. Bulk reactions may take place in a loop reactor.

The inventive process of the invention is ideally suited for the preparation of a heterophasic propylene copolymer, which will be defined below in more detail. In that polymer, a homopolymer or random copolymer matrix (M) is combined with a copolymeric amorphous fraction, i.e elastomeric propylene-ethylene copolymer (E), to form the heterophasic copolymer of the invention.

According to the present invention the elastomeric propylene-ethylene copolymer (E) is formed in a gas phase reactor.

Where two gas phase reactors are employed, a first gas phase reactor may produce a homopolymer or copolymer component, ideally a homopolymer component, whereby this polymer component from such a first gas phase reactor forms part of the matrix (M) of the polymer.

For bulk and gas phase copolymerization reactions, the reaction temperature used will generally be in the range 60 to 115° C. (e.g. 70 to 90° C.), the reactor pressure will generally be in the range 10 to 25 bar for gas phase reactions with bulk polymerization operating at slightly higher pressures. The residence time will generally be 0.25 to 8 hours (e.g. 0.5 to 4 hours). The gas used will be the monomer optionally as mixture with a non-reactive gas such as nitrogen or propane. It is a particular feature of the invention that polymerization takes place at temperatures of at least 60° C.

Generally the quantity of catalyst used will depend upon the nature of the catalyst, the reactor types and conditions and the properties desired for the polymer product. As is well known in the art hydrogen can be used for controlling the molecular weight of the polymer.

Splits between the various reactors can vary. When two reactors are used, splits are generally in the range of 30 to 70 wt % to 70 to 30 wt % bulk to gas phase, preferably 40 to 60 to 60 to 40 wt %. Where three reactors are used, it is preferred that each reactor preferably produces at least 20 wt % of the polymer, such as at least 25 wt %. The sum of the polymer produced in gas phase reactors should preferably exceed the amount produced in bulk. Values might be 30 to 45 wt % in bulk and 70 to 55 wt % in gas phase reactors.

In one embodiment of the present invention the process comprises the following steps:
(A) polymerizing propylene and optionally ethylene in at least a first reactor and optionally a second reactor to form a propylene homopolymer component or propylene-ethylene random copolymer component, said homopolymer or copolymer component forming the matrix (M) and
(B) polymerizing propylene and ethylene in a gas phase reactor in the presence of the polymer prepared in step (A) so as to form a elastomeric propylene-ethylene copolymer component (E).

Preferably the process of the present invention comprises steps (a) to (e), whereby
(a) in a first reactor propylene and optionally ethylene are polymerized obtaining a first propylene homo- or copolymer fraction (R-PP1),
(b) transferring said first propylene homo- or copolymer fraction (R-PP1) in a second reactor,
(c) polymerizing in said second reactor in the presence of the first propylene homo- or copolymer fraction (R-PP1) propylene and optionally ethylene obtaining a second propylene homo- or copolymer fraction (R-PP2), said first propylene homo- or copolymer fraction (R-PP1) and said second propylene homo- or copolymer fraction (R-PP2) form the matrix (M),
(d) transferring said matrix (M) into a third reactor, said third reactor being a gas phase reactor,
(e) polymerizing in said third reactor in the presence of the matrix (M) propylene and ethylene obtaining an elastomeric propylene copolymer (E), said matrix (M) and said elastomeric propylene copolymer (E) form the heterophasic propylene copolymer.

Polymer

The invention relates to a process for preparation of a heterophasic propylene copolymer.

Such heterophasic propylene copolymers (HECOs or RAHECOs) comprise a matrix (M) being either a propylene homopolymer (HECOs) or a random propylene copolymer (RAHECOs) in which an elastomeric copolymer, like an elastomeric propylene copolymer (E), is dispersed (rubber phase).

Thus the polypropylene matrix (M) contains (finely) dispersed inclusions being not part of the matrix and said inclusions contain the elastomeric copolymer (E). The term "inclusion" according indicates that the matrix and the inclusion form different phases within the heterophasic system, said inclusions are for instance visible by high resolution microscopy, like electron microscopy or atomic force microscopy, or can be identified by dynamic mechanical thermal analysis (DMTA).

Specifically in DMTA the presence of a multiphase structure can be identified by the presence of at least two distinct glass transition temperatures.

Thus the heterophasic polypropylene copolymer, which is produced with the process according to the invention, comprises at least (a1) a matrix (M) being a polypropylene homo- or copolymer and (a2) and elastomeric copolymer (E) dispersed in said matrix (M).

The term "heterophasic polypropylene copolymer" used herein denotes copolymers consisting of a matrix resin, being a polypropylene homo- or copolymer and an elastomeric, i.e. predominantly amorphous copolymer (E) dispersed in said matrix resin, as defined in more detail below.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene polymer is present in such an amount that it forms a continuous phase which can act as a matrix.

Furthermore the terms "elastomeric copolymer", "dispersed phase", "predominantly amorphous copolymer" and "rubber phase" denote the same, i.e. are interchangeable in the present invention.

Ad Component (a1 (i.e. the Matrix)):

Component (a1) of the particular heterophasic polypropylene copolymer is a propylene homopolymer or copolymer, e.g. a propylene-ethylene copolymer, propylene-butene copolymer or propylene-hexene copolymer, forming the matrix (M) of the heterophasic polypropylene copolymer.

The ethylene content in the propylene-ethylene copolymer can be greater than 0.0 wt % up to 7.0 wt %, preferably the ethylene content is low, i.e. 2.0 wt % or less, ideally 1.5 wt % or less.

Even more preferably there is less than 1.0 wt % ethylene in the matrix component.

If the comonomer is 1-butene or 1-hexene, the amount of comonomer can be greater than 0.0 wt % up to 10.0 wt %, Preferably the amount of 1-butene or 1-hexene is less than 7.0 wt %, more preferably less than 5.0 wt %

The preferred comonomer for the propylene copolymer is ethylene.

The propylene homo- or copolymer matrix has a melt flow rate $MFR_2$ (ISO 1133; 230° C.; 2.16 kg) in the range of 0.5 to 200.0 g/10 min, preferably in the range of 1.0 to 100.0 g/10 min more preferably in the range of 1.5 to 50.0 g/10 min and even more preferably 2.0 to 20.0 g/10 min.

The $MFR_2$ of the matrix is named matrix melt flow rate ($MFR_M$).

The propylene homo- or copolymer matrix furthermore has a xylene soluble (XS) fraction (determined according to ISO 16152 at 25° C.) of below 2.0 wt %, preferably below 1.0 wt %.

Moreover it is preferred that the propylene homo- or copolymer matrix has an intrinsic viscosity (iV) determined according to DIN ISO 1628/1 (in decaline at 135° C.) in the range of from 0.5 to 4.0 dl/g, preferably in the range of from 1.0 to 4.0 dl/g and more preferably in the range of from 2.2 to 3.5 dl/g.

Furthermore the molecular weight distribution (MWD; $M_w/M_n$ as measured with GPC) of the propylene homo- or copolymer can be relatively broad, i.e. the $M_w/M_n$ can be up to 7.0.

Preferably the $M_w/M_n$ is in a range of from 2.5 to 7.0, more preferably from 3.0 to 6.5 and even more preferably from 3.5 to 6.3.

In a preferred embodiment the matrix (M) is a propylene homopolymer.

The propylene homo- or copolymer matrix can be unimodal or multimodal, like bimodal.

When the propylene homo- or copolymer matrix phase is unimodal with respect to the molecular weight distribution, it may be prepared in a single stage process e.g. a slurry or gas phase process in a slurry or gas phase reactor. Preferably, a unimodal matrix phase is polymerized as a slurry polymerization. Alternatively, the unimodal matrix may be produced in a multistage process using at each stage process conditions which result in similar polymer properties.

Concerning the definition of unimodal and multimodal, like bimodal, it is referred to the definition below.

Where the propylene homo- or copolymer matrix comprises two or more different propylene polymers these may be polymers with different monomer make up and/or with different molecular weight distributions and/or $MFR_2$. These components may have identical or differing monomer compositions and tacticities.

Thus in one embodiment of the present invention the matrix is unimodal, whereas in another embodiment the matrix (M) is bimodal and consists of two propylene homopolymer fractions, two propylene copolymers fractions or one homo and one copolymer fraction.

Ad Component (a2) (i.e. Elastomeric Propylene-Ethylene Copolymer (E)):

Component (a2) of the particular heterophasic polypropylene copolymer is the elastomeric propylene-ethylene copolymer (E), which is a predominantly amorphous copolymer (ii) of propylene and ethylene.

Thus, component (a2) is an elastomeric copolymer, being dispersed in said matrix (M) (i.e. dispersed phase).

As stated above, the terms "elastomeric (propylene-ethylene) copolymer", "dispersed phase" and "rubber phase" denote the same, i.e. are interchangeable in view of this invention.

Component (a2), i.e. the elastomeric propylene-ethylene copolymer (E) has an ethylene content, in polymerized form, in the range of from 10.0 to 80.0 wt %, preferably in the range from 12.0 to 60.0 wt % and more preferably in the range from 15.0 to 50.0 wt %.

It is also possible that the elastomeric propylene-ethylene copolymer (E) has optionally in addition to the ethylene comonomer a second comonomer. This optional second comonomer can be 1-butene or 1-hexene.

The amount of 1-butene can be in a range of from 0.0 up to 20.0 wt %, preferably up to 15.0 wt % and more preferably up to 10.0 wt %.

The amount of 1-hexene can be in a range of from 0.0 up to 10.0 wt %, preferably up to 7.0 wt % and more preferably up to 5.0 wt %

Preferably the elastomeric propylene-ethylene copolymer (E) has no further comonomer.

The elastomeric propylene-ethylene copolymer (E) furthermore has an intrinsic viscosity (iV) determined according to DIN ISO 1628/1 (in decaline at 135° C.) in the range of 3.1 to 8.0 dl/g, preferably in the range of 3.1 to 5.5 dl/g, more preferably in the range of 3.1 to 5.0 dl/g and even more preferably from 3.1 to 4.0 dl/g.

The elastomeric propylene-ethylene copolymer (E) has a xylene soluble (XS) fraction (determined according to ISO 16152 at 25° C.) of at least 50.0 wt % up to 100.0 wt %, preferably of at least 80.0 wt % up to 100.0 wt %, and more preferably at least 95.0 wt % up to 100.0 wt %.

Like the propylene homo- or copolymer matrix, the dispersed phase can be unimodal or multimodal, like bimodal.

In one embodiment, the dispersed phase is unimodal. More particularly, the dispersed phase is preferably unimodal in view of the intrinsic viscosity and/or the comonomer distribution. Concerning the definition of unimodal and multimodal, like bimodal, it is referred to the definition above.

Preferably the unimodal dispersed phase is made in one reaction stage, more preferably in a gas phase reactor and comprises, respectively consists of one copolymer fraction.

The elastomeric propylene-ethylene copolymer (E) fraction of the heterophasic propylene copolymer is present in an amount of 5.0 to 50.0 wt %, preferably from 8.0 to 45.0 wt % and more preferably from 10.0 to 40.0 wt %.

Final Heterophasic Propylene Copolymer

The heterophasic propylene copolymer has a total xylene soluble (XS) fraction (determined according to ISO 16152 at 25° C.) in the range of from 5.0 to 50.0 wt %, preferably in the range of from 8.0 to 40.0 wt %.

The molecular weight Mw (GPC) of total xylene soluble (XS) fraction can be at least Mw=300 000 g/mol, preferably at least Mw=350 000 g/mol, more preferably at least Mw=380 000 g/mol. The upper limit for the molecular weight Mw is 800 000 g/mol, preferably 700 000 g/mol and more preferably 600 000 g/mol.

Furthermore the molecular weight distribution (MWD; $M_w/M_n$ as measured with GPC) of the total xylene soluble (XS) fraction is in a range of from 2.0 to 5.0, more preferably from 2.2 to 4.5 and even more preferably from 2.5 to 4.0.

The intrinsic viscosity (iV) determined according to DIN ISO 1628/1 (in decaline at 135° C.) of the heterophasic propylene copolymer is the range of from 2.0 to 5.0 dl/g, preferably in the range of from 2.2 to 4.5 dl/g and more preferably in the range of 2.5 to 4.0 dl/g.

The heterophasic propylene copolymers made by the catalysts of the invention are useful in all kinds of end articles such as pipes, films (cast, blown or BOPP films), fibers, moulded articles (e.g. injection moulded, blow moulded, rotomoulded articles), extrusion coatings and so on.

The invention will now be illustrated by reference to the following non-limiting Examples.

Analytical Tests

Measurement Methods:

Al and Zr Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma-Optical Emmision Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% HNO3, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

In the case of analysing the elemental composition of prepolymerized catalysts, the polymeric portion is digested by ashing in such a way that the elements can be freely dissolved by the acids. The total content is calculated to correspond to the weight % for the prepolymerized catalyst.

GPC: Molecular Weight Averages, Molecular Weight Distribution, and Polydispersity Index ($M_n$, $M_w$, $M_w/M_n$)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Quantification of Copolymer Microstructure by NMR Spectroscopy

Quantitative 13C{1H} NMR spectra were recorded in the solution-state using a Bruker Advance III 400 NMR spectrometer operating at 400.15 and 100.62 MHz for 1H and 13C respectively. All spectra were recorded using a 13C optimised 10 mm extended temperature probehead at 125° C. using nitrogen gas for all pneumatics. Approximately 200 mg of material was dissolved in 3 ml of 1,2-tetrachloroethane-d2 (TCE-d2) along with chromium-(III)-acetylacetonate (Cr(acac)3) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra.

Quantitative 13C{1H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer:

$$fE=(E/(P+E)$$

The comonomer fraction was quantified using the method of W-J. Wang and S. Zhu, Macromolecules 2000, 33 1157, through integration of multiple signals across the whole spectral region in the 13C{1H} spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+((1-fE)*42.08))$$

Xylene Solubles (XS)

The xylene soluble (XS) fraction as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:
XS %=(100·m·Vo)/(mo·v); mo=initial polymer amount (g); m=weight of residue (g); Vo=initial volume (ml); v=volume of analysed sample (ml).

Intrinsic Viscosity (IV)

The intrinsic viscosity (IV) value increases with the molecular weight of a polymer. The IV values e.g. of the XS were measured according to ISO 1628/1 in decaline at 135° C.

Catalyst Activity Regarding Rubber Phase

The catalyst activity in the gas phase reactor in relation to the production of the elastomeric propylene-ethylene copolymer (E) was calculated on the basis of following formula:

$$\text{Catalyst Activity }(kg/g^*h) = \frac{\text{amount of polymer produced (kg)}}{\text{catalyst loading }(g) \times \text{polymerisation time }(h)}$$

The amount of propylene-ethylene copolymer (E) was determined on the basis of the consumed monomers during the rubber gas phase step.

Productivity

Overall productivity was calculated as $$\text{Catalyst Activity }(kg/g^*h) = \frac{\text{amount of polymer produced (kg)}}{\text{catalyst loading }(g) \times \text{polymerisation time }(h)}$$

In which catalyst loading is either the grams of prepolymerized catalyst or the grams of metallocene present in that amount of prepolymerized catalyst Prepolymerization Degree (DP): Weight of Polymer/Weight of Solid Catalyst Before Prepolymerization Step The composition of the catalysts (before the off-line prepolymerization step) has been determined by ICP as described above. The metallocene content of the prepolymerized catalysts has been calculated from the ICP data as follows:

$$\frac{Al}{Zr}(mol/mol) = \frac{Al(wt\ \%,\ ICP)/26.98}{Zr(wt\ \%,\ ICP)/91.22} \quad \text{Equation 1}$$

$$Zr(mol\ \%) = \frac{100}{\frac{Al}{Zr}(mol/mol) + 1} \quad \text{Equation 2}$$

$$MC(wt\%,\ \text{unprepolymerized cat}) = \quad \text{Equation 3}$$
$$\frac{100 \times (Zr,\ mol\ \% \times MwMC)}{Zr,\ mol\% \times MwMC + (100 - Zr,\ mol\ \%) \times MwMAO}$$

$$MC(wt\%,\ \text{prepolymerized cat}) = \quad \text{Equation 4}$$
$$\frac{MC(wt\ \%,\ \text{unprepolymerized cat})}{DP + 1}$$

EXAMPLES

Metallocene Synthesis
Materials Used for Complex Preparation:

2,6-Dimethylaniline (Acros), 1-bromo-3,5-dimethylbenzene (Acros), 1-bromo-3,5-di-tert-butylbenzene (Acros), bis (2,6-diisopropylphenyl)imidazolium chloride (Aldrich), triphenylphosphine (Acros), NiCl$_2$(DME) (Aldrich), dichlorodimethylsilane (Merck), ZrCl$_4$ (Merck), trimethylborate (Acros), Pd(OAc)$_2$ (Aldrich), NaBH$_4$ (Acros), 2.5 M nBuLi in hexanes (Chemetal), CuCN (Merck), magnesium turnings (Acros), silica gel 60, 40-63 μm (Merck), bromine (Merck), 96% sulfuric acid (Reachim), sodium nitrite (Merck), copper powder (Alfa), potassium hydroxide (Merck), K$_2$CO$_3$ (Merck), 12 M HCl (Reachim), TsOH (Aldrich), MgSO$_4$ (Merck), Na$_2$CO$_3$ (Merck), Na$_2$SO$_4$ (Akzo Nobel), methanol (Merck), diethyl ether (Merck), 1,2-dimethoxyethane (DME, Aldrich), 95% ethanol (Merck), dichloromethane (Merck), hexane (Merck), THF (Merck), and toluene (Merck) were used as received. Hexane, toluene and dichloromethane for organometallic synthesis were dried over molecular sieves 4A (Merck). Diethyl ether, THF, and 1,2-dimethoxyethane (Aldrich) for organometallic synthesis were distilled over sodium benzophenoneketyl. CDCl$_3$ (Deutero GmbH) and CD$_2$Cl$_2$ (Deutero GmbH) were dried over molecular sieves 4A. 4-Bromo-6-tert-butyl-5-methoxy-2-methylindan-1-one was obtained as described in one of our earlier patents.

The following complexes as shown below were used in preparing catalysts for the Comparative Examples (CE) and the Inventive Examples (IE) (CC1 to 5 for the Comparative Examples, IC1 and IC2 for Inventive Examples)

CC1

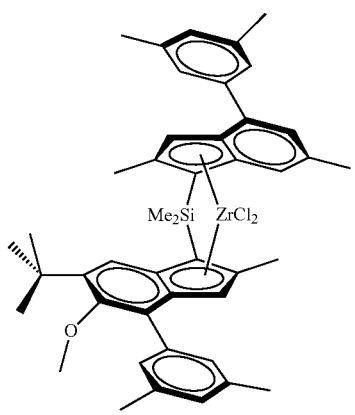

CC2

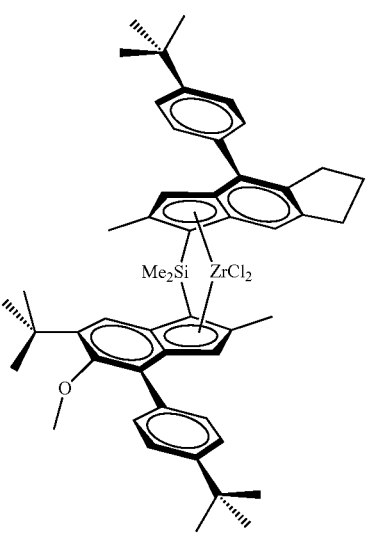

CC3

CC4

CC5

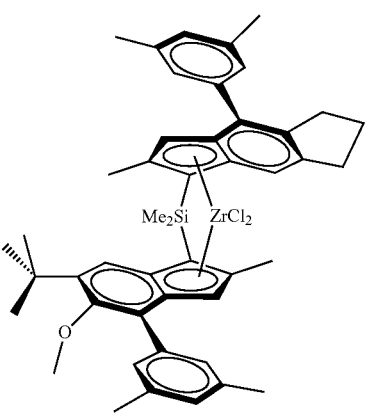

-continued

CC6

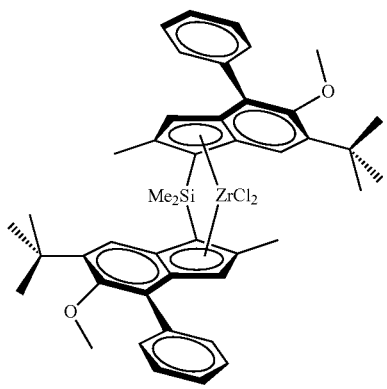

IC1

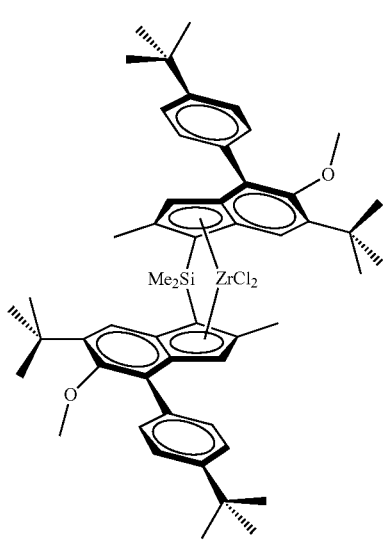

IC2

Synthesis of Comparative Metallocene CC1

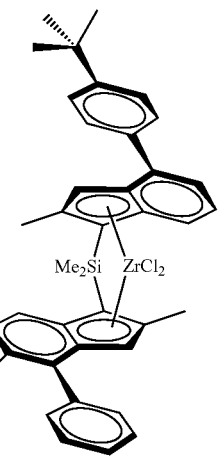

C-C1 (rac-anti-dimethylsilanediyl(2-methyl-4-(4'-tert-butylphenyl) inden-1-yl)(2-methyl-4-phenyl-5-methoxy-6-tert-butyl inden-1-yl) zirconium dichloride) was synthesized according to the procedure as described in WO WO2013007650, E2.

Synthesis of Comparative Metallocene CC2

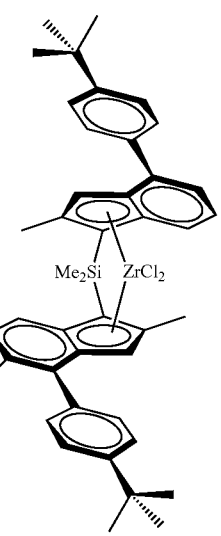

CC2 (rac-anti-dimethylsilanediyl(2-methyl-4-(4-tert-butylphenyl) inden-1-yl)(2-methyl-4-(4'-tert-butylphenyl)-5-methoxy-6-tert-butyl inden-1-yl) zirconium dichloride) was synthesized according to the procedure as described in WO WO2013007650, E7.

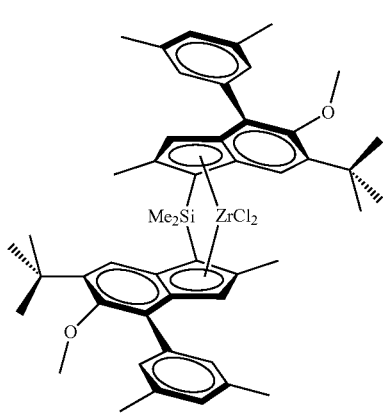

Synthesis of Comparative Metallocene CC3

2-Chloro-4-methylbenzaldehyde

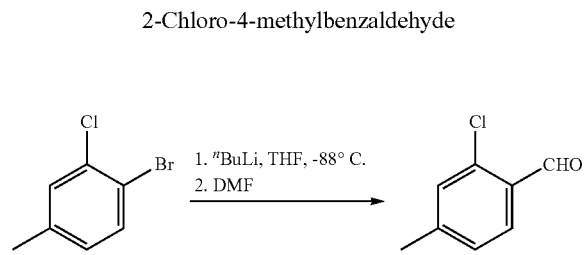

165 ml (413 mmol) of 2.5 M $^n$BuLi in hexanes was added dropwise over 1 h to a solution of 82.2 g (400 mmol) of 3-chloro-4-bromo-toluene in 400 ml of THF cooled to −88° C. The resulting mixture was stirred for 30 min at this temperature, and then 44.0 g (602 mmol) of DMF was added dropwise over 10 min by vigorous stirring. The reaction mixture was stirred overnight at room temperature, then cooled to 0° C. in an ice bath and then 100 ml of water and 400 ml of 3N HCl were added. The organic layer was separated and the aqueous layer was extracted with 2×125 ml of dichloromethane. The combined organic extract was dried over $K_2CO_3$ and then passed through a short layer of silica gel 60 (40-63 μm). The silica gel layer was additionally washed with 50 ml of dichloromethane. The combined organic elute was evaporated to dryness to give a slightly orange liquid which was then distilled in vacuum to give 58.0 g (94%) of the title product (b.p. 99-102° C./11 mm Hg,) as a colorless liquid that crystallized overnight at room temperature.

Anal. calc. for $C_8H_7ClO$: C, 62.15; H, 4.56. Found: C, 62.24; H, 4.45.

$^1$H NMR (CDCl$_3$): δ 10.4 (s, 1H, CHO), 7.80 (d, J=7.8 Hz, 1H, 6-H), 7.25 (s, 1H, 3-H), 7.17 (d, J=7.8 Hz, 1H, 5-H), 2.40 (s, 3H, 4-Me).

(2-Chloro-4-methylphenyl)methanol

375 ml of methanol was added dropwise by vigorous stirring over 5 h to a mixture of 116 g (0.75 mol) of 2-chloro-4-methylbenzaldehyde and 43.0 g (1.14 mol) of NaBH$_4$ in 750 ml of THF at 0-5° C. This mixture was stirred overnight at room temperature, and then evaporated to dryness. The resulting oily mass was acidified with 1200 ml of 2 M HCl to pH~1, and the formed product was extracted consequently with 3×400 ml of dichloromethane. The combined organic extract was dried over Na$_2$SO$_4$ and evaporated to dryness. This product was used without additional purification.

$^1$H NMR (CDCl$_3$): δ 7.29 (d, J=7.8 Hz, 1H, 5-H), 7.15 (s, 1H, 3-H), 7.04 (d, J=7.8 Hz, 1H, 6-H), 4.67 (s, 2H, CH$_2$OH), 2.59 (br.s, 1H, CH$_2$OH), 2.30 (s, 3H, 4-Me). $^{13}$C{$^1$H} NMR (CDCl$_3$): δ 138.9, 135.0, 132.4, 129.7, 128.6, 127.6, 62.5, 20.7.

2-Chloro-1-(chloromethyl)-4-methyl benzene

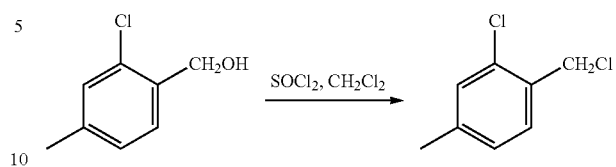

The above-obtained 2-chloro-4-methylbenzyl alcohol dissolved in 750 ml of dichloromethane was added dropwise to 55 ml (754 mmol) of thionyl chloride at +5° C. The resulting solution was stirred overnight at room temperature and then evaporated to dryness. The residue was dissolved in 500 ml dichloromethane, and the formed solution was washed by 250 ml of water. The organic layer was separated; the aqueous layer was extracted with 2×150 ml of dichloromethane. The combined organic extract was dried over Na$_2$SO$_4$, passed through a short pad of silica gel 60 (40-63 μm) and then evaporated to dryness. The crude product was distilled in vacuum to give 114 g (87%) of the title product as a colorless liquid, b.p. 92-95° C./5 mm Hg.

Anal. calc. for $C_8H_8Cl_2$: C, 54.89; H, 4.61. Found: C, 54.80; H, 4.65.

$^1$H NMR (CDCl$_3$): δ 7.30 (d, J=7.8 Hz, 1H, 5-H), 7.19 (s, 1H, 3-H), 7.04 (d, J=7.8 Hz, 1H, 6-H), 4.64 (s, 2H, CH$_2$Cl), 2.30 (s, 3H, Me). $^{13}$C{$^1$H} NMR (CDCl$_3$): δ 140.3, 133.7, 131.9, 130.6, 130.2, 127.9, 43.5, 20.8.

3-(2-Chloro-4-methylphenyl)-2-methylpropanoyl chloride

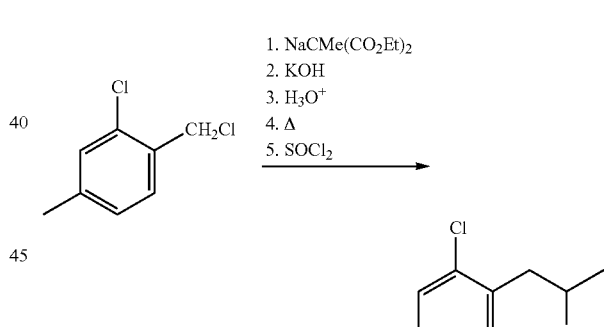

119 g (0.68 mol) of diethyl methylmalonate was added to a solution of sodium ethoxide obtained from 17.0 g (0.74 mol) of sodium metal and 600 ml of dry ethanol. The formed mixture was stirred for 15 min, and then 114 g (0.651 mol) of 2-chloro-1-(chloromethyl)-4-methylbenzene was added by vigorous stirring at such a rate to maintain a gentle reflux. The resulting mixture was refluxed for 2 h and then cooled to room temperature. A solution of 135 g of KOH in 550 ml of water was added. This mixture was refluxed for 4 h to saponificate the ester formed. Ethanol and water were distilled off until vapor temperature reached 95° C., then 3000 ml of water and then 12 M HCl (to pH~1) were added to the residue. The precipitated substituted methylmalonic acid was filtered off and washed with water. This diacid was decarboxylated at 160-180° C. to form a slightly orange oil that crystallized at room temperature. A mixture of the formed acid and 166 ml of thionyl chloride was stirred for 24 h at room temperature. After evaporation of the excess of thionyl chloride, the residue was distilled in vacuum to give 123 g (82%) of the title product, b.p. 105-117° C./5 mm Hg.

Anal. calc. for $C_{11}H_{12}Cl_2O$: C, 57.16; H, 5.23. Found: C, 57.36; H, 5.38.

$^1$H NMR (CDCl$_3$): δ 7.19 (s, 1H, 3-H), 7.10 (d, J=7.7 Hz, 1H, 5-H), 7.00 (d, J=7.7 Hz, 1H, 6-H), 3.20-3.32 (m, 2H, CHH' and CHMe), 2.82 (dd, J=12.8 Hz, J=6.4 Hz, 1H, CHH), 2.30 (s, 3H, 4-Me), 1.30 (d, J=6.8 Hz, 3H, CHMe). $^{13}$C{$^1$H} NMR (CDCl$_3$): δ 177.1, 138.6, 133.8, 132.1, 131.2, 130.2, 127.7, 51.4, 36.5, 20.7, 16.7.

4-Chloro-2,6-dimethylindan-1-one

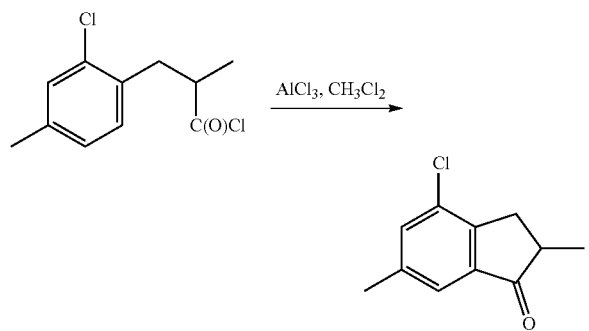

A solution of 123 g (531 mmol) of 3-(2-chloro-4-methylphenyl)-2-methylpropanoyl chloride in 100 ml of dichloromethane was added dropwise to a stirred suspension of 85.0 g (638 mmol) of AlCl$_3$ in 500 ml of dichloromethane at 5° C. This mixture was stirred overnight at room temperature and then poured onto 500 g of crushed ice. The organic layer was separated, and the aqueous layer was extracted with 3×100 ml of dichloromethane. The combined organic extract was washed by aqueous K$_2$CO$_3$, dried over K$_2$CO$_3$, passed through a short pad of silica gel 60 (40-63 μm), and then evaporated to dryness. Crude product was distilled in vacuum to give 98.4 g (95%) of a colorless liquid, b.p. 131-132° C./8 mm Hg.

Anal. calc. for $C_{11}H_{11}ClO$: C, 67.87; H, 5.70. Found: C, 68.01; H, 5.69.

$^1$H NMR (CDCl$_3$): δ 7.42 (s, 1H, 7-H), 7.38 (s, 1H, 5-H), 3.32 (dd, J=17.3 Hz, J=7.8 Hz, 1H, 3-CHH'), 2.68-2.76 (m, 1H, 2-H), 2.62 (dd, 1H, J=17.3 Hz, J=3.6 Hz, 3-CHH'), 2.38 (s, 3H, 6-Me), 1.31 (d, J=7.5 Hz, 3H, 2-Me). $^{13}$C{$^1$H} NMR (CDCl$_3$): δ 208.2, 148.0, 139.3, 138.1, 135.0, 132.1, 122.2, 42.0, 33.3, 20.7, 16.1.

4-Chloro-1-methoxy-2,6-dimethylindane

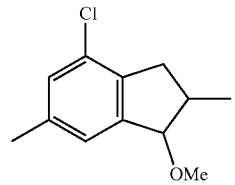

205 ml of methanol was added dropwise by vigorous stirring over 5 h to a mixture of 98.4 g (0.505 mol) of 4-chloro-2,6-dimethylindan-1-one and 29.0 g (0.767 mol) of NaBH$_4$ in 510 ml of THF at 0-5° C. This mixture was stirred overnight at room temperature and then evaporated to dryness. The residue was acidified by 2 M HCl to pH 5-6, and the formed 4-chloro-2,6-dimethylindan-1-ol was extracted with 3×300 ml of dichloromethane. The combined organic extract was dried over Na$_2$SO$_4$ and evaporated to dryness, yielding a white solid. 132 g (2.35 mol) of KOH and 163 g (1.15 mol) of MeI were added to a solution of the so obtained white solid in 800 ml of DMSO. This mixture was stirred for 5 h at ambient temperature. The solution was decanted from the excess of KOH, and the latter was additionally washed with 3×350 ml of dichloromethane. The combined organic extract was washed with 3000 ml of water. The organic layer was separated, and the aqueous layer was extracted with 3×300 ml of dichloromethane. The combined organic extract was washed with 7×1500 ml of water, dried over Na$_2$SO$_4$, and then evaporated to dryness. The residue was distilled in vacuum to give 99.9 g (94%) of the title product consisting of two pairs of enantiomers, b.p. 104-105° C./8 mm Hg.

Anal. calc. for $C_{12}H_{15}ClO$: C, 68.40; H, 7.18. Found: C, 68.58; H, 7.25.

Syn-isomers. $^1$H NMR (CDCl$_3$): δ 7.05 (s, 2H, 5-H and 7-H), 4.51 (d, J=5.7 Hz, 1H, 1-H), 3.41 (s, 3H, OMe), 2.92 (dd, J=15.3 Hz, J=6.4 Hz, 1H, 3-CHH'), 2.68-2.59 (m, 2H, 3-CHH' and 2-H), 2.32 (s, 3H, 6-Me), 1.07 (d, J=6.8 Hz, 3H, 2-Me). $^{13}$C{$^1$H} NMR (CDCl$_3$): δ 144.6, 138.3, 137.8, 130.7, 128.7, 124.1, 86.4, 57.0, 38.2, 36.9, 21.0, 13.5.

Anti-isomers. 1H NMR (CDCl$_3$): δ 7.05 (s, 1H, 7-H), 7.07 (s, 1H, 5-H), 4.37 (d, J=3.9 Hz, 1H, 1-H), 3.45 (s, 3H, OMe), 3.19 (dd, J=16.2 Hz, J=7.6 Hz, 1H, 3-CHH'), 2.50 (m, 1H, 2-H), 2.42 (dd, J=16.2 Hz, J=5.0 Hz, 1H, 3-CHH), 2.32 (s, 3H, 6-Me), 1.16 (d, J=6.8 Hz, 3H, 2-Me). $^{13}$C{$^1$H} NMR (CDCl$_3$): δ 144.2, 138.1 (two resonances), 130.7, 128.9, 124.2, 91.8, 56.6, 39.4, 37.2, 21.0, 19.3.

4-(3,5-Dimethylphenyl)-1-methoxy-2,6-dimethylindane

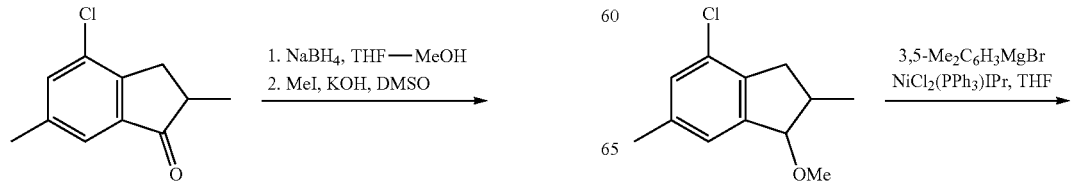

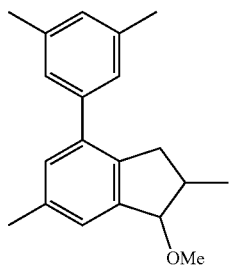

200 ml (200 mmol) of 1.0 M 3,5-di-methylphenylmagnesium bromide in THF was added at room temperature to a mixture of 2.10 g (2.69 mmol, 2.0 mol. %) of NiCl$_2$(PPh$_3$)IPr and 28.4 g (134.7 mmol) of 4-chloro-1-methoxy-2,6-dimethylindane. The resulting mixture was refluxed for 1.5 h, then cooled to room temperature, and 100 ml of water was added. The main part of THF was distilled off on a rotary evaporator. 500 ml of dichloromethane and 1000 ml of 1 M HCl were added to the residue. The organic layer was separated, then the aqueous layer was extracted with 2×100 ml of dichloromethane. The combined organic extract was evaporated to dryness to give a yellow oil. The product was isolated by flash-chromatography on silica gel 60 (40-63 µm; eluent: hexanes-dichloromethane=2:1, vol., then 1:1, vol.). This procedure gave 33.8 g (90%) of 4-(3,5-dimethylphenyl)-1-methoxy-2,6-dimethylindane a colorless thick oil including two diastereomers.

Anal. calc. for C$_{20}$H$_{24}$O: C, 85.67; H, 8.63. Found: C, 86.03; H, 8.80.

$^1$H NMR (CDCl$_3$), mixture of isomers: δ 7.20-6.93 (set of signals, sum 5H); 4.51 (d, J-=5.7 Hz) and 4.39 (d, J-=3.9 Hz) {sum 1H}; 3.49 (s) and 3.45 (s) {sum 3H}; 3.29-3.17 (m), 2.94-2.84 (m), 2.80-2.70 (m) and 2.60-2.37 (m) {sum 3H}; 2.38 (s) and 2.35 (s) {sum 9H}; 1.12 (d, J=6.9 Hz) and 1.06 (d, J=7.1 Hz) {sum 3H}. $^{13}$C{$^1$H} NMR (CDCl$_3$), mixture of isomers: δ 143.50, 143.00, 140.91, 138.68, 138.58, 138.09, 137.64, 136.40, 136.03, 129.51, 129.17, 128.48, 126.35, 124.66, 91.42, 86.23, 56.82, 56.62, 40.12, 39.06, 38.00, 37.85, 21.36, 21.25, 19.17, 13.53.

4/7-(3,5-Dimethylphenyl)-2,5-dimethyl-1H-indene

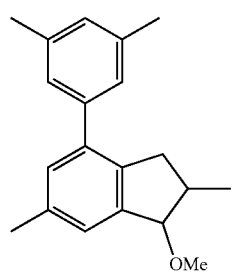

TsOH, toluene →

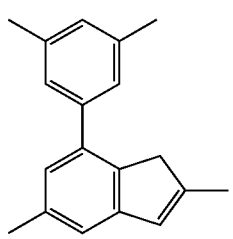

300 mg of TsOH was added to a solution of 33.8 g (120.6 mmol) of 4-(3,5-dimethylphenyl)-1-methoxy-2,6-dimethylindane in 300 ml of toluene and the resulting mixture was refluxed using Dean-Stark head for 10 min. Subsequently one more portion of 150 mg of TsOH was added, and again the formed solution was refluxed using Dean-Stark head for an additional 10 min. After cooling to room temperature the reaction mixture was washed by 200 ml of 10% K$_2$CO$_3$. The organic layer was separated, and the aqueous layer was additionally extracted with 2×100 ml of dichloromethane. The combined organic extract was dried over anhydrous K$_2$CO$_3$ and evaporated. The resulting yellow oil was dissolved in hexane. The formed solution was passed through a short pad of silica gel 60 (40-63 µm) and the elute was evaporated to dryness to give 29.1 g (97%) of 7-(3,5-dimethylphenyl)-2,5-dimethyl-1H-indene as a slightly yellowish oil.

Anal. calc. for C$_{19}$H$_{20}$: C, 91.88; H, 8.12. Found: C, 92.11; H, 8.34.

$^1$H NMR (CDCl$_3$): δ 7.13 (s, 2H), 7.05 (s, 1H), 6.98 (s, 1H), 6.93 (s, 1H), 6.47 (m, 1H), 3.33 (s, 2H), 2.40 (s, 3H), 2.37 (s, 6H), 2.12 (s, 3H). $^{13}$C{$^1$H} NMR (CDCl$_3$): δ 146.65, 146.45, 141.43, 137.84, 137.75, 137.21, 136.41, 128.55, 127.04, 126.23, 125.04, 119.58, 42.41, 21.40, 16.74[1].

[1] two signals in the aliphatic region were merged together

[6-tert-Butyl-4-(3,5-dimethylphenyl)-5-methoxy-2-methyl-1H-inden-1-yl](chloro)dimethylsilane

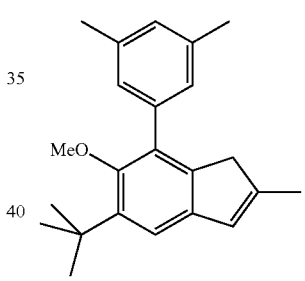

1. $^n$BuLi, Et$_2$O
2. 5 eq. Me$_2$SiCl$_2$
→

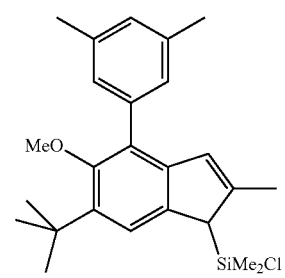

14.6 ml (35.5 mmol) of 2.43 M $^n$BuLi in hexanes was added in one portion to a solution of 11.3 g (35.3 mmol) of 5-tert-butyl-7-(3,5-dimethylphenyl)-6-methoxy-2-methyl-1H-indene in 200 ml of ether cooled to −50° C. The resulting orange solution was stirred overnight at room temperature, then the obtained orange solution containing a yellowish precipitate was cooled to −78° C. (the precipitate almost completely disappeared), and 22.8 g (177 mmol, 5 equiv) of dichlorodimethylsilane was added in one portion. The formed solution was warmed to room temperature and stirred overnight at room temperature. The resulting mixture was filtered through glass frit (G4). The precipitate was additionally washed by 2×10 ml of ether. The combined filtrate was evaporated to dryness to give the title material as slightly orange oil which was used without additional purification.

¹H NMR (CDCl₃): δ 7.38 (s, 1H), 7.08 (s, 2H), 6.98 (s, 1H), 6.43 (s, 1H), 3.53 (s, 1H), 3.25 (s, 3H), 2.37 (s, 6H), 2.19 (s, 3H), 1.43 (s, 9H), 0.43 (s, 3H), 0.17 (s, 3H). ¹³C{¹H} NMR (CDCl₃): δ 155.79, 145.87, 143.74, 137.99, 137.55, 137.49, 136.75, 128.32, 127.87, 127.55, 126.65, 120.86, 60.46, 49.99, 35.15, 31.17, 21.42, 17.56, 1.11, −0.58.

[2-methyl-4-(3,5-dimethylphenyl)-5-methoxy-6-tert-butyl-1H-inden-1-yl][2,6-dimethyl-4-(3,5-dimethylphenyl)-1H-inden-1-yl]dimethylsilane

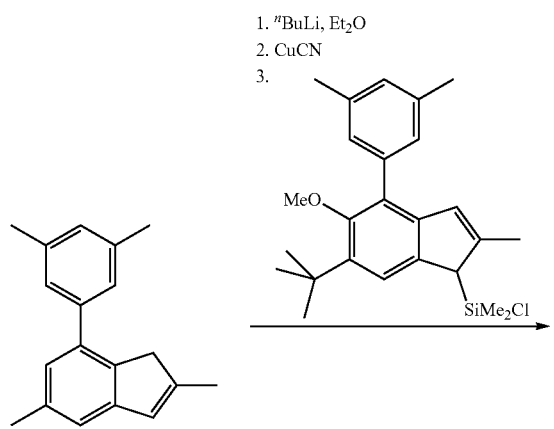

14.6 ml (35.5 mmol) of 2.43 M "BuLi in hexanes was added in one portion to a solution of 8.78 g (35.35 mmol) of 7-(3,5-dimethylphenyl)-2,5-dimethyl-1H-indene in 200 ml of ether at −50° C. This mixture was stirred overnight at room temperature, then the resulting yellowish solution containing a large amount of yellow precipitate was cooled to −50° C., then 40 ml of THF and 200 mg of CuCN were added in sequence. The resulting mixture was stirred for 0.5 h at −25° C., then a solution of [6-tert-butyl-4-(3,5-dimethylphenyl)-5-methoxy-2-methyl-1H-inden-1-yl](chloro)dimethylsilane (35.32 mmol) in 200 ml of ether was added in one portion. This mixture was stirred overnight at ambient temperature, then it was filtered through a glass frit (G4) and the obtained yellow solution was evaporated to dryness. The title product was isolated by flash-chromatography on silica gel 60 (40-63 μm; eluent: hexanes-dichloromethane=10:1, vol., then 3:1, vol.). This procedure gave 17.5 g (79%) of [2-methyl-4-(3,5-dimethylphenyl)-5-methoxy-6-tert-butyl-1H-inden-1-yl][2,6-dimethyl-4-(3,5-dimethylphenyl)-1H-inden-1-yl]dimethylsilane.

Anal. calc. for C₄₄H₅₂OSi: C, 84.56; H, 8.39. Found: C, 84.85; H, 8.78.

¹H NMR (CDCl₃): δ 7.51-7.02 (set of signals, sum 7H), 6.99 (s, 2H), 6.79 (s, 1H), 6.45 (s, 1H), 3.68 and 3.66 (2m, sum 2H), 3.28 and 3.26 (2s, sum 3H), 2.44-2.32 (set of signals, 15H), 2.18 and 2.15 (2s, sum 6H), 1.43 and 1.42 (2s, sum 9H), −0.16, −0.18, −0.19 and −0.25 (4s, sum 6H). ¹³C{¹H} NMR (CDCl₃): δ 155.36, 147.36, 147.28, 146.50, 146.25, 146.00, 143.75, 143.70, 141.41, 140.42, 139.21, 138.24, 137.76, 137.53, 137.16, 137.09, 133.94, 132.44, 132.32, 128.34, 128.24, 127.94, 127.53, 127.15, 126.74, 126.41, 126.10, 126.05, 125.84, 125.75, 123.04, 122.84, 120.56, 120.50, 60.51, 47.37, 47.30, 47.23, 47.15, 35.16, 31.27, 31.23, 21.68, 21.59, 21.43, 17.95, 17.85, −5.27, −5.28, −5.37, −5.85 rac-anti-Me₂Si(2,6-Me₂-4-(3,5-Me₂Ph)Ind)(2-Me-4-(3,5-Me₂Ph)-5-OMe-6-tBu-Ind)ZrCl₂—CC3

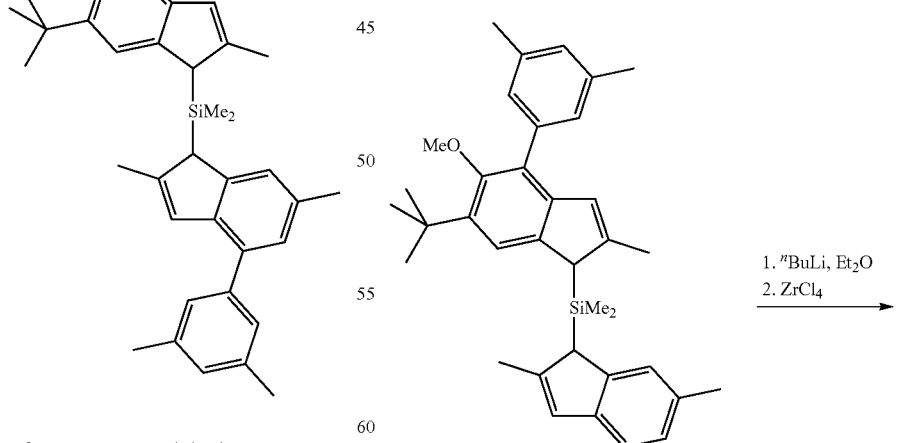

-continued

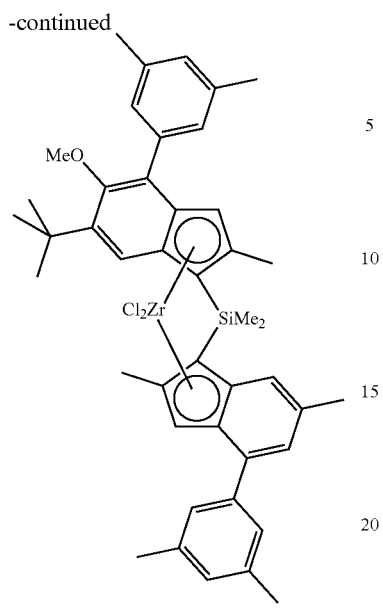

23.1 ml (56.1 mmol) of 2.43 M ⁿBuLi in hexanes was added in one portion to a solution of 17.53 g (28.05 mmol) of [2-methyl-4-(3,5-dimethylphenyl)-5-methoxy-6-tert-butyl-1H-inden-1-yl][2,6-dimethyl-4-(3,5-dimethylphenyl)-1H-inden-1-yl]dimethylsilane in 200 ml of ether cooled to −50° C. This mixture was stirred overnight at room temperature. The resulting reddish solution containing a yellowish precipitate was cooled to −50° C., and 6.54 g (28.06 mmol) of ZrCl$_4$ was added. The reaction mixture was stirred for 24 h at room temperature giving a light red suspension with orange precipitate. This mixture was evaporated to dryness, and the residue was treated with 200 ml of hot toluene. This mixture was filtered while hot through glass frit (G4), and the filtrate was evaporated to ca. 60 ml. The orange crystalline powder precipitated from this solution in 3 h at room temperature was collected and dried in vacuum. This procedure gave 3.60 g of pure anti-dimethylsilanediyl[2-methyl-4-(3,5-dimethylphenyl)-5-methoxy-6-tert-butyl-inden-1-yl][2,6-dimethyl-4-(3,5-dimethylphenyl)-inden-1-yl]zirconium dichloride. The mother liquor was evaporated almost to dryness, and the residue was triturated with 50 ml of ether. The insoluble orange precipitate was filtered off (G3) to give 5.01 g of a ca. 93:7 mixture of anti-/syn-complexes. Reddish crystalline powder precipitated overnight at −30° C. from the filtrate was collected and dried in vacuum. This procedure gave 1.98 g of pure syn-dimethylsilanediyl[2-methyl-4-(3,5-dimethylphenyl)-5-methoxy-6-tert-butyl-inden-1-yl][2,6-dimethyl-4-(3,5-dimethylphenyl)-inden-1-yl]zirconium dichloride. After standing for several days at room temperature, an additional portion of red crystalline powder precipitated from the mother liquor. This precipitate was filtered off to give 4.91 g of a ca. 96:4 mixture of syn-/anti-complexes. Thus, the total yield of syn- and anti-complexes isolated in this synthesis was 15.5 g (70%).

Anti-dimethylsilanediyl[2-methyl-4-(3,5-dimethylphenyl)-5-methoxy-6-tert-butyl-inden-1-yl][2,6-dimethyl-4-(3,5-dimethylphenyl)-inden-1-yl]zirconium dichloride Anal. calc. for C$_{44}$H$_{50}$Cl$_2$OSiZr: C, 67.31; H, 6.42. Found: C, 67.58; H, 6.59.

$^1$H NMR (CDCl$_3$, 400 MHz, 27° C.): δ 7.49 (s, 1H), 7.36 (s, 1H), 7.28 (s, 2H), 7.22 (s, 1H), 7.32-7.12 (two very br.s, 2H), 6.98 (s, 1H), 6.95 (2s, sum 2H) 6.57 (s, 1H), 3.43 (s, 3H), 2.35 (2s, sum 9H), 2.32 (s, 6H), 2.23 (s, 3H), 2.17 (s, 3H), 1.39 (s, 9H), 1.30 (s, 3H), 1.29 (s, 3H). $^{13}$C{$^1$H} NMR (CDCl$_3$,): δ 159.81, 144.25, 139.44, 138.46, 138.02, 137.90, 136.75, 135.59, 135.44, 134.26, 133.57, 130.51, 129.36, 129.03, 128.86, 128.73, 128.22, 127.77, 127.39, 127.08, 126.41, 123.16, 122.59, 122.03, 121.72, 120.81, 81.98, 81.95, 62.61, 35.77, 30.40, 22.11, 21.45, 21.35, 18.40, 18.25, 2.68, 2.52.

Syn-dimethylsilanediyl[2-methyl-4-(3,5-dimethylphenyl)-5-methoxy-6-tert-butyl-inden-1-yl][2,6-dimethyl-4-(3,5-dimethylphenyl)-inden-1-yl]zirconium dichloride Anal. calc. for C$_{44}$H$_{50}$Cl$_2$OSiZr: C, 67.31; H, 6.42. Found: C, 67.56; H, 6.60.

$^1$H NMR (CDCl$_3$, 400 MHz, 27° C.): δ 7.50 (s, 1H), 7.35 (s, 1H), 7.25 (s, 2H), 7.31-7.08 (two very br.s, 2H), 7.01 (s, 1H), 6.96 (s, 1H), 6.95 (s, 1H) 6.84 (s, 1H), 6.48 (s, 1H), 3.26 (s, 3H), 2.42 (s, 3H), 2.36, 2.35 and 2.34 (3s, sum 15H), 2.30 (s, 3H), 1.43 (s, 3H), 1.35 (s, 9H), 1.20 (s, 3H). $^{13}$C{$^1$H} NMR (CDCl$_3$,): δ 158.95, 143.13, 139.34, 137.91, 137.78, 137.59, 136.81, 136.15, 135.78, 135.11, 134.48, 132.32, 129.25, 129.21, 128.80, 128.35, 127.33, 126.32, 124.00, 122.89, 121.45, 121.24, 121.00, 83.74, 83.67, 62.36, 35.55, 30.31, 22.72, 21.44, 18.53, 18.45, 2.92, 2.65.

Synthesis of Comparative Metallocene CC4

4-(4-tert-Butylphenyl)-1-methoxy-2-methyl-1,2,3,5,6,7-hexahydro-s-indacene

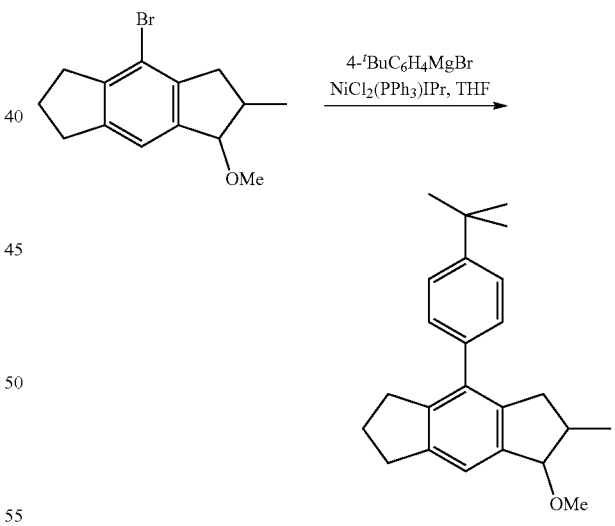

The precursor 4-bromo-1-methoxy-2-methyl-1,2,3,5,6,7-hexahydro-s-indacene was made according to the procedure described in WO2015/158790 A2 (pp 26-29).

To a mixture of 1.5 g (1.92 mmol, 0.6 mol. %) of NiCl$_2$(PPh$_3$)IPr and 89.5 g (318.3 mmol) of 4-bromo-1-methoxy-2-methyl-1,2,3,5,6,7-hexahydro-s-indacene, 500 ml (500 mmol, 1.57 equiv) of 1.0 M 4-tert-butylphenylmagnesium bromide in THF was added. The resulting solution was refluxed for 3 h, then cooled to room temperature, and 1000 ml of 0.5 M HCl was added. Further on, this mixture was extracted with 1000 ml of dichloromethane, the organic layer was separated, and the aqueous layer was extracted with 250 ml of dichloromethane. The combined organic extract was evaporated to dryness to give a greenish oil. The title product was isolated by flash-chromatography on silica gel 60 (40-63 µm; eluent: hexanes-dichloromethane=3:1, vol., then 1:3, vol.). This procedure gave 107 g (ca. 100%) of 1-methoxy-2-methyl-4-(4-tert-butylphenyl)-1,2,3,5,6,7-hexahydro-s-indacene as a white solid mass.

Anal. calc. for $C_{24}H_{30}O$: C, 86.18; H, 9.04. Found: C, 85.99; H, 9.18.

$^1$H NMR (CDCl$_3$), syn-isomer: δ 7.42-7.37 (m, 2H), 7.25-7.20 (m, 3H), 4.48 (d, J=5.5 Hz, 1H), 3.44 (s, 3H), 2.99-2.47 (m, 7H), 2.09-1.94 (m, 2H), 1.35 (s, 9H), 1.07 (d, J=6.9 Hz, 3H); Anti-isomer: δ 7.42-7.37 (m, 2H), 7.25-7.19 (m, 3H), 4.39 (d, J=3.9 Hz, 1H), 3.49 (s, 3H), 3.09 (dd, J=15.9 Hz, J=7.5 Hz, 1H), 2.94 (t, J=7.3 Hz, 2H), 2.78 (tm, J=7.3 Hz, 2H), 2.51-2.39 (m, 1H), 2.29 (dd, J=15.9 Hz, J=5.0 Hz, 1H), 2.01 (quin, J=7.3 Hz, 2H), 1.36 (s, 9H), 1.11 (d, J=7.1 Hz, 3H). $^{13}$C{$^1$H} NMR (CDCl$_3$), syn-isomer: δ 149.31, 142.71, 142.58, 141.46, 140.03, 136.71, 135.07, 128.55, 124.77, 120.02, 86.23, 56.74, 39.41, 37.65, 34.49, 33.06, 32.45, 31.38, 25.95, 13.68; Anti-isomer: δ 149.34, 143.21, 142.90, 140.86, 139.31, 136.69, 135.11, 128.49, 124.82, 119.98, 91.53, 56.50, 40.12, 37.76, 34.50, 33.04, 32.40, 31.38, 25.97, 19.35.

4-(4-tert-Butylphenyl)-6-methyl-1,2,3,5-tetrahydro-s-indacene

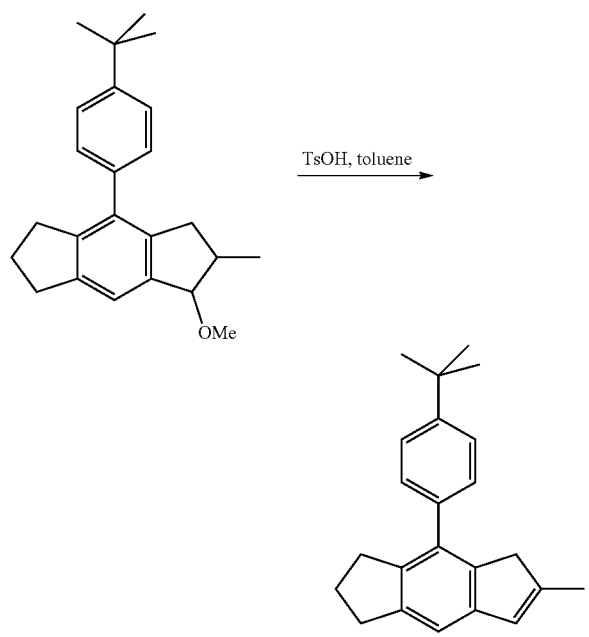

To a solution of 107 g 1-methoxy-2-methyl-4-(4-tert-butylphenyl)-1,2,3,5,6,7-hexahydro-s-indacene (prepared above) in 700 ml of toluene, 600 mg of TsOH was added, and the resulting solution was refluxed using Dean-Stark head for 10 min. After cooling to room temperature the reaction mixture was washed with 200 ml of 10% NaHCO$_3$. The organic layer was separated, and the aqueous layer was additionally extracted with 2×100 ml of dichloromethane. The combined organic extract was evaporated to dryness to give a red oil. The product was purified by flash-chromatography on silica gel 60 (40-63 µm; eluent: hexanes, then hexanes-dichloromethane=5:1, vol.) followed by vacuum distillation, b.p. 210-216° C./5-6 mm Hg. This procedure gave 77.1 g (80%) of 4-(4-tert-butylphenyl)-6-methyl-1,2,3,5-tetrahydro-s-indacene as a yellowish glassy material.

Anal. calc. for $C_{23}H_{26}$: C, 91.34; H, 8.66. Found: C, 91.47; H, 8.50.

$^1$H NMR (CDCl$_3$): δ 7.44-7.37 (m, 2H), 7.33-7.26 (m, 2H), 7.10 (s, 1H), 6.45 (br.s, 1H), 3.17 (s, 2H), 2.95 (t, J=7.3 Hz, 2H), 2.78 (t, J=7.3 Hz, 2H), 2.07 (s, 3H), 2.02 (quin, J=7.3 Hz, 2H), 1.37 (s, 9H). $^{13}$C{$^1$H} NMR (CDCl$_3$): δ 149.37, 145.54, 144.79, 142.91, 139.92, 138.05, 137.15, 134.06, 128.36, 127.02, 124.96, 114.84, 42.11, 34.53, 33.25, 32.16, 31.41, 25.96, 16.77.

2-methyl-[4-(4-tert-butylphenyl)-1,5,6,7-tetrahydro-s-indacen-1-yl](-chloro)-dimethylsilane

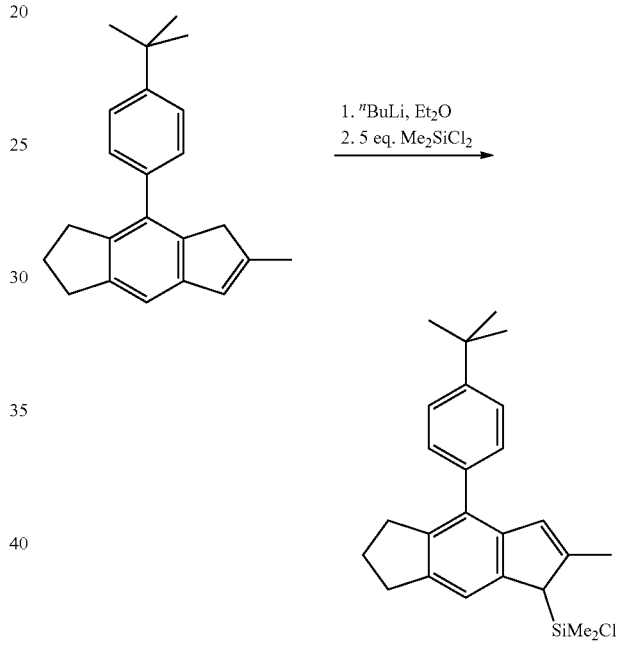

To a solution of 22.3 g (73.73 mmol) of 4-(4-tert-butylphenyl)-6-methyl-1,2,3,5-tetrahydro-s-indacene in 300 ml of ether, cooled to −50° C., 30.4 ml (73.87 mmol) of 2.43 M $^n$BuLi in hexanes was added in one portion. The resulting mixture was stirred overnight at room temperature, then the resulting suspension with a large amount of precipitate was cooled to −78° C. (wherein the precipitate was substantially dissolved to form an orange solution), and 47.6 g (369 mmol, 5 equiv.) of dichlorodimethylsilane was added in one portion. The obtained solution was stirred overnight at room temperature and then filtered through a glass frit (G4). The filtrate was evaporated to dryness to give 28.49 g (98%) of 2-methyl-[4-(4-tert-butylphenyl)-1,5,6,7-tetrahydro-s-indacen-1-yl](chloro) dimethylsilane as a colorless glass which was used without further purification.

$^1$H NMR (CDCl$_3$): δ 7-50-7.45 (m, 2H), 7.36 (s, 1H), 7.35-7.32 (m, 2H), 6.60 (s, 1H), 3.60 (s, 1H), 3.10-2.82 (m, 4H), 2.24 (s, 3H), 2.08 (quin, J=7.3 Hz, 2H), 1.42 (s, 9H), 0.48 (s, 3H), 0.22 (s, 3H). $^{13}$C{$^1$H} NMR (CDCl$_3$): δ 149.27, 144.41, 142.15, 141.41, 139.94, 139.83, 136.85, 130.19, 129.07, 126.88, 124.86, 118.67, 49.76, 34.55, 33.27, 32.32, 31.44, 26.00, 17.6

2-methyl-4-(4-tert-butylphenyl)-5-methoxy-6-tert-butyl-indan-1-one

2-methyl-5-tert-butyl-6-methoxy-7-(4-tert-butylphenyl)-1H-indene

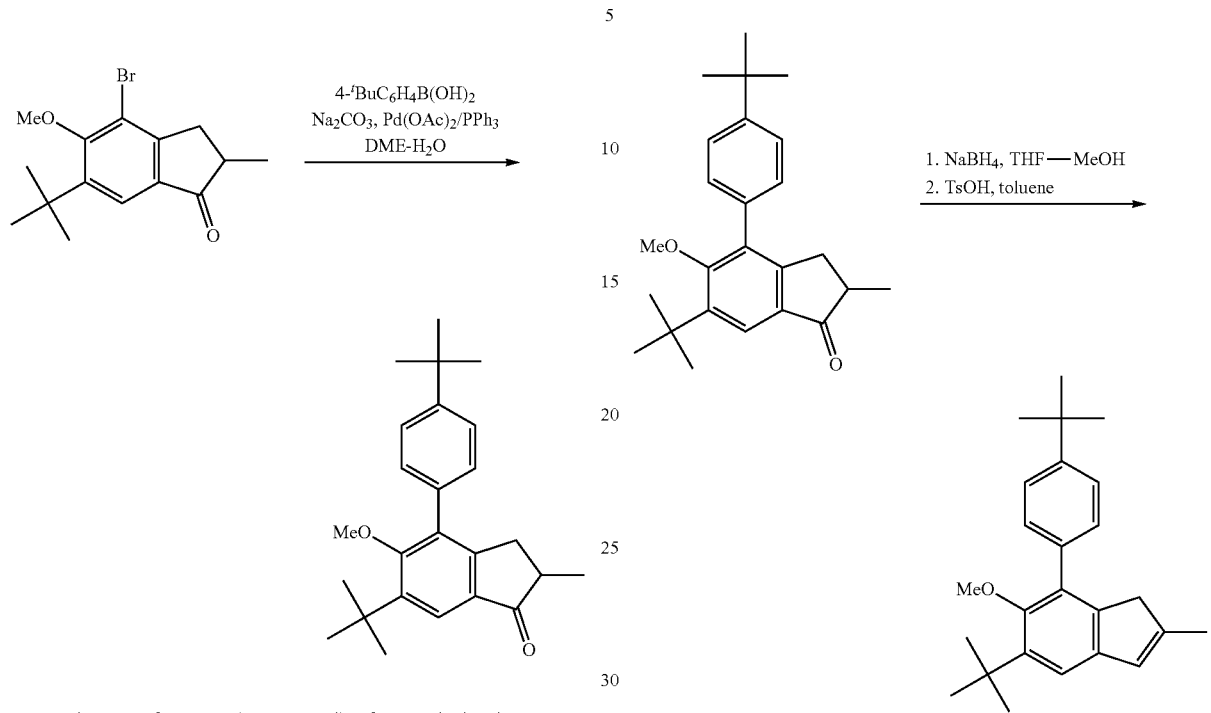

A mixture of 31.1 g (100 mmol) of 2-methyl-4-bromo-5-methoxy-6-tert-butyl-indan-1-one, 25.0 g (140 mmol) of 4-tert-butylphenylboronic acid, 29.4 g (280 mmol) of Na₂CO₃, 1.35 g (6.00 mmol, 6 mol. %) of Pd(OAc)₂, and 3.15 g (12.0 mmol, 12 mol. %) of PPh₃ in 130 ml of water and 380 ml of DME was refluxed for 6 h in argon atmosphere. The formed mixture was evaporated to dryness. To the residue 500 ml of dichloromethane and 500 ml of water were added. The organic layer was separated, the aqueous layer was additionally extracted with 100 ml of dichloromethane. The combined organic extract was dried over Na₂SO₄, evaporated to dryness, and the crude product was isolated using flash chromatography on silica gel 60 (40-63 μm; eluent: hexanes-dichloromethane=2:1, vol.). This crude product was recrystallized from n-hexane to give 29.1 g (81%) of a white solid.

Anal. calc. for $C_{25}H_{32}O_2$: C, 82.37; H, 8.85. Found: C, 82.26; H, 8.81.

$^1$H NMR (CDCl₃): δ 7.74 (s, 1H, 7-H in indenyl), 7.48 (d, J=8.0 Hz, 2H, 2,6-H in C₆H₄$^t$Bu), 7.33 (d, J=8.0 Hz, 2H, 3,5-H in C₆H₄$^t$Bu), 3.27 (s, 3H, OMe), 3.15 (dd, J=17.3 Hz, J=7.7 Hz, 1H, 3-H in indan-1-on), 2.67-2.59 (m, 1H, 2-H in indan-1-on), 2.48 (dd, J=17.3 Hz, J=3.7 Hz, 3'-H in indan-1-on), 1.42 (s, 9H, $^t$Bu in C₆H₄$^t$Bu), 1.38 (s, 9H, 6-$^t$Bu in indan-1-on), 1.25 (d, J=7.3 Hz, 3H, 2-Me in indan-1-one).

To a solution of 28.9 g (79.2 mmol) of 2-methyl-4-(4-tert-butylphenyl)-5-methoxy-6-tert-butyl-indan-1-one in 400 ml of THF cooled to 5° C. 5.00 g (132 mmol) of NaBH₄ was added. Further on, 100 ml of methanol was added dropwise to this mixture by vigorous stirring for ca. 7 h at 5° C. The resulting mixture was evaporated to dryness, and the residue wad partitioned between 500 ml of dichloromethane and 1000 ml of 0.5 M HCl. The organic layer was separated, the aqueous layer was additionally extracted with 100 ml of dichloromethane. The combined organic extract was evaporated to dryness to give a colorless oil. To a solution of this oil in 500 ml of toluene 1.0 g of TsOH was added. The formed mixture was refluxed with Dean-Stark head for 15 min and then cooled to room temperature using water bath. The resulting reddish solution was washed by 10% aqueous Na₂CO₃, the organic layer was separated, the aqueous layer was extracted with 2×100 ml of dichloromethane. The combined organic extract was dried over K₂CO₃ and then passed through short pad of silica gel 60 (40-63 μm). The silica gel pad was additionally washed with 50 ml of dichloromethane. The combined organic elute was evaporated to dryness to give a yellowish crystalline mass. The product was isolated by re-crystallization of this mass from 150 ml of hot n-hexane. Crystals precipitated at 5° C. were collected dried in vacuum. This procedure gave 23.8 g of white macrocrystalline 2-methyl-5-tert-butyl-6-methoxy-7-(4-tert-butylphenyl)-1H-indene. The mother liquor was evaporated to dryness and the residue was recrystallized from 20 ml of hot n-hexane in the same way. This procedure gave additional 2.28 g of the product. Thus, the total yield of the title product was 26.1 g (95%).

Anal. calc. for $C_{25}H_{32}O$: C, 86.15; H, 9.25. Found: C, 86.24; H, 9.40.

¹H NMR (CDCl₃): δ 7.44 (d, J=8.5 Hz, 2H, 2,6-H in C₆H₄ᵗBu), 7.40 (d, J=8.5 Hz, 2H, 3,5-H in C₆H₄ᵗBu), 7.21 (s, 1H, 4-H in indenyl), 6.43 (m, 1H, 3-H in indenyl), 3.20 (s, 3H, OMe), 3.15 (s, 2H, 1-H in indenyl), 2.05 (s, 3H, 2-Me in indenyl), 1.43 (s, 9H, 5-ᵗBu in indenyl), 1.37 (s, 9H, ᵗBu in C₆H₄ᵗBu).

[2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane

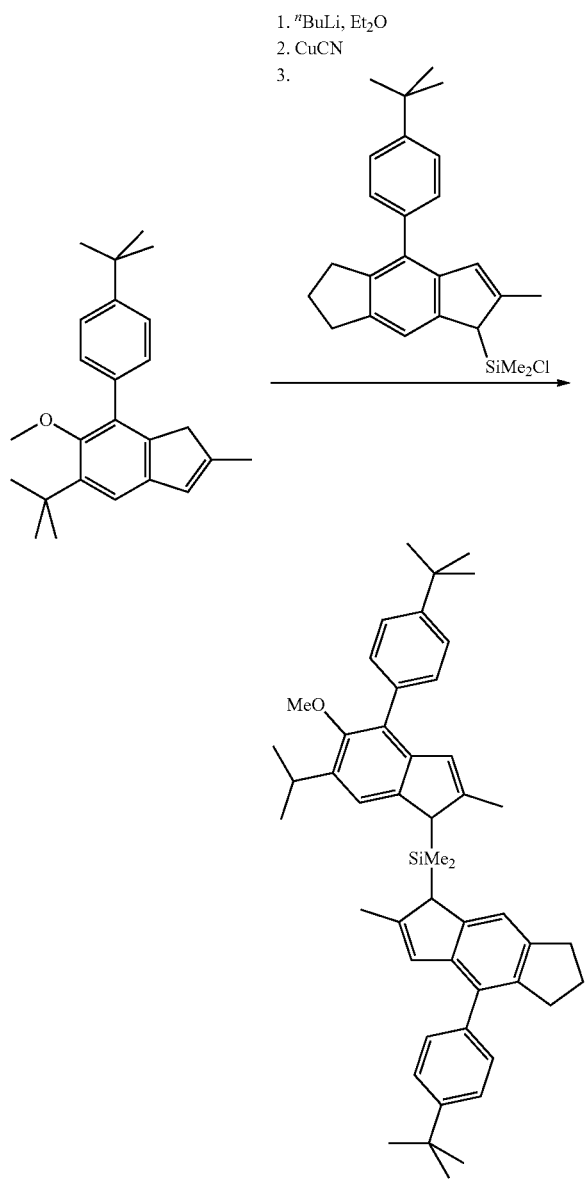

To a solution of 8.38 g (24.04 mmol) of 2-methyl-5-tert-butyl-7-(4-tert-butylphenyl)-6-methoxy-1H-indene in 150 ml of ether 9.9 ml (24.06 mmol) of 2.43 M ⁿBuLi in hexanes was added in one portion at −50° C. This mixture was stirred overnight at room temperature, then the resulting yellow solution with yellow precipitate was cooled to −50° C., and 150 mg of CuCN was added. The obtained mixture was stirred for 0.5 h at −25° C., then a solution of 9.5 g (24.05 mmol) of 2-methyl-[4-(4-tert-butylphenyl)-1,5,6,7-tetrahydro-s-indacen-1-yl](chloro)dimethylsilane in 150 ml of ether was added in one portion. This mixture was stirred overnight at room temperature, then filtered through a pad of silica gel 60 (40-63 μm), which was additionally washed by 2×50 ml of dichloromethane. The combined filtrate was evaporated under reduced pressure, and the residue was dried in vacuum at elevated temperature. This procedure gave 17.2 g (ca. 100%) of [2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (ca. 95% purity by NMR spectroscopy, approx. 1:1 mixture of stereoisomers) as yellowish glassy solid which was used in the next step without additional purification.

¹H NMR (CDCl₃): δ 7.50 (s, 0.5H), 7.48-7.41 (m, 6H), 7.37-7.33 (m, 2.5H), 7.26 (s, 0.5H), 7.22 (s, 0.5H), 6.57 and 6.50 (2s, sum 2H), 3.71, 3.69, 3.67 and 3.65 (4s, sum 2H), 3.23 and 3.22 (2s, sum 3H), 3.03-2.80 (m, 4H), 2.20, 2.16 and 2.14 (3s, sum 6H), 2.08-1.99 (m, 2H), 1.43 and 1.41 (2s, sum 9H), 1.39 (s, 18H), −0.19, −0.20, −0.21 and −0.23 (4s, sum 6H). ¹³C{¹H}NMR (CDCl₃): δ 155.49, 155.46, 149.41, 149.14, 149.11, 147.48, 147.44, 146.01, 145.77, 143.95, 143.91, 143.76, 143.71, 142.14, 142.10, 139.52, 139.42, 139.34, 139.29, 139.20, 139.16, 137.10, 137.05, 137.03, 135.20, 130.05, 130.03, 129.73, 129.11, 127.25, 127.22, 126.20, 126.13, 125.98, 125.94, 125.05, 124.82, 120.59, 120.52, 118.51, 118.26, 60.51, 60.48, 47.31, 46.89, 46.72, 35.14, 34.55, 33.34, 33.28, 32.30, 31.47, 31.45, 31.24, 31.19, 26.02, 25.99, 17.95, 17.86.

Anti-dimethylsilanediyl[2-methyl-4-(4-tert-butylphenyl)-5-methoxy-6-tert-butylinden-1-yl][2-methyl-4-(4-tert-butylphenyl)-1,5,6,7-tetrahydro-s-indacen-1-yl]zirconium dichloride

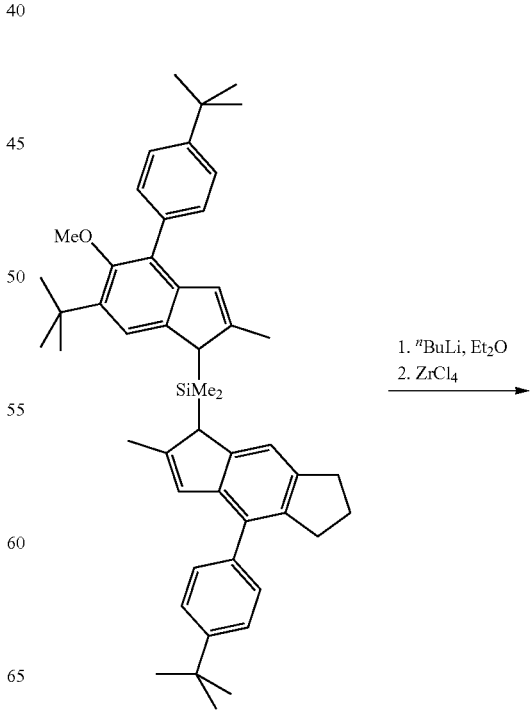

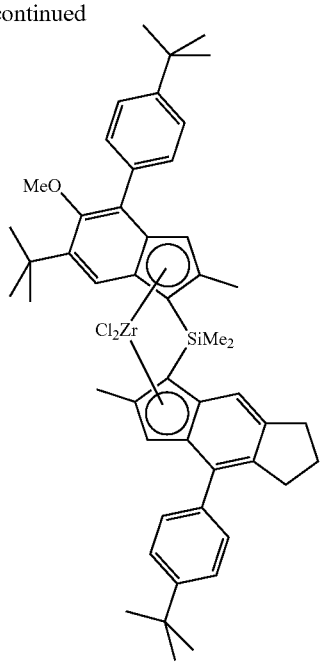

To a solution of 17.2 g (ca. 24.04 mol) of [2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (prepared above) in 250 ml of ether, cooled to −50° C., 19.8 ml (48.11 mmol) of 2.43 M $^n$BuLi in hexanes was added in one portion. This mixture was stirred for 4 h at room temperature, then the resulting cherry-red solution was cooled to −60° C., and 5.7 g (24.46 mmol) of ZrCl$_4$ was added. The reaction mixture was stirred for 24 h at room temperature to give red solution with orange precipitate. This mixture was evaporated to dryness. The residue was heated with 200 ml of toluene, and the formed suspension was filtered through glass frit (G4). The filtrate was evaporated to 90 ml. Yellow powder precipitated from this solution overnight at room temperature was collected, washed with 10 ml of cold toluene, and dried in vacuum. This procedure gave 4.6 g (22%) of a ca. 4 to 1 mixture of anti- and syn-zirconocenes. The mother liquor was evaporated to ca. 40 ml, and 20 ml of n-hexane was added. Orange powder precipitated from this solution overnight at room temperature was collected and dried in vacuum. This procedure gave 6.2 g (30%) of a ca. 1 to 1 mixture of anti- and syn-zirconocenes. Thus, the total yield of anti- and syn-zirconocenes isolated in this synthesis was 10.8 g (52%). Pure anti-zirconocene was obtained after crystallization of the above-described 4.6 g sample of a ca. 4 to 1 mixture of anti- and syn-zirconocenes from 20 ml of toluene. This procedure gave 1.2 g of pure anti-zirconocene.

Anti-dimethylsilanediyl[2-methyl-4-(4-tert-butylphenyl)-5-methoxy-6-tert-butylinden-1-yl][2-methyl-4-(4-tert-butylphenyl)-1,5,6,7-tetrahydro-s-indacen-1-yl]zirconium dichloride Anal. calc. for C$_{50}$H$_{60}$Cl$_2$OSiZr: C, 69.25; H, 6.97. Found: C, 69.43; H, 7.15.
$^1$H NMR (CDCl$_3$): δ 7.59-7.38 (group of m, 10H), 6.74 (s, 1H), 6.61 (s, 1H), 3.37 (s, 3H), 3.08-2.90 (m, 3H), 2.86-2.78 (m, 1H), 2.20 (s, 3H), 2.19 (s, 3H), 2.10-1.92 (m, 2H), 1.38 (s, 9H), 1.33 (s, 18H), 1.30 (s, 3H), 1.29 (s, 3H). $^{13}$C{$^1$H} NMR (CDCl$_3$,): δ 159.94, 150.05, 149.86, 144.79, 144.01, 143.20, 135.50, 135.41, 133.87, 133.73, 133.62, 132.82, 132.29, 129.23, 128.74, 126.95, 126.87, 125.36, 125.12, 122.93, 121.68, 121.32, 120.84, 117.90, 81.65, 81.11, 62.57, 35.74, 34.58, 33.23, 32.17, 31.37, 31.36, 30.32, 26.60, 18.39, 18.30, 2.65, 2.57$^2$.

$^2$ Resonance originated from one carbon atom was not found because of overlapping with some other signal.

Synthesis of Comparative Metallocene CC5

4-Bromo-2,6-dimethylaniline

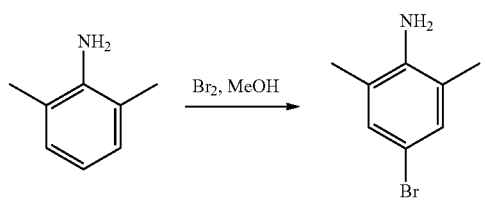

159.8 g (1.0 mol) of bromine was slowly (over 2 h) added to a stirred solution of 121.2 g (1.0 mol) of 2,6-dimethylaniline in 500 ml of methanol. The resulting dark-red solution was stirred overnight at room temperature, then poured into a cold solution of 140 g (2.5 mol) of potassium hydroxide in 1100 ml of water. The organic layer was separated, and the aqueous one was extracted with 500 ml of diethyl ether. The combined organic extract was washed with 1000 ml of water, dried over K$_2$CO$_3$, and evaporated in vacuum to give 202.1 g of 4-bromo-2,6-dimethylaniline (purity ca. 90%) as dark-red oil which crystallized upon standing at room temperature. This material was further used without additional purification.
$^1$H NMR (CDCl$_3$): δ 7.04 (s, 2H), 3.53 (br.s, 2H), 2.13 (s, 6H).

1-Bromo-3,5-dimethylbenzene

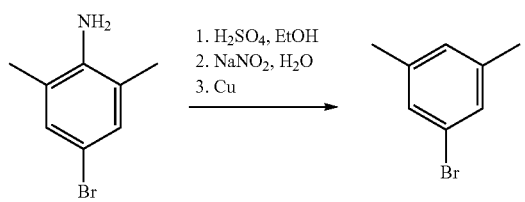

97 ml (1.82 mol) of 96% sulfuric acid was added dropwise to a solution of 134.7 g (ca. 673 mmol) of 4-bromo-2,6-dimethylaniline (prepared above, purity ca. 90%) in 1400 ml of 95% ethanol cooled to −10° C., at a such a rate to maintain the reaction temperature below 7° C. After the addition was complete, the solution was stirred at room temperature for 1 h. Then, the reaction mixture was cooled in an ice-bath, and a solution of 72.5 g (1.05 mol) of sodium nitrite in 150 ml of water was added dropwise over ca. 1 h. The formed solution was stirred at the same temperature for 30 min. Then the cooling bath was removed, and 18 g of copper powder was added. Upon completion of the rapid evolution of nitrogen additional portions (ca. 5 g each, ca. 50 g in total) of copper powder were added with 10 min intervals until gas evolution ceased completely. The reaction mixture was stirred at room temperature overnight, then filtered through a glass frit (G3), diluted with two-fold volume of water, and the crude product was extracted with 4×150 ml of dichloromethane. The combined extract was dried over K$_2$CO$_3$, evaporated to dryness, and then distilled in vacuum (b.p. 60-63° C./5 mm Hg) to give a yellowish liquid. This product was additionally purified by flash-chromatography on silica gel 60 (40-63 µm; eluent: hexane) and distilled once again (b.p. 51-52° C./3 mm Hg) to give 63.5 g (51%) of 1-bromo-3,5-dimethylbenzene as a colorless liquid.

$^1$H NMR (CDCl$_3$): δ 7.12 (s, 2H), 6.89 (s, 1H), 2.27 (s, 6H). $^{13}$C{$^1$H} NMR (CDCl$_3$): δ 139.81, 129.03, 128.61, 122.04, 20.99.

(3,5-Dimethylphenyl)boronic Acid

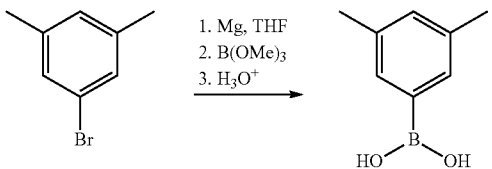

A solution of 3,5-dimethylphenylmagnesium bromide obtained from a solution of 190.3 g (1.03 mol) of 1-bromo-3,5-dimethylbenzene in 1000 ml of THF and 32 g (1.32 mol, 28% excess) of magnesium turnings was cooled to −78° C., and 104 g (1.0 mol) of trimethylborate was added in one portion. The resulting heterogeneous mixture was stirred overnight at room temperature. The boronic ester was hydrolyzed by careful addition of 1200 ml of 2 M HCl. 500 ml of diethyl ether was added, the organic layer was separated, and the aqueous layer was additionally extracted with 2×500 ml of diethyl ether. The combined organic extract was dried over Na$_2$SO$_4$ and then evaporated to dryness to give white mass. The latter was triturated with 200 ml of n-hexane, filtered through glass frit (G3), and the precipitate was dried in vacuo. This procedure gave 114.6 g (74%) of (3,5-dimethylphenyl)boronic acid.

Anal. calc. for C$_8$H$_{11}$BO$_2$: C, 64.06; H, 7.39. Found: C, 64.38; H, 7.72.

$^1$H NMR (DMSO-d$_6$): δ 7.38 (s, 2H), 7.00 (s, 1H), 3.44 (very br.s, 2H), 2.24 (s, 6H).

2-methyl-4-(3,5-dimethylphenyl)-5-methoxy-6-tert-butyl-indan-1-one

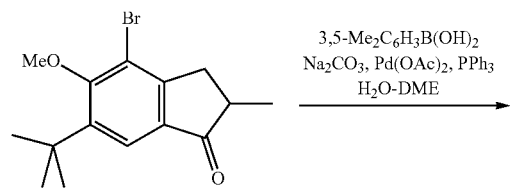

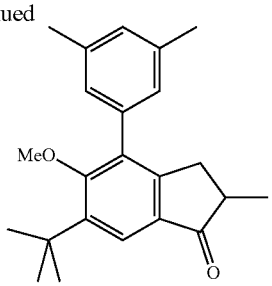

A mixture of 49.14 g (157.9 mmol) of 2-methyl-4-bromo-5-methoxy-6-tert-butylindan-1-one, 29.6 g (197.4 mmol, 1.25 eq.) of (3,5-dimethylphenyl)boronic acid, 45.2 g (427 mmol) of Na$_2$CO$_3$, 1.87 g (8.3 mmol, 5 mol. %) of Pd(OAc)$_2$, 4.36 g (16.6 mmol, 10 mol. %) of PPh$_3$, 200 ml of water, and 500 ml of 1,2-dimethoxyethane was refluxed for 6.5 h. DME was evaporated on a rotary evaporator, 600 ml of water and 700 ml of dichloromethane were added to the residue. The organic layer was separated, and the aqueous one was additionally extracted with 200 ml of dichloromethane. The combined extract was dried over K$_2$CO$_3$ and then evaporated to dryness to give a black oil. The crude product was purified by flash chromatography on silica gel 60 (40-63 µm, hexane-dichloromethane=1:1, vol., then, 1:3, vol.) to give 48.43 g (91%) of 2-methyl-4-(3,5-dimethylphenyl)-5-methoxy-6-tert-butylindan-1-one as a brownish oil.

Anal. calc. for C$_{23}$H$_{28}$O$_2$: C, 82.10; H, 8.39. Found: C, 82.39; H, 8.52.

$^1$H NMR (CDCl$_3$): δ 7.73 (s, 1H), 7.02 (s, 3H), 7.01 (s, 3H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz), 2.36 (s, 6H), 1.42 (s, 9H), 1.25 (d, J=7.5 Hz, 3H). $^{13}$C{$^1$H} NMR (CDCl$_3$): δ 208.90, 163.50, 152.90, 143.32, 138.08, 136.26, 132.68, 130.84, 129.08, 127.18, 121.30, 60.52, 42.17, 35.37, 34.34, 30.52, 21.38, 16.40.

2-methyl-5-tert-butyl-6-methoxy-7-(3,5-dimethylphenyl)-1H-indene

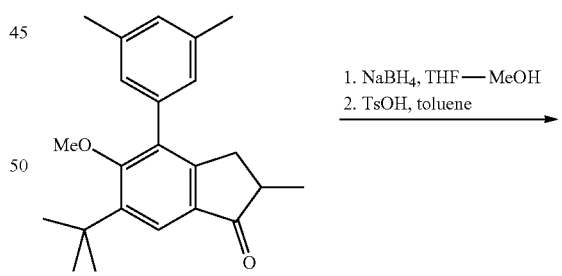

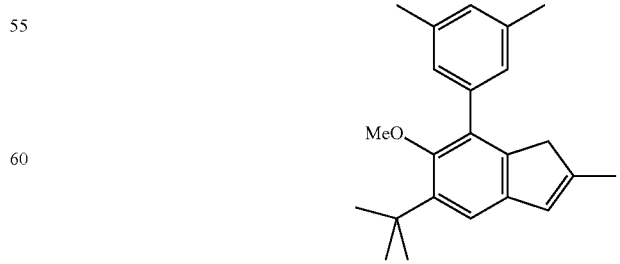

8.2 g (217 mmol) of NaBH$_4$ was added to a solution of 48.43 g (143.9 mmol) of 2-methyl-4-(3,5-dimethylphenyl)-

5-methoxy-6-tert-butylindan-1-one in 300 ml of THF cooled to 5° C. Then, 150 ml of methanol was added dropwise to this mixture by vigorous stirring for ca. 7 h at 5° C. The resulting mixture was evaporated to dryness, and the residue was partitioned between 500 ml of dichloromethane and 500 ml of 2 M HCl. The organic layer was separated, the aqueous layer was additionally extracted with 100 ml of dichloromethane. The combined organic extract was evaporated to dryness to give a slightly yellowish oil. To a solution of this oil in 600 ml of toluene 400 mg of TsOH was added, this mixture was refluxed with Dean-Stark head for 10 min and then cooled to room temperature using a water bath. The formed solution was washed by 10% Na$_2$CO$_3$, the organic layer was separated, the aqueous layer was extracted with 150 ml of dichloromethane. The combined organic extract was dried over K$_2$CO$_3$ and then passed through a short layer of silica gel 60 (40-63 μm). The silica gel layer was additionally washed by 100 ml of dichloromethane. The combined organic elute was evaporated to dryness, and the resulting oil was dried in vacuum at elevated temperature. This procedure gave 45.34 g (98%) of 2-methyl-5-tert-butyl-6-methoxy-7-(3,5-dimethylphenyl)-1H-indene which was used without additional purification.

Anal. calc. for C$_{23}$H$_{28}$O: C, 86.20; H, 8.81. Found: C, 86.29; H, 9.07.

$^1$H NMR (CDCl$_3$): δ 7.20 (s, 1H), 7.08 (br.s, 1H), 6.98 (br.s, 1H), 6.42 (m, 1H), 3.25 (s, 3H), 3.11 (s, 2H), 2.36 (s, 6H), 2.06 (s, 3H), 1.43 (s, 9H). $^{13}$C{$^1$H} NMR (CDCl$_3$): δ 154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

[2-methyl-4-(3,5-dimethylphenyl)-5-methoxy-6-tert-Butyl-1H-inden-1-yl]-(chloro)-dimethylsilane

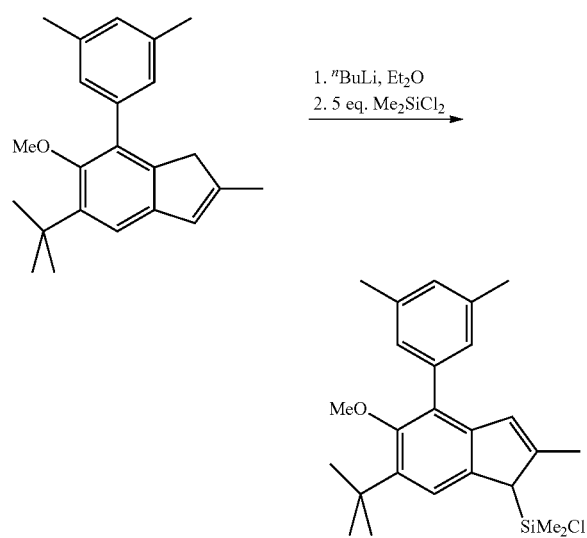

To a solution of 9.0 g (28.08 mmol) of 2-methyl-5-tert-butyl-6-methoxy-7-(3,5-dimethylphenyl)-1H-indene in 150 ml of ether, cooled to −50° C., 11.6 ml (28.19 mmol) of 2.43 M $^n$BuLi in hexanes was added in one portion. The resulting mixture was stirred for 6 h at room temperature, then the obtained yellow suspension was cooled to −60° C., and 18.1 g (140.3 mmol, 5 equiv.) of dichlorodimethylsilane was added in one portion. The obtained solution was stirred overnight at room temperature and then filtered through a glass frit (G3). The filtrate was evaporated to dryness to give [2-methyl-4-(3,5-dimethylphenyl)-5-methoxy-6-tert-Butyl-1H-inden-1-yl](chloro)dimethylsilane as a slightly yellowish oil which was further used without an additional purification.

$^1$H NMR (CDCl$_3$): δ 7.38 (s, 1H), 7.08 (s, 2H), 6.98 (s, 1H), 6.43 (s, 1H), 3.53 (s, 1H), 3.25 (s, 3H), 2.37 (s, 6H), 2.19 (s, 3H), 1.43 (s, 9H), 0.43 (s, 3H), 0.17 (s, 3H). $^{13}$C{$^1$H} NMR (CDCl$_3$): δ 155.78, 145.88, 143.73, 137.98, 137.56, 137.49, 136.74, 128.32, 127.86, 127.55, 126.64, 120.86, 60.46, 49.99, 35.15, 31.16, 21.41, 17.55, 1.11, −0.58.

1-methoxy-2-methyl-4-(3,5-Dimethylphenyl)-1,2,3,5,6,7-hexahydro-s-indacene

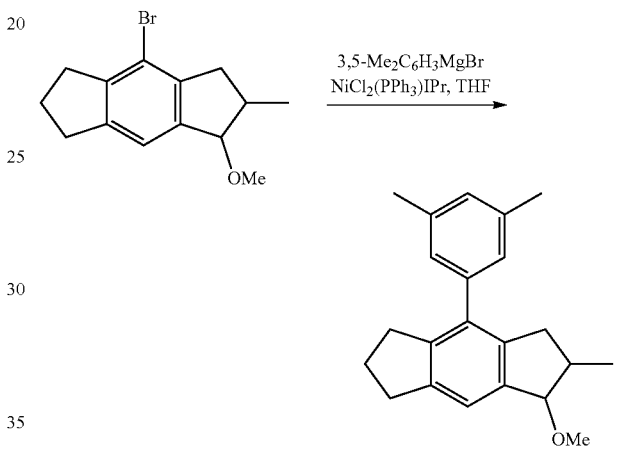

To a mixture of 2.0 g (2.56 mmol, 1.8 mol. %) of NiCl$_2$(PPh$_3$)IPr and 40.0 g (142.3 mmol) of 4-bromo-1-methoxy-2-methyl-1,2,3,5,6,7-hexahydro-s-indacene, 200 ml (200 mmol, 1.4 eq) of 3,5-dimethylphenylmagnesium bromide 1.0 M in THF was added. The resulting solution was refluxed for 3 h, then cooled to room temperature, and 400 ml of water followed by 500 ml of 1.0 M HCl solution were added. Further on, this mixture was extracted with 600 ml of dichloromethane, the organic layer was separated, and the aqueous layer was extracted with 2×100 ml of dichloromethane. The combined organic extract was evaporated to dryness to give a slightly greenish oil. The product was isolated by flash-chromatography on silica gel 60 (40-63 μm; eluent: hexanes-dichloromethane=2:1, vol., then 1:2, vol.). This procedure gave 43.02 g (99%) of 1-methoxy-2-methyl-4-(3,5-dimethylphenyl)-1,2,3,5,6,7-hexahydro-s-indacene as a colorless thick oil as a mixture of two diastereoisomers.

Anal. calc. for C$_{22}$H$_{26}$O: C, 86.23; H, 8.55. Found: C, 86.07; H, 8.82.

$^1$H NMR (CDCl$_3$), Syn-isomer: δ 7.21 (s, 1H), 6.94 (br.s, 1H), 6.90 (br.s, 2H), 4.48 (d, J=5.5 Hz, 1H), 3.43 (s, 3H), 2.94 (t, J=7.5 Hz, 2H), 2.87-2.65 (m, 3H), 2.63-2.48 (m, 2H), 2.33 (s, 6H), 2.02 (quin, J=7.5 Hz, 2H), 1.07 (d, J=6.7 Hz, 3H); Anti-isomer: δ 7.22 (s, 1H), 6.94 (br.s, 1H), 6.89 (br.s, 2H), 4.38 (d, J=4.0 Hz, 1H), 3.48 (s, 3H), 3.06 (dd, J=16.0 Hz, J=7.5 Hz, 1H), 2.93 (t, J=7.3 Hz, 2H), 2.75 (td, J=7.3 Hz, J=3.2 Hz, 2H), 2.51-2.40 (m, 1H), 2.34 (s, 6H), 2.25 (dd, J=16.0 Hz, J=5.0 Hz, 1H), 2.01 (quin, J=7.3 Hz, 2H), 1.11 (d, J=7.1 Hz, 3H). $^{13}$C{$^1$H} NMR (CDCl$_3$), Syn-isomer: δ 142.69, 142.49, 141.43, 139.97, 139.80, 137.40, 135.46, 128.34, 126.73, 120.09, 86.29, 56.76, 39.43, 37.59, 33.11, 32.37, 25.92, 21.41, 13.73; Anti-isomer: δ 143.11, 142.72, 140.76, 139.72, 139.16, 137.37, 135.43, 128.29, 126.60, 119.98, 91.53, 56.45, 40.06, 37.65, 33.03, 32.24, 25.88, 21.36, 19.36.

4-(3,5-Dimethylphenyl)-6-methyl-1,2,3,5-tetrahydro-s-indacene

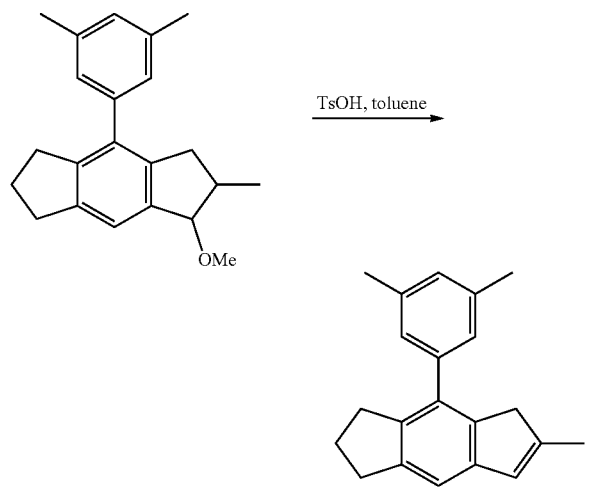

To the solution of 43.02 g (140.4 mmol) 1-methoxy-2-methyl-4-(3,5-dimethylphenyl)-1,2,3,5,6,7-hexahydro-s-indacene in 600 ml of toluene, 200 mg of TsOH was added, and the resulting solution was refluxed using Dean-Stark head for 15 min. After cooling to room temperature the reaction mixture was washed with 200 ml of 10% NaHCO$_3$. The organic layer was separated, and the aqueous layer was additionally extracted with 300 ml of dichloromethane. The combined organic extract was evaporated to dryness to give light orange oil. The product was isolated by flash-chromatography on silica gel 60 (40-63 µm; eluent: hexanes, then hexanes-dichloromethane=10:1, vol.). This procedure gave 35.66 g (93%) of 4-(3,5-dimethylphenyl)-6-methyl-1,2,3,5-tetrahydro-s-indacene as a slightly yellowish oil which spontaneously solidified to form a white mass.

Anal. calc. for $C_{21}H_{22}$: C, 91.92; H, 8.08. Found: C, 91.78; H, 8.25.

$^1$H NMR (CDCl$_3$): δ 7.09 (s, 1H), 6.98 (br.s, 2H), 6.96 (br.s, 1H), 6.44 (m, 1H), 3.14 (s, 2H), 2.95 (t, J=7.3 Hz, 2H), 2.76 (t, J=7.3 Hz, 2H), 2.35 (s, 6H), 2.07 (s, 3H), 2.02 (quin, J=7.3 Hz, 2H). $^{13}$C{$^1$H} NMR (CDCl$_3$): δ 145.46, 144.71, 142.81, 140.17, 139.80, 137.81, 137.50, 134.33, 128.35, 127.03, 126.48, 114.83, 42.00, 33.23, 32.00, 25.87, 21.38, 16.74.

[2-methyl-4-(3,5-dimethylphenyl)-5-methoxy-6-tert-Butyl-1H-inden-1-yl][2-methyl-4-(3,5-dimethylphenyl)-1,5,6,7-tetrahydro-s-indacen-1-yl]dimethylsilane

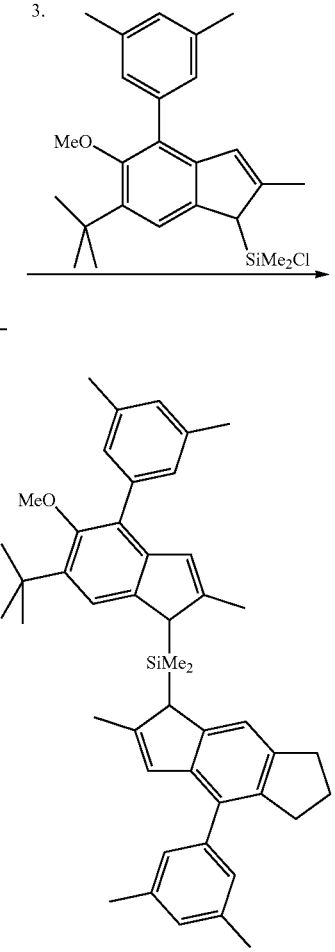

To a solution of 7.71 g (28.1 mmol) of 4-(3,5-dimethylphenyl)-6-methyl-1,2,3,5-tetrahydro-s-indacene in a mixture of 150 ml of ether and 20 ml of THF 11.6 ml (28.19 mmol) of 2.43 M $^n$BuLi in hexanes was added in one portion at −50° C. This mixture was stirred for 6 h at room temperature, then the resulting orange solution was cooled to −50° C., and 150 mg of CuCN was added. The obtained mixture was stirred for 0.5 h at −25° C., then a solution of [2-methyl-4-(3,5-dimethylphenyl)-5-methoxy-6-tert-butyl-1H-inden-1-yl](chloro)dimethylsilane (prepared above, ca. 28.08 mmol) in 150 ml of ether was added in one portion. This mixture was stirred overnight at room temperature, then filtered through a pad of silica gel 60 (40-63 µm), which was additionally washed by 2×50 ml of dichloromethane. The combined filtrate was evaporated under reduced pressure to give a yellow oil. The product was isolated by flash-chromatography on silica gel 60 (40-63 µm; eluent: hexanes-dichloromethane=10:1, vol., then 5:1, vol.). This procedure gave 11.95 g (65%) of [2-methyl-4-(3,5-dimethylphenyl)-5-methoxy-6-tert-Butyl-1H-inden-1-yl][2-methyl-4-(3,5-dimethylphenyl)-1,5,6,7-tetrahydro-s-indac- en-1-yl]dimethylsilane (as ca. 1:1 mixture of stereoisomers) as a yellowish glassy solid.

Anal. calc. for $C_{46}H_{54}OSi$: C, 84.87; H, 8.36. Found: C, 85.12; H, 8.59.

$^1$H NMR (CDCl$_3$): δ 7.48 and 7.33 (2s, sum 1H), 7.26-7.18 (m, 1H), 7.16-7.07 (m, 2H), 7.04-6.95 (m, 4H), 6.51 and 6.45 (2s, sum 2H), 3.69 and 3.65 (2s, sum 2H), 3.28 and 3.26 (2s, sum 3H), 3.01-2.74 (m, 4H), 2.38 ad 2.37 (2s, sum 12H), 2.20 and 2.15 (2s, sum 6H), 2.09-1.97 (m, 2H), 1.43 and 1.42 (2s, sum 9H), −0.17, −0.18, −0.19 and −0.24 (4s, sum 6H). $^{13}C\{^1H\}$NMR (CDCl$_3$): δ 155.29, 147.45, 147.39, 145.99, 145.75, 143.93, 143.90, 143.72, 143.69, 142.06, 142.01, 140.08, 140.06, 139.46, 139.37, 139.26, 139.03, 139.00, 138.24, 137.50, 137.34, 137.07, 136.99, 130.39, 128.23, 128.14, 127.92, 127.50, 127.46, 127.26, 126.12, 126.05, 125.99, 125.94, 120.55, 120.51, 118.46, 118.27, 60.49, 47.33, 46.86, 46.76, 35.14, 33.33, 33.28, 32.18, 31.26, 31.21, 25.95, 25.91, 21.44, 17.96, 17.88, −5.27, −5.39, −5.50, −5.82.

Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride

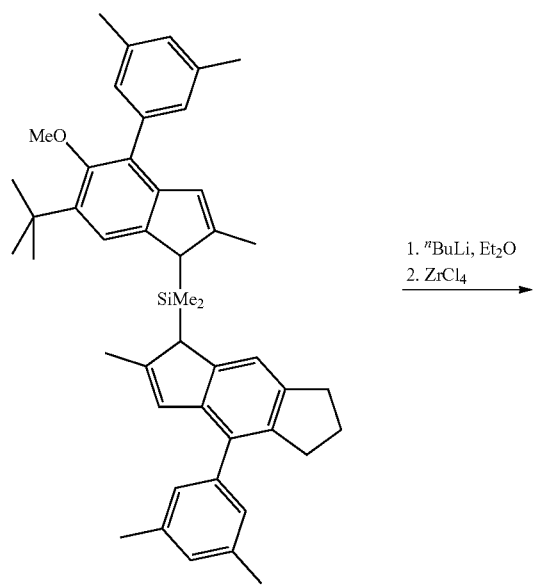

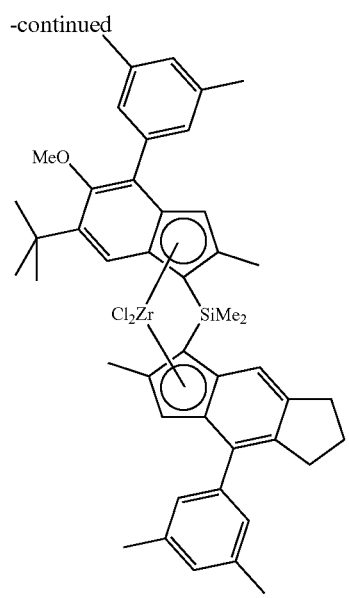

To a solution of 11.95 g (18.36 mol) of [2-methyl-4-(3,5-dimethylphenyl)-5-methoxy-6-tert-butyl-1H-inden-1-yl][2-methyl-4-(3,5-dimethylphenyl)-1,5,6,7-tetrahydro-s-indacen-1-yl]dimethylsilane (prepared above) in 200 ml of ether, cooled to −50° C., 15.1 ml (35.7 mmol) of 2.43 M $^n$BuLi in hexanes was added in one portion. This mixture was stirred for 3 h at room temperature, then the resulting red solution was cooled to −78° C., and 4.28 g (18.37 mmol) of ZrCl$_4$ was added. The reaction mixture was stirred for 24 h at room temperature to give light red solution with orange precipitate. This mixture was evaporated to dryness. The residue was treated with 250 ml of hot toluene, and the formed suspension was filtered through glass frit (G4). The filtrate was evaporated to 40 ml. Red powder precipitated from this solution overnight at room temperature was collected, washed with 10 ml of cold toluene, and dried in vacuum. This procedure gave 0.6 g of syn-zirconocene. The mother liquor was evaporated to ca. 35 ml, and 15 ml of n-hexane was added to the warm solution. The red powder precipitated from this solution overnight at room temperature was collected and dried in vacuum. This procedure gave 3.49 g syn-zirconocene. The mother liquor was evaporated to ca. 20 ml, and 30 ml of n-hexane was added to the warm solution. The yellow powder precipitated from this solution overnight at room temperature was collected and dried in vacuum. This procedure gave 4.76 g anti-zirconocene as a solvate with toluene (×0.6 toluene) contaminated with ca. 2% of syn-isomer. Thus, the total yield of syn- and anti-zirconocenes isolated in this synthesis was 8.85 g (59%).

Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride:

Anal. calc. for $C_{46}H_{52}Cl_2OSiZr\times0.6C_7H_8$: C, 69.59; H, 6.61. Found: C, 69.74; H, 6.68.

¹H NMR (CDCl₃): δ 7.47 (s, 1H), 7.40 (s, 1H), 7.37-7.03 (m, 4H), 6.95 (s, 2H), 6.71 (s, 1H), 6.55 (s, 1H), 3.43 (s, 3H), 3.03-2.96 (m, 2H), 2.96-2.87 (m, 1H), 2.87-2.76 (m, 1H), 2.34 and 2.33 (2s, sum 12H), 2.19 and 2.18 (2s, sum 6H), 2.06-1.94 (m, 2H), 1.38 (s, 9H), 1.28 (s, 3H), 1.27 (s, 3H). ¹³C{¹H} NMR (CDCl₃,): δ 159.73, 144.59, 143.99, 143.00, 138.26, 137.84, 137.59, 136.80, 135.35, 133.85, 133.63, 132.95, 132.52, 128.90, 128.80, 127.40, 126.95, 126.87, 126.65, 122.89, 121.61, 121.53, 120.82, 117.98, 81.77, 81.31, 62.62, 35.73, 33.20, 32.12, 30.37, 26.49, 21.47, 21.38, 18.40, 18.26, 2.64, 2.54.

Syn-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride Anal. calc. for C₄₆H₅₂C₂OSiZr: C, 68.11; H, 6.46. Found: C, 68.37; H, 6.65.

¹H NMR (CDCl₃): δ 7.51 (s, 1H), 7.39 (s, 1H), 7.36-6.99 (m, 4H), 6.95 (s, 2H), 6.60 (s, 1H), 6.44 (s, 1H), 3.27 (s, 3H), 2.91-2.75 (m, 4H), 2.38 and 2.34 (2s, sum 18H), 1.99-1.87 (m, 1H), 1.87-1.74 (m, 1H), 1.42 (s, 3H), 1.36 (s, 9H), 1.19 (s, 3H). ¹³C{¹H} NMR (CDCl₃,): δ 158.74, 143.41, 142.84, 142.31, 138.30, 137.77, 137.55, 136.85, 135.87, 135.73, 134.99, 134.75, 131.64, 128.83, 128.76, 127.97, 127.32, 126.82, 126.22, 123.91, 121.35, 121.02, 120.85, 118.56, 83.47, 83.08, 62.32, 35.53, 33.33, 31.96, 30.33, 26.53, 21.45 (two resonances), 18.56, 18.43, 2.93, 2.65.

Synthesis of Comparative Metallocene CC6 rac-Me₂Si(2-Me-4-Ph-5-OMe-6-tBuInd)₂ZrCl₂ was synthesized according to the procedure as described in WO 2007/116034, page 30 ff, complex A-1

Synthesis of Metallocene IC1 for Inventive Examples

Bis[2-methyl-4-(4-tert-butylphenyl)-5-methoxy-6-tert-butyl-1H-inden-1-yl]dimethylsilane

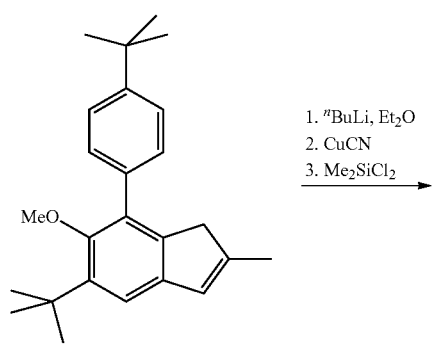

1. ⁿBuLi, Et₂O
2. CuCN
3. Me₂SiCl₂
→

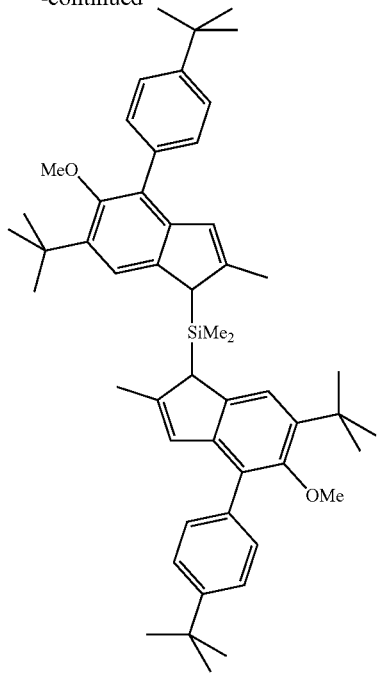

20.6 ml (50.06 mmol) of 2.43 M nBuLi in hexanes was added in one portion to a solution of 17.43 g (50.01 mmol) of 2-methyl-5-tert-butyl-7-(4-tert-butylphenyl)-6-methoxy-1H-indene in 300 ml of ether at −50° C. This mixture was stirred overnight at room temperature, then the resulting yellow solution with a lot of yellow precipitate was cooled to −60° C., and 225 mg of CuCN was added. The obtained mixture was stirred for 30 min at −25° C., and then 3.23 g (25.03 mmol) of dichlorodimethylsilane was added in one portion. Further on, this mixture was stirred overnight at ambient temperature. This solution was filtered through a pad of silica gel 60 (40-63 μm) which was additionally washed with 2×50 ml of dichloromethane. The combined filtrate was evaporated under reduced pressure, and the residue was dried in vacuum at elevated temperature. This procedure gave 18.76 g (ca. 100%, purity ca. 85%) of bis[2-methyl-4-(4-tert-butylphenyl)-5-methoxy-6-tert-butyl-1H-inden-1-yl]dimethylsilane (a ca. 7:3 mixture of diastereoisomers) as a white powder.

1H NMR (CDCl3): δ 7.50-7.39 (m, 4H), 7.32 and 7.25 (2s, sum 1H), 6.48 and 6.46 (2s, sum 1H), 3.61 and 3.58 (2s, sum 1H), 3.21 (s, 3H), 2.12 and 2.06 (2s, sum 3H), 1.43, 1.42, 1.39 and 1.38 (4s, sum 18H), −0.18 and −0.19 (2s, sum 3H). 13C{1H} NMR (CDCl3): δ 155.50, 149.45, 147.55, 147.20, 143.70, 139.37, 137.09, 135.22, 135.19, 129.74, 127.26, 126.01, 125.94, 125.04, 120.58, 120.36, 60.48, 47.42, 47.16, 35.15, 34.56, 31.47, 31.27, 31.20, 17.75, −4.92, −5.22, −5.32.

Rac-dimethylsilanediyl-bis[2-methyl-4-(4-tert-butylphenyl)-5-methoxy-6-tert-butyl-inden-1-yl] zirconium dichloride

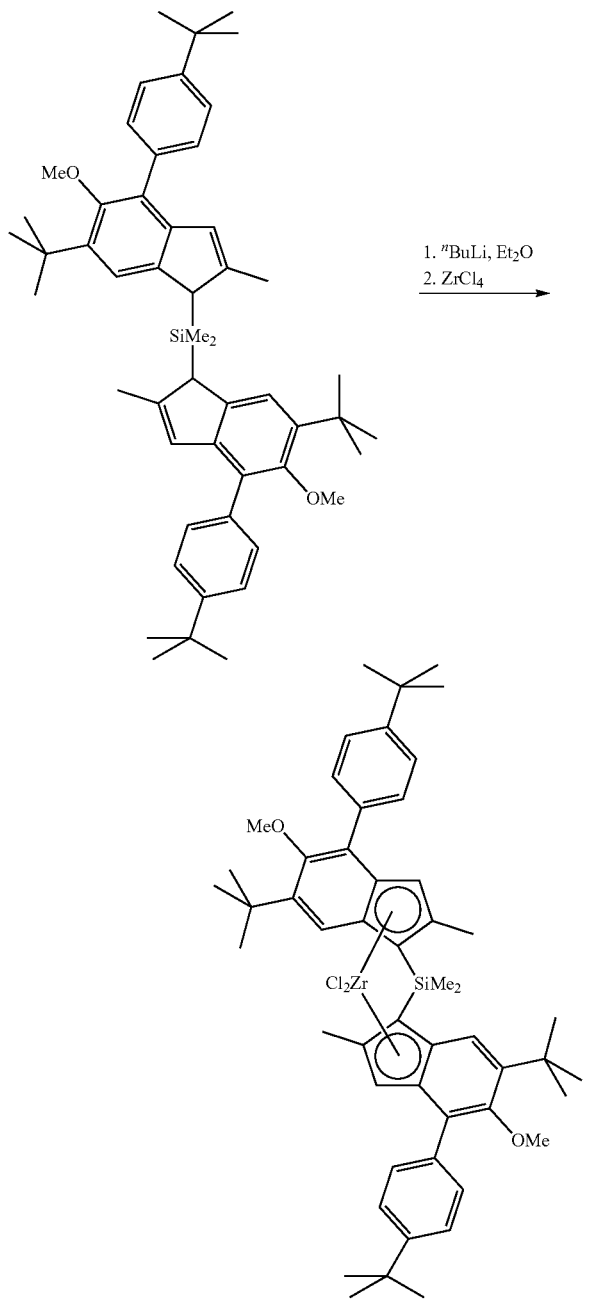

19.0 ml (46.17 mmol) of 2.43 M nBuLi in hexanes was added in one portion to a solution of 17.3 g (22.97 mmol) of bis[2-methyl-4-(4-tert-butylphenyl)-5-methoxy-6-tert-butyl-1H-inden-1-yl]dimethylsilane in 320 ml of ether cooled to −60° C. This mixture was stirred overnight at room temperature, then the resulting yellow solution with a lot of yellow precipitate was cooled to −60° C., and 5.36 g (23.0 mmol) of ZrCl4 was added. The reaction mixture was stirred for 24 h at room temperature to give orange solution with a large amount of orange precipitate. This precipitate was filtered off (G4), heated with 300 ml of methylcyclohexane, and the formed suspension was filtered while hot from LiCl through glass frit (G4). Yellow powder precipitated overnight at room temperature from the filtrate was filtered off (G3) and then dried in vacuum. This procedure gave 3.98 g of rac-complex, contaminated with ca. 3% of meso-form. This mixture was dissolved in 40 ml of hot toluene, the formed solution was evaporated in vacuum to ca. 10 ml. Yellow powder precipitated at room temperature was filtered off (G3) and then dried in vacuum to give 3.41 g (16%) of pure rac-dimethylsilanediyl-bis[2-methyl-4-(4-tert-butylphenyl)-5-methoxy-6-tert-butyl-inden-1-yl]zirconium dichloride (content of meso-form <1%). The ether mother liquor was evaporated to dryness, and the residue was dissolved in 100 ml of warm toluene. This solution was filtered through glass frit (G4), and the obtained filtrate was evaporated to ca. 40 ml. Yellow powder precipitated from this solution at room temperature was immediately filtered off and dried in vacuum to give 2.6 g of a ca. 5 to 1 mixture of rac- and meso-zirconocenes (in favor to rac-). All mother liquors were combined, evaporated to a volume ca. 20 ml, and the residue was triturated with 100 ml of n-hexane. The formed orange powder was collected and dried in vacuum. This procedure gave 5.8 g of a mixture of rac- and meso-zirconocenes. Thus, the total yield of rac- and meso-zirconocenes isolated in this synthesis was 11.81 g (56%).

Rac-dimethylsilanediyl-bis[2-methyl-4-(4-tert-butylphenyl)-5-methoxy-6-tert-butyl-inden-1-yl] zirconium dichloride Anal. calc. for C52H66Cl2O2SiZr: C, 68.39; H, 7.28. Found: C, 68.70; H, 7.43.

1H NMR (CDCl3): δ 7.63-7.52 (m, 2H), 7.50 (s, 1H), 7.44 (d, J=8.1 Hz, 2H), 6.63 (s, 1H), 3.39 (s, 3H), 2.16 (s, 3H), 1.38 (s, 9H), 1.33 (s, 9H), 1.29 (s, 3H). 13C{1H} NMR (CDCl3): δ 160.00, 150.16, 144.25, 135.07, 133.79, 133.70, 129.25, 127.08, 125.39, 123.09, 121.32, 120.81, 81.57, 62.61, 35.78, 34.61, 31.39, 30.33, 18.37, 2.41

2-methyl-5-tert-butyl-6-methoxy-7-(4-tert-butylphenyl)-1H-indene was Prepared as Described for Comparative Complex CC4

Synthesis of Metallocene IC2 for Inventive Examples

(3,5-Dimethylphenyl)boronic Acid

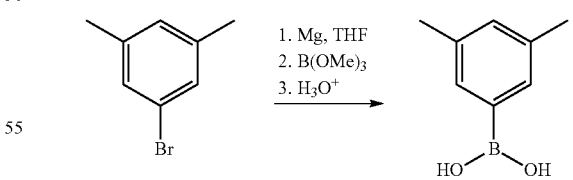

A solution of 3,5-dimethylphenylmagnesium bromide obtained from a solution of 190.3 g (1.03 mol) of 1-bromo-3,5-dimethylbenzene in 1000 ml of THF and 32 g (1.32 mol, 28% excess) of magnesium turnings was cooled to −78° C., and 104 g (1.0 mol) of trimethylborate was added in one portion. The resulting heterogeneous mixture was stirred overnight at room temperature. The boronic ester was hydrolyzed by careful addition of 1200 ml of 2 M HCl. 500 ml of diethyl ether was added, the organic layer was separated, and the aqueous layer was additionally extracted with 2×500 ml of diethyl ether. The combined organic extract was dried over Na$_2$SO$_4$ and then evaporated to dryness to give white mass. The latter was triturated with 200 ml of n-hexane, filtered through glass frit (G3), and the precipitate was dried in vacuo. This procedure gave 114.6 g (74%) of (3,5-dimethylphenyl)boronic acid.

Anal. calc. for C$_8$H$_{11}$BO$_2$: C, 64.06; H, 7.39. Found: C, 64.38; H, 7.72.

$^1$H NMR (DMSO-d$_6$): δ 7.38 (s, 2H), 7.00 (s, 1H), 3.44 (very br.s, 2H), 2.24 (s, 6H).

6-tert-Butyl-4-(3,5-dimethylphenyl)-5-methoxy-2-methylindan-1-one

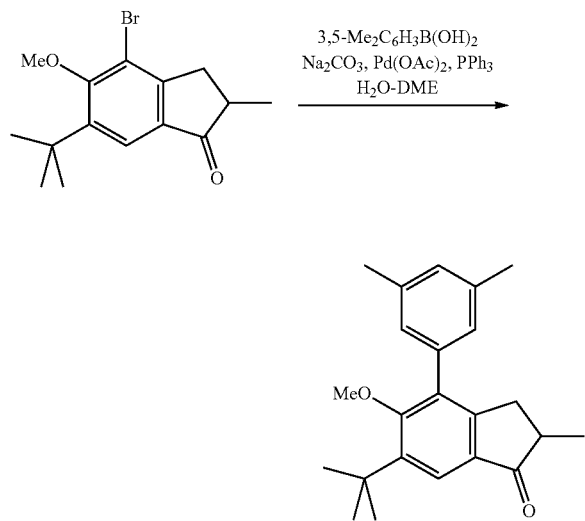

A mixture of 49.14 g (157.9 mmol) of 4-bromo-6-tert-butyl-5-methoxy-2-methylindan-1-one, 29.6 g (197.4 mmol, 1.25 eq.) of (3,5-dimethylphenyl)boronic acid, 45.2 g (427 mmol) of Na$_2$CO$_3$, 1.87 g (8.3 mmol, 5 mol. %) of Pd(OAc)$_2$, 4.36 g (16.6 mmol, 10 mol. %) of PPh$_3$, 200 ml of water, and 500 ml of 1,2-dimethoxyethane was refluxed for 6.5 h. DME was evaporated on a rotary evaporator, 600 ml of water and 700 ml of dichloromethane were added to the residue. The organic layer was separated, and the aqueous one was additionally extracted with 200 ml of dichloromethane. The combined extract was dried over K$_2$CO$_3$ and then evaporated to dryness to give a black oil. The crude product was purified by flash chromatography on silica gel 60 (40-63 μm, hexane-dichloromethane=1:1, vol., then, 1:3, vol.) to give 48.43 g (91%) of 6-tert-butyl-4-(3,5-dimethylphenyl)-5-methoxy-2-methylindan-1-one as a brownish oil.

Anal. calc. for C$_{23}$H$_{28}$O$_2$: C, 82.10; H, 8.39. Found: C, 82.39; H, 8.52.

$^1$H NMR (CDCl$_3$): δ 7.73 (s, 1H), 7.02 (s, 1H), 7.01 (s, 2H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz, 1H), 2.36 (s, 6H), 1.42 (s, 9H), 1.25 (d, J=7.5 Hz, 3H). $^{13}$C{$^1$H} NMR (CDCl$_3$): δ 208.90, 163.50, 152.90, 143.32, 138.08, 136.26, 132.68, 130.84, 129.08, 127.18, 121.30, 60.52, 42.17, 35.37, 34.34, 30.52, 21.38, 16.40.

5-tert-Butyl-7-(3,5-dimethylphenyl)-6-methoxy-2-methyl-1H-indene

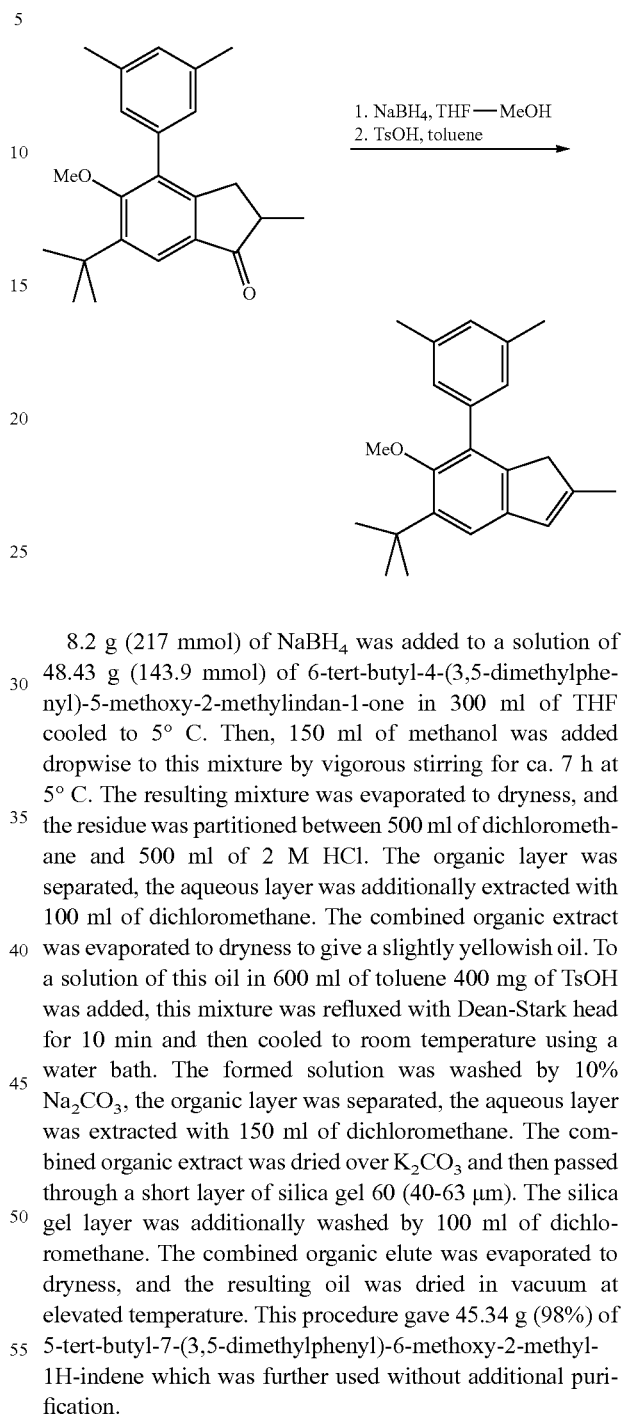

8.2 g (217 mmol) of NaBH$_4$ was added to a solution of 48.43 g (143.9 mmol) of 6-tert-butyl-4-(3,5-dimethylphenyl)-5-methoxy-2-methylindan-1-one in 300 ml of THF cooled to 5° C. Then, 150 ml of methanol was added dropwise to this mixture by vigorous stirring for ca. 7 h at 5° C. The resulting mixture was evaporated to dryness, and the residue was partitioned between 500 ml of dichloromethane and 500 ml of 2 M HCl. The organic layer was separated, the aqueous layer was additionally extracted with 100 ml of dichloromethane. The combined organic extract was evaporated to dryness to give a slightly yellowish oil. To a solution of this oil in 600 ml of toluene 400 mg of TsOH was added, this mixture was refluxed with Dean-Stark head for 10 min and then cooled to room temperature using a water bath. The formed solution was washed by 10% Na$_2$CO$_3$, the organic layer was separated, the aqueous layer was extracted with 150 ml of dichloromethane. The combined organic extract was dried over K$_2$CO$_3$ and then passed through a short layer of silica gel 60 (40-63 μm). The silica gel layer was additionally washed by 100 ml of dichloromethane. The combined organic elute was evaporated to dryness, and the resulting oil was dried in vacuum at elevated temperature. This procedure gave 45.34 g (98%) of 5-tert-butyl-7-(3,5-dimethylphenyl)-6-methoxy-2-methyl-1H-indene which was further used without additional purification.

Anal. calc. for C$_{23}$H$_{28}$O: C, 86.20; H, 8.81. Found: C, 86.29; H, 9.07.

$^1$H NMR (CDCl$_3$): δ 7.20 (s, 1H), 7.08 (br.s, 2H), 6.98 (br.s, 1H), 6.42 (m, 1H), 3.25 (s, 3H), 3.11 (s, 2H), 2.36 (s, 6H), 2.06 (s, 3H), 1.43 (s, 9H). $^{13}$C{$^1$H} NMR (CDCl$_3$): δ 154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

61

Bis[6-tert-butyl-4-(3,5-dimethylphenyl)-5-methoxy-2-methyl-1H-inden-1-yl]dimethylsilane

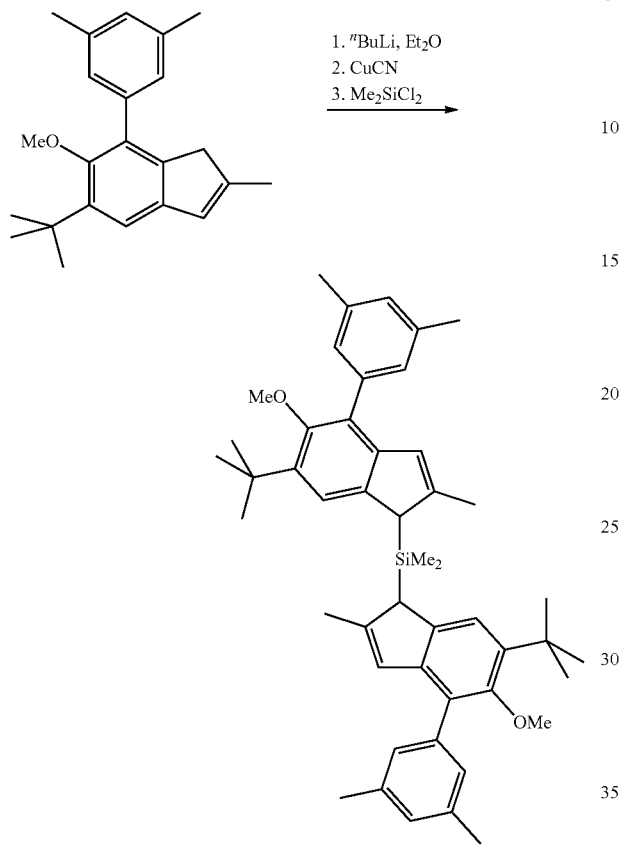

28.0 ml (70 mmol) of 2.5 M $^n$BuLi in hexanes was added in one portion to a solution of 22.36 g (69.77 mmol) of 5-tert-butyl-7-(3,5-dimethylphenyl)-6-methoxy-2-methyl-1H-indene in 350 ml of ether at −50° C. This mixture was stirred overnight at room temperature, then the resulting orange solution with a large amount of yellow precipitate was cooled to −60° C. (at this temperature the precipitate almost completely disappeared), and 400 mg of CuCN was added. The resulting mixture was stirred for 30 min at −25° C., and then 4.51 g (34.95 mmol) of dichlorodimethylsilane was added in one portion. This mixture was stirred overnight at room temperature, then filtered through a pad of silica gel 60 (40-63 μm) which was additionally washed by 2×50 ml of dichloromethane. The combined filtrate was evaporated under reduced pressure, and the residue was dried in vacuum at elevated temperature. This procedure gave 24.1 g (99%) of bis[6-tert-butyl-4-(3,5-dimethylphenyl)-5-methoxy-2-methyl-1H-inden-1-yl]dimethylsilane (>90% purity by NMR, approx. 3:1 mixture of stereoisomers) as a yellowish glass which was further used without additional purification.

$^1$H NMR (CDCl$_3$): δ 7.49, 7.32, 7.23, 7.11, 6.99 (5s, sum 8H), 6.44 and 6.43 (2s, sum 2H), 3.67, 3.55 (2s, sum 2H), 3.27, 3.26 (2s, sum 6H), 2.38 (s, 12H), 2.13 (s, 6H), 1.43 (s, 18H), −0.13, −0.18, −0.24 (3s, sum 6H). $^{13}$C{$^1$H} NMR (CDCl$_3$): δ 155.29, 147.57, 147.23, 143.63, 139.37, 139.26, 138.19, 137.51, 137.03, 128.24, 127.90, 127.47, 126.01, 125.89, 120.53, 120.34, 60.51, 47.35, 47.16, 35.14, 31.28, 31.20, 21.44, 17.94, 17.79, −4.84, −4.89, −5.84.

62

Rac-dimethylsilanediyl-bis[2-methyl-4-(3,5-dimethylphenyl)-5-methoxy-6-tert-butyl-inden-1-yl]zirconium dichloride (IE2)

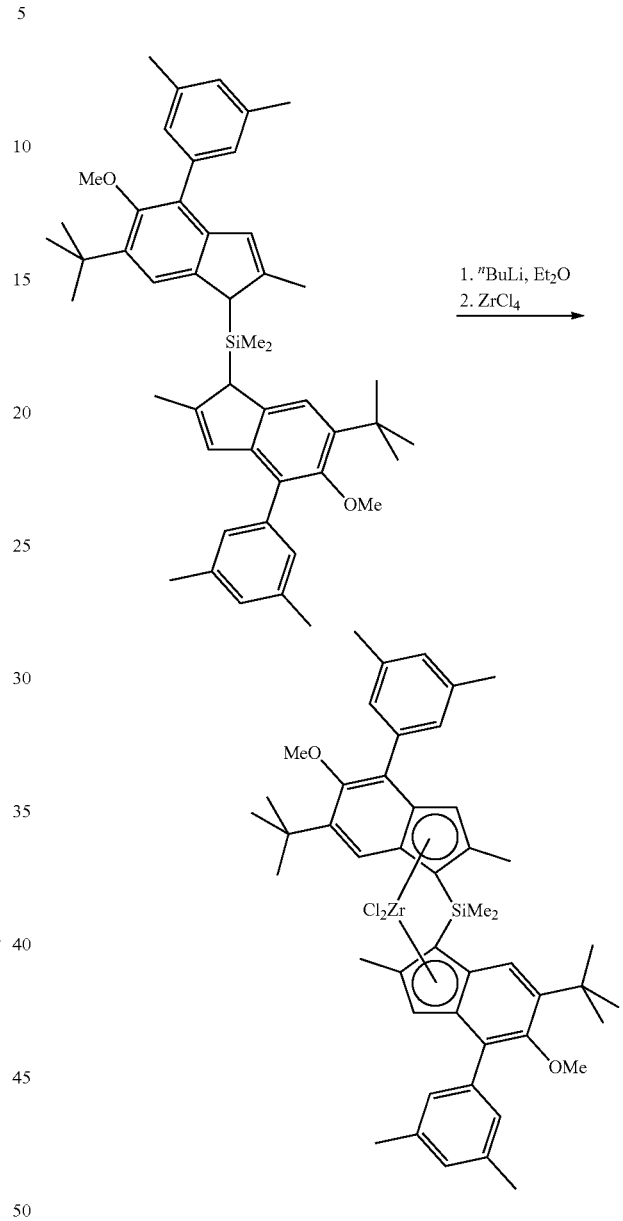

27.7 ml (69.3 mmol) of 2.5 M $^n$BuLi in hexanes was added in one portion to a solution of 24.1 g (34.53 mmol) of bis[6-tert-butyl-4-(3,5-dimethylphenyl)-5-methoxy-2-methyl-1H-inden-1-yl]dimethylsilane (prepared above) in 350 ml of diethyl ether cooled to −50° C. This mixture was stirred overnight at room temperature, then the resulting yellow solution with a large amount of yellow precipitate was cooled to −50° C., and 8.05 g (34.54 mmol) of ZrCl$_4$ was added. The reaction mixture was stirred for 24 h at room temperature to give a reddish-orange solution containing some precipitate. This mixture was evaporated to dryness. The residue was heated with 200 ml of toluene, and the formed suspension was filtered while hot through a glass frit (G4). The filtrate was evaporated to 70 ml, and then 50 ml of hexane was added. Crystals precipitated from this solution overnight at room temperature were collected, washed with 25 ml of hexane, and dried in vacuo. This procedure gave 4.01 g of pure rac-zirconocene. The mother liquor was evaporated to ca. 50 ml, and 50 ml of hexane was added. Orange crystals precipitated from this solution overnight at room temperature were collected and then dried in vacuum. This procedure gave 2.98 g of rac-zirconocene. Again, the mother liquor was evaporated almost to dryness, and 50 ml of hexane was added. Orange crystals precipitated from this solution overnight at −30° C. were collected and dried in vacuum. This procedure gave 3.14 g of rac-zirconocene. Thus, the total yield of rac-zirconocene isolated in this synthesis was 10.13 g (34%).

Rac-IC2

Anal. calc. for $C_{48}H_{58}Cl_2O_2SiZr$: C, 67.26; H, 6.82. Found: C, 67.42; H, 6.99.

$^1$H NMR (CDCl$_3$): δ 7.49 (s, 1H), 7.23 (very br.s, 2H), 6.96 (s, 1H), 6.57 (s, 1H), 3.44 (s, 3H), 2.35 (s, 6H), 2.15 (s, 3H), 1.38 (s, 9H), 1.27 (s, 3H). $^{13}$C{$^1$H} NMR (CDCl$_3$): δ 159.78, 144.04, 137.87, 136.85, 134.89, 133.86, 128.85, 127.39, 127.05, 122.91, 121.18, 120.80, 81.85, 62.66, 35.76, 30.38, 21.48, 18.35, 2.41.

Catalyst Preparation Examples

MAO was purchased from Chemtura and used as a 30 wt-% solution in toluene. As surfactants were used perfluoroalkylethyl acrylate esters (CAS number 65605-70-1) purchased from the Cytonix corporation, dried over activated molecular sieves (2 times) and degassed by argon bubbling prior to use (S1) or 1H,1H-Perfluoro(2-methyl-3-oxahexan-1-ol) (CAS 26537-88-2) purchased from Unimatec, dried over activated molecular sieves (2 times) and degassed by argon bubbling prior to use (S2).

Hexadecafluoro-1,3-dimethylyclohexane (PFC) (CAS number 335-27-3) was obtained from commercial sources and dried over activated molecular sieves (2 times) and degassed by argon bubbling prior to use. Propylene is provided by Borealis and adequately purified before use. Triethylaluminum was purchased from Crompton and used in pure form. Hydrogen is provided by AGA and purified before use.

All the chemicals and chemical reactions were handled under an inert gas atmosphere using Schlenk and glovebox techniques, with oven-dried glassware, syringes, needles or cannulas Comparative Catalyst 1

Inside the glovebox, 80.0 μl of dry and degassed surfactant S1 were mixed with 2 mL of MAO in a septum bottle and left to react overnight. The following day, 58.7 mg of CC1 (0,076 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining red catalyst was dried during 2 hours at 50° C. over an argon flow. 0.52 g of a red free flowing powder was obtained.

Comparative Catalyst 2

Inside the glovebox, 85.6 mg of dry and degassed surfactant S2 were mixed with 2 mL of 30 wt % Chemtura MAO in a septum bottle and left to react overnight. The following day, 44.2 mg of Metalloene CC2 (0,051 mmol, 1 equivalent) were dissolved with 4 mL of the 30 wt.-% Chemtura MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.75 g of a red free flowing powder was obtained.

Comparative Catalyst 3

Inside the glovebox, 72.0 mg of dry and degassed surfactant S2 were mixed with 2 mL of 30 wt.-% Chemtura MAO in a septum bottle and left to react overnight. The following day, 39.8 mg of Metalloene D65 (0,051 mmol, 1 equivalent) were dissolved with 4 mL of the 30 wt.-% Chemtura MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.72 g of a red free flowing powder was obtained Comparative Catalyst 4

Inside the glovebox, 85.9 mg of dry and degassed surfactant S2 were mixed with 2 mL of 30 wt % Chemtura MAO in a septum bottle and left to react overnight. The following day, 43.9 mg of Metalloene CC4 (0,051 mmol, 1 equivalent) were dissolved with 4 mL of the 30 wt.-% Chemtura MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.62 g of a red free flowing powder was obtained.

Comparative Catalyst 5

Inside the glovebox, 86.8 mg of dry and degassed surfactant S2 were mixed with 2 mL of 30 wt % Chemtura MAO in a septum bottle and left to react overnight. The following day, 41.1 mg of Metalloene D69 (0,051 mmol, 1 equivalent) were dissolved with 4 mL of the 30 wt.-% Chemtura MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.54 g of a red free flowing powder was obtained.

Comparative Catalyst 6

Inside the glovebox, 54 µL of dry and degassed surfactant (Si) were mixed with 2 mL of MAO in a septum bottle and left to react overnight. The following day, 30.7 mg of MC-B (0.038 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.74 g of a red solid catalyst was obtained.

Catalyst 1a for Inventive Examples

Inside the glovebox, 86.4 mg of dry and degassed Surfactant S2 were mixed with 2 mL of 30 wt % Chemtura MAO in a septum bottle and left to react overnight. The following day, 69.3 mg of metallocene IC1 (0,076 mmol, 1 equivalent) were dissolved with 4 mL of the 30 wt.-% Chemtura MAO solution in another septum bottle and left under stirring inside the glovebox.

After 60 minutes, 1 mL of the MAO/surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.75 g of a red free flowing powder was obtained.

Catalyst 1b for Inventive Examples

Inside the glovebox, surfactant solution (29.5 mg of dry and degassed surfactant (S2) dilute in 0.2 mL toluene) was added dropwise to 5 mL of 30 wt % Chemtura MAO. The solutions were left under stirring for 10 minutes. Then, MAO/surfactant was added to 46.2 mg of metallocene IC1 and left under stirring in the glovebox After 60 minutes stirring, the surfactant-MAO-metallocene solution were added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.53 g of a red free flowing powder was obtained.

Catalyst 2a for Inventive Examples

Inside the glovebox, 86.2 mg of dry and degassed surfactant (S2) were mixed with 2 mL of 30 wt % Chemtura MAO in a septum bottle and left to react overnight. The following day, 65.1 mg of metallocene IC2 (0,076 mmol, 1 equivalent) were dissolved with 4 mL of the 30 wt % Chemtura MAO solution in another septum bottle and left under stirring inside the glovebox.

After 60 minutes, 1 mL of the MAO/surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.79 g of a red free flowing powder was obtained.

Catalyst 2b for Inventive Examples

Inside the glovebox, surfactant solution (28.8 mg of dry and degassed surfactant (S2) dilute in 0.2 mL toluene) was added dropwise to 5 mL of 30 wt.-% Chemtura MAO. The solutions were left under stirring for 10 minutes. Then, MAO/surfactant was added to 43.4 mg of metallocene IC2 and left under stirring in the glovebox.

After 60 minutes stirring, the surfactant-MAO-metallocene solution were added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.62 g of a red free flowing powder was obtained.

Off-Line Prepolymerization Procedure

Off-line prepolymerized catalysts were off-line prepolymerized according to the following procedure:

The catalysts were pre-polymerized according to the following procedure: Off-line prepolymerization experiment was done in a 125 mL pressure reactor equipped with gas-feeding lines and an overhead stirrer. Dry and degassed perfluoro-1.3-dimethylcyclohexane (15 cm$^3$) and the desired amount of the catalyst to be pre-polymerized were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerization was reached. The reaction was stopped by flashing the volatile components. Inside glove box, the reactor was opened and the content poured into a glass vessel. The perfluoro-1,3-dimethylcyclohexane was evaporated until a constant weight was obtained to yield the pre-polymerized catalyst.

TABLE 1

Off-line prepolymerization.

| Example | Metallocene | Catalyst amount (mg) | Yield (g) |
|---|---|---|---|
| Comparative Catalyst 1 | CC1 | 801.7 | 3.5889 |
| Comparative Catalyst 2 | CC2 | 400.3 | 1.8622 |
| Comparative Catalyst 3 | CC3 | 399.5 | 1.7488 |
| Comparative Catalyst 4 | CC4 | 399.5 | 1.8154 |
| Comparative Catalyst 5 | CC5 | 402.0 | 1.6670 |
| Comparative Catalyst 6 | CC6 | 665.6 | 2.4783 |
| Catalyst 1a for Inventive Example | IC1 | 402.7 | 1.8258 |
| Catalyst 1b for Inventive Example | IC1 | 405.3 | 1.7807 |
| Catalyst 2a for Inventive Example | IC2 | 408.5 | 1.7145 |
| Catalyst 2b for Inventive Example | IC2 | 429.5 | 1.9143 |

Polymerization Examples

The polymers have been produced in a 20-L reactor following three different procedures, as summarized in 2.

TABLE 2

Polymerization procedures

| | | bulk | | | GP1 | | | | GP2 | | | |
|---|---|---|---|---|---|---|---|---|---|---|---|---|
| procedure | steps | T °C. | H2 NL | Time min | P barg | T °C. | Time min | H2 NL | P barg | T °C. | Time min | H2 NL |
| 1 | 3 | 80 | 1.5 | 40 | 24 | 80 | 60 | 1.2 | 20 | 70 | 90 | 0 |
| 2 | 3 | 80 | 1.5 | 40 | 24 | 80 | 40 | 1.6 | 20 | 70 | 90-120 | 0 |
| 3 | 3 | 80 | 2.0 | 40 | 24 | 80 | 40 | 2.0 | 20 | 70 | 90 | 0 |

NL Normal liters

The details of the polymerization procedures are described in the following:

Step 1: Prepolymerization and Bulk Homopolymerization

A 20 L stainless-steel reactor containing 0.4 barg propylene was filled with 3950 g propylene. Triethylaluminum (0.80 ml of a 0.62 mol/l solution in heptane) was injected into the reactor by additional 240 g propylene. The solution was stirred at 20° C. and 250 rpm for at least 20 min. The catalyst was injected as described in the following. The desired amount of solid, prepolymerized catalyst was loaded into a 5 ml stainless steel vial inside a glovebox and a second 5 ml vial containing 4 ml n-heptane pressurized with 10 bars of nitrogen was added on top of the first vial. This catalyst feeder system was mounted on a port on top of the autoclave. The valve between the two vials was opened and the solid catalyst was contacted with heptane under nitrogen pressure for 2 s, then flushed into the reactor with 240 g propylene. The prepolymerization was run for 10 min. At the end of the prepolymerization step the temperature was raised to 80° C. When the internal reactor temperature has reached 71° C., 1.5 NL (procedures 1 and 2) or 2.0 NL of H2 (procedure 3) was added via mass flow controller in one minute. The reactor temperature was held constant at 80° C. throughout the polymerization. The polymerization time was measured starting when the internal reactor temperature reached 2° C. below the set polymerization temperature.

Step 2: Gas Phase Homopolymerization

After the bulk step was completed, the stirrer speed was reduced to 50 rpm and the pressure was reduced to 23 bar-g by venting the monomer. Afterwards the stirrer speed was set to 180 rpm, the reactor temperature to 80° C. and the pressure to 24 bar-g. Hydrogen (1.2 NL in procedure 1 or 1.6 NL in procedure 2 or 2.0 NL in procedure 3) was added via flow controller in one minute (2 minutes for the 2.0 NL H2 experiments). During the gas phase homopolymerization, both pressure and temperature have been held constant via mass flow controller (feeding propylene) and thermostat for 60 minutes.

Step 3: Gas Phase Ethylene-Propylene Copolymerization

After the gas phase homopolymerization step was completed, the stirrer speed was reduced to 50 rpm and the pressure was reduced down to 0.3 bar-g by venting the monomers. Then triethylaluminum (0.80 ml of a 0.62 mol/l solution in heptane) was injected into the reactor by additional 250 g propylene through a steel vial. The pressure was then again reduced down to 0.3 bar-g by venting the monomers. The stirrer speed was set to 180 rpm and the reactor temperature was set to 70° C. Then the reactor pressure was increased to 20 bar-g by feeding a C3/C2 gas mixture (C2/C3=0.56 wt/wt for all experiments except fro experiments R1-17-019 and R1-17-020 in which the ratio was 0.46). The temperature was held constant by thermostat and the pressure was held constant by feeding via mass flow controller a C3/C2 gas mixture of composition corresponding to the target polymer composition and, until the set time for this step had expired.

Then the reactor was cooled down to about 30° C. and the volatile components flashed out. After flushing the reactor 3 times with N2 and one vacuum/N2 cycle, the product was taken out and dried overnight in a fume hood. 100 g of the polymer is additivated with 0.5 wt % Irganox B225 (solution in acetone) and dried overnight in a hood followed by 2 hours in a vacuum drying oven at 60° C.

The polymerization results are shown in Tables 3-6

Table 3 shows the higher activity and higher iV(E) of the inventive metallocenes IC1 (Catalyst 1b for Inventive Examples IC1b) and IC2 (Catalyst 2b for Inventive Examples IC2b) compared to metallocenes of the prior art.

TABLE 3 three-step polymerizations according to procedure 1

| Example | CE1 | CE2 | CE3 | CE4 | CE5 | IE1 | IE2 |
|---|---|---|---|---|---|---|---|
| Metallocene | CC1 | CC2 | CC3 | CC4 | CC5 | IC1b | IC2b |
| $iV_{whole}$ (dL/g) | n.m. | 2.4 | 2.0 | 2.1 | 2.3 | 2.7 | 2.7 |
| $iV_{Matrix}$ (dL/g) | n.m. | 2.5 | 2.0 | 2.0 | 2.3 | 2.6 | 2.6 |
| Mw/Mn matrix from GPC | n.m. | 4.1 | 4.2 | 5.5 | 5.3 | 5.1 | 4.9 |
| Overall productivity $kg/g_{cat,unprepolymerized}$ | 33 | 34 | 42 | 16 | 29 | 57 | 63 |
| Overall productivity $kg/g_{metallocene}$ | 640 | 1030 | 1350 | 500 | 1030 | 1520 | 1740 |
| GP EPR activity $kg/g_{cat,unprepolymerized}$ | 3.4 | 3.4 | 6.8 | 3.3 | 5.0 | 3.7 | 6.6 |
| Split bulk-GP1-GP2 calculated from MFC | 41-30-29 | 50-35-15 | 43-32-25 | 34-35-31 | 38-36-26 | 52-38-10 | 46-39-15 |
| XS (wt %) | 28 | 17 | 28 | 31 | 26 | 10 | 16 |
| C2(XS) (wt %) | 21.6 | 21.4 | 20.6 | 20.9 | 20.6 | 21.4 | 20.5 |
| $iV_E$ (dL/g) | 1.8 | 1.6 | 1.9 | 2.1 | 2.4 | 3.6 | 3.2 |
| Mw of XS | n.m. | 146000 | 192000 | 240000 | 258000 | 446000 | 364000 |
| Mw/Mn of XS | n.m. | 2.7 | 2.4 | 3.6 | 2.9 | 2.9 | 2.8 |

CE = comparison example;
IE = inventive example;
n.m. = not measured
$iV_{whole}$ = iV of the heterophasic propylene copolymer
$iV_E$ = iV of the elastomeric propylene-ethylene copolymer (E)
MFC = mass flow controller Table 4 shows that, at similar C2 content of 16-18 wt %, the inventive metallocenes IC1 (Catalyst 1b for Inventive Examples IC1b) and IC2 (Catalyst 2b for Inventive Examples IC2b) produce higher iV(E) compared to metallocene CC6 (compare IE3 and IE5 to CE6). The results in Table 4 show also that catalysts with lower metallocene loading (i.e. higher Al/Zr ratio) have higher productivity and give slightly higher iV(E) (compare IE1 to IE4).

TABLE 4 three-step polymerizations according to procedure 1

| Example | CE6 | IE3 | IE1 | IE4 | IE5 | IE2 |
|---|---|---|---|---|---|---|
| Metallocene | CC6 | IC1b | IC1b | IC1a | IC2b | IC2b |
| Al/Zr mol/mol | 620 | 400 | 400 | 280 | 400 | 400 |
| $iV_{whole}$ (dL/g) | 3.2 | 3.0 | 2.7 | 2.7 | 3.1 | 2.7 |
| $iV_{Matrix}$ (dL/g) | 3.2 | 2.9 | 2.6 | 2.5 | 3.0 | 2.6 |
| Mw/Mn matrix from GPC | n.m. | 4.4 | 5.1 | 5.3 | n.m. | 4.9 |

TABLE 4-continued three-step polymerizations according to procedure 1

| Example | CE6 | IE3 | IE1 | IE4 | IE5 | IE2 |
|---|---|---|---|---|---|---|
| Overall productivity kg/g$_{cat,unprepolymerized}$ | 49 | 65 | 57 | 49 | 68 | 63 |
| Overall productivity kg/g$_{metallocene}$ | 2250 | 1710 | 1510 | 937 | 1860 | 1740 |
| GP EPR activity kg/g$_{cat,unprepolymerized}$ | 2.2 | 6.6 | 3.7 | 6.3 | 10.4 | 6.6 |
| Split bulk-GP1-GP2 calculated from MFC | 68-26-7 | 48-37-15 | 52-38-10 | 50-31-19 | 43-34-23 | 46-39-15 |
| XS (wt %) | 9 | 14 | 10 | 25 | 20 | 16 |
| C2(XS) (wt %) | 18.0 | 17.2 | 21.4 | 21.9 | 16.3 | 20.5 |
| iV$_E$ (dL/g) | 3.0 | 3.7 | 3.6 | 3.4 | 3.4 | 3.2 |
| Mw of XS | 362000 | 485000 | 446000 | 358000 | 420000 | 364000 |
| Mw/Mn of XS | 2.6 | 3.1 | 2.9 | 3.5 | 2.7 | 2.8 |

CE = comparison example;
IE = inventive example;
n.m. = not measured
IC1a = Catalyst 1a for Inventive Examples
IC1b = Catalyst 1b for Inventive Examples
IC2b = Catalyst 2b for Inventive Examples
iV$_{whole}$ = iV of the heterophasic propylene copolymer
iV$_E$ = iV of the elastomeric propylene-ethylene copolymer (E)
MFC = mass flow controller The data shown in Table 5 further confirms the above results, also for materials having matrix with broader Mw/Mn.

TABLE 5

Three-step polymerizations according to procedure 2

| | Example | | | | |
|---|---|---|---|---|---|
| | CE7 | CE8 | IE6 | IE7 | IE8 |
| Metallocene | CC2 | CC5 | IC1a | IC1b | IC2b |
| Al/Zr | 420 | 480 | 280 | 400 | 400 |
| iV$_{whole}$ (dL/g) | 2.3 | 2.4 | 2.9 | 2.8 | 3.2 |
| iV$_{Matrix}$ (dL/g) | 2.5 | 2.3 | 2.5 | 2.6 | 3.2 |
| Mw/Mn matrix from GPC | 4.5 | 6.5 | 6.1 | 5.5 | 6.1 |
| Overall productivity kg/g$_{cat,\ unprepolymerized}$ | 31 | 23 | 57 | 60 | 53 |
| Overall productivity kg/g$_{metallocene}$ | 960 | 830 | 1090 | 1580 | 1460 |
| GP EPR activity kg/g$_{cat,\ unprepolymerized}$ | 4.2 | 3.3 | 13.2 | 7.9 | 6.4 |
| Split bulk-GP1-GP2 calculated from MFC | 50-30-20 | 50-29-21 | 41-24-35 | 51-29-20 | 53-29-18 |
| XS (wt %) | 24 | 24 | 37 | 22 | 19 |
| C2(XS) (wt %) | 21.5 | 22.3 | 20.6 | 20.5 | 20.9 |
| IV$_E$ (dL/g) | 1.7 | 2.3 | 3.4 | 3.6 | 3.1 |
| Mw of XS | 144000 | 247000 | 406000 | 466000 | 368000 |
| Mw/Mn of XS | 2.6 | 3.0 | 3.2 | 3.0 | 2.8 |

CE = comparison example;
IE = inventive example;
n.m. = not measured
IC1a = Catalyst 1a for Inventive Examples
IC1b = Catalyst 1b for Inventive Examples
IC2b = Catalyst 2b for Inventive Examples
iV$_{whole}$ = iV of the heterophasic propylene copolymer
iV$_E$ = iV of the elastomeric propylene-ethylene copolymer (E)
MFC = mass flow controller The data shown in Table 6 further confirms the above results, also for materials having matrix with lower molecular weight and for rubber phase (elastomeric propylene-ethylene copolymer (E)) of higher C2 content.

TABLE 6

Three-step polymerizations according to procedure 3

| Example | CE9 | CE10 | IE9 | IE10 | IE11 | IE12 |
|---|---|---|---|---|---|---|
| Metallocene | CC2 | CC5 | IC1b | | IC2b | |
| Al/Zr | 420 | 480 | 400 | | 400 | |
| $iV_{whole}$ (dL/g) | 1.7 | 1.9 | 2.7 | 2.5 | 2.7 | 2.6 |
| $iV_{Matrix}$ (dL/g) | 1.7 | 1.8 | 2.4 | 2.3 | 2.5 | 2.5 |
| Mw/Mn matrix from GPC | 4.8 | 6.5 | 5.8 | 5.6 | 5.9 | 5.8 |
| Overall productivity $kg/g_{cat,unprepolymerized}$ | 29 | 22 | 59 | 53 | 60 | 51 |
| Overall productivity $kg/g_{metallocene}$ | 870 | 790 | 1560 | 1400 | 1650 | 1410 |
| GP EPR activity $kg/g_{cat,unprepolymerized}$ | 5.6 | 4 | 10 | 4.2 | 8.9 | 4.6 |
| Split bulk-GP1-GP2 calculated from MFC | 46-24-30 | 44-29-27 | 47-27-26 | 56-32-12 | 50-28-22 | 55-32-14 |
| XS (wt %) | 33 | 29 | 25 | 12 | 25 | 13 |
| C2(XS) wt % | 21.0 | 20.6 | 19.8 | 51.7 | 20.9 | 48.4 |
| $iV_E$ (dL/g) | 1.6 | 2.3 | 3.6 | 3.4 | 3.2 | 3.1 |
| Mw of XS | 176000 | 263000 | 461000 | 340000 | 390000 | 301000 |
| Mw/Mn of XS | 2.5 | 2.9 | 3.0 | 3.1 | 2.7 | 2.7 |

IC1b = Catalyst 1b for Inventive Examples
IC2b = Catalyst 2b for Inventive Examples
$iV_{whole}$ = iV of the heterophasic propylene copolymer
$iV_E$ = iV of the elastomeric propylene-ethylene copolymer (E)

The results clearly show that the catalysts IC1 and IC2 produce heterophasic copolymers having the rubber phase with a higher molecular weight than the heterophasic copolymers produced under similar conditions with the comparison catalysts CC1 to CC6.

The advantage of the 5-methoxy, 6-tert-butyl substitution on both indenes is clearly shown by comparing the iV(E) of the heterophasic copolymers obtained with IC1 and IC2 to those obtained with the comparison metallocene catalysts.

In addition, the advantage of having the 5-methoxy, 6-tert-butyl substitution on both indenes and substituents on the 4-phenyl ring is clearly shown by comparing the iV(E) of the heterophasic copolymers obtained with IC1 and IC2 to that obtained with CC6.

Among the catalysts used for the process according to the present invention, it was found that a higher Al/Zr ratio, that is a lower metallocene loading, leads unexpectedly to both higher catalyst activity and higher metallocene activity.

The catalysts of the invention have also a significantly higher overall productivity compared to the comparison catalysts.

The invention claimed is:

1. A process for the preparation of a heterophasic propylene copolymer, the process comprising: preparing the heterophasic propylene copolymer in the presence of a single site catalyst comprising:

(i) a complex of formula (I):

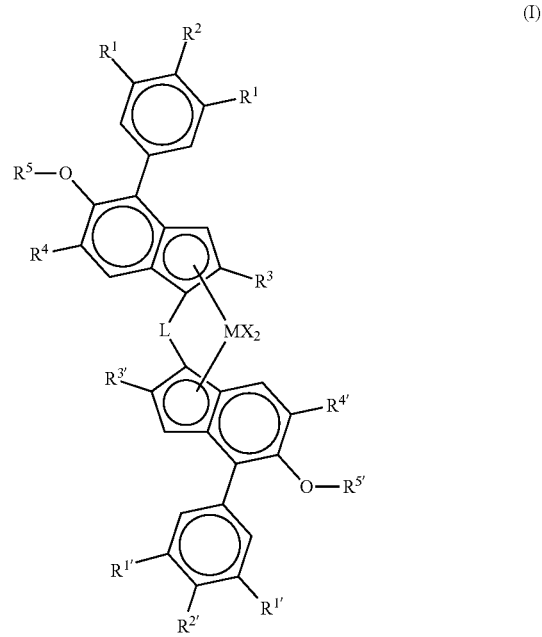

(I)

wherein
M is zirconium or hafnium;
each X independently is a sigma-donor ligand
L is a divalent bridge selected from —R'$_2$C—, —R'$_2$C—CR'$_2$—, —R'$_2$Si—, —R'$_2$Si—SiR'$_2$—, or —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring;
$R^1$ and $R^{1'}$ are each independently hydrogen, $C_5$-$C_{10}$-aryl or a group —CH(R$^x$)$_2$ wherein each R$^x$ is independently H or a $C_{1-10}$ hydrocarbyl group, and optionally the two R$^x$ taken together can form a ring, $R^2$ and $R^{2'}$ are each independently hydrogen, $C_5$-$C_{10}$-aryl or a group —$C(R^y)_3$ wherein each $R^y$ is independently H or a $C_{1-10}$ hydrocarbyl group, or optionally two or three $R^y$ groups taken together can form a ring, whereby at least one of $R^1$ or $R^2$ and one of $R^{1'}$ or $R^{2'}$ is different from hydrogen, and whereby $R^2$ together with one of $R^1$, as well as $R^{2'}$ together with one of $R^{1'}$ may be part of a further mono- or multicyclic ring condensed to the phenyl ring, $R^3$ and $R^{3'}$ are each independently a linear $C_1$ to $C_6$ hydrocarbyl group or a branched or cyclic $C_4$ to $C_{10}$ hydrocarbyl group, whereby the groups are not branched in α-position, $R^4$ and $R^{4'}$ are each independently a tertiary $C_4$ to $C_{10}$ hydrocarbyl group, $R^5$ and $R^{5'}$ are each independently a linear or branched $C_1$ to $C_{10}$ alkyl group or an $C_5$-$C_{10}$-aryl group, and (ii) a cocatalyst comprising a compound of a group 13 metal, the heterophasic propylene copolymer comprising:

(a-1) a matrix (M) that is a polypropylene homopolymer or propylene-ethylene random copolymer, and (a-2) an elastomeric propylene-ethylene copolymer (E) dispersed in said matrix (M), wherein the elastomeric propylene-ethylene copolymer (E) has:

(i) an intrinsic viscosity (IV) determined according to DIN ISO 1628/1 (in decalin at 135° C. in a range of from 3.1 to 8.0 dl/g, (ii) an ethylene comonomer content in a range of from 10.0 to 80.0 wt %, (iii) optionally a second comonomer selected from 1-butene in an amount of from 0.0 to up to 20.0 wt % or 1-hexene in an amount of from 0.0 up to 10.0 wt %, and (iv) a xylene soluble (XS) fraction (determined according to ISO 16152 at 25° C.) of at least 50.0 wt %, and wherein a xylene soluble fraction (determined according to ISO 16152 at 25° C.) of the heterophasic propylene copolymer is in a range of from 5.0 to 50.0 wt %.

2. The process according to claim 1, wherein in the formula (I) each X is independently a hydrogen atom, a halogen atom, $C_{1-6}$ alkoxy group, $C_{1-6}$ alkyl, phenyl or benzyl group.

3. The process according to claim 1, wherein in the formula (I) L is dimethylsilyl, methylcyclohexylsilyl (Me-Si-cyclohexyl), ethylene or methylene.

4. The process according to claim 1, wherein in the formula (I):

$R^3$ and $R^{3'}$ are the same and are linear $C_1$ to $C_4$ alkyl group, and $R^4$ and $R^{4'}$ are each independently a tertiary $C_4$ to $C_6$ alkyl group.

5. The process according to claim 1, wherein in the formula (I):

M is zirconium,

X is independently a halogen atom, $C_{1-4}$ alkoxy group, $C_{1-4}$ alkyl, phenyl or benzyl group, L is dimethylsilyl, $R^1$ and $R^{1'}$ are the same and are hydrogen or a group —$CH_2R^x$ wherein $R^x$ is either H or a $C_{1-3}$ alkyl group, $R^2$ and $R^{2'}$ are the same and are hydrogen or a group —$C(R^y)_3$ wherein $R^y$ is either H or a $C_{1-3}$ alkyl group, whereby either $R^1$ and $R^{1'}$ or $R^2$ and $R^{2'}$ are hydrogen, $R^3$ and $R^{3'}$ are the same and are a linear $C_1$ to $C_4$ hydrocarbyl group, $R^4$ and $R^{4'}$ are each a tert-butyl group, and $R^5$ and $R^{5'}$ are each a linear $C_1$ to $C_4$ alkyl group.

6. The process according to claim 1, wherein the complex of formula (I) is rac-Me$_2$Si(2-Me-4-(3,5-Me$_2$Ph)-5-OMe-6-tBu-Ind)$_2$ZrCl$_2$ or rac-Me$_2$Si(2-Me-4-(4-tBu-Ph)-5-OMe-6-tBu-Ind)$_2$ZrCl$_2$.

7. The process according to claim 1, wherein the cocatalyst is an aluminoxane cocatalyst.

8. The process according to claim 7, wherein in the formula (I) M is Zr and a ratio of Al/Zr is from 150 to 1000 mol/mol.

9. The process according to claim 1, wherein the single site catalyst is in solid particulate form free from an external carrier.

10. The process according to claim 9, wherein the single site catalyst is prepared by forming a liquid/liquid emulsion system, which comprises a solution of components (i) and (ii) dispersed in a solvent so as to form dispersed droplets, and solidifying said dispersed droplets to form solid particles.

11. The process according to claim 1, wherein the heterophasic copolymer is prepared in a multistage process comprising at least two reactors connected in series including at least one gas phase polymerization step.

12. The process according to claim 1, wherein the matrix (M) of the heterophasic polypropylene copolymer is a polypropylene homopolymer with a molecular weight distribution (MWD; $M_w/M_n$ as measured with GPC) in a range of from 2.5 to 7.0.

13. The process according to claim 1 further comprising:

(A) polymerizing propylene and optionally ethylene in at least a first reactor and optionally a second reactor to form a polypropylene homopolymer or a propylene-ethylene random copolymer, said polypropylene homopolymer or propylene-ethylene random copolymer forming the matrix (M), and (B) polymerizing propylene and ethylene in a gas phase reactor in the presence of the polypropylene homopolymer or propylene-ethylene random copolymer prepared in step (A) to form an elastomeric propylene-ethylene copolymer (E).

14. The process according to claim 13, further comprising:

(a) polymerizing in a first reactor propylene and optionally ethylene to obtain a first polypropylene homopolymer or propylene-ethylene random copolymer fraction (R-PP1), (b) transferring said first polypropylene homopolymer or propylene-ethylene random copolymer fraction (R-PP1) into a second reactor, (c) polymerizing in said second reactor in the presence of the first polypropylene homopolymer or propylene-ethylene random copolymer fraction (R-PP1) propylene and optionally ethylene to obtain a second polypropylene homopolymer or propylene-ethylene random copolymer fraction (R-PP2), wherein said first polypropylene homopolymer or propylene-ethylene random copolymer fraction (R-PP1) and said second polypropylene homopolymer or propylene-ethylene random copolymer fraction (R-PP2) form the matrix (M), (d) transferring said matrix (M) into a third reactor, wherein said third reactor is a gas phase reactor, (e) polymerizing in said third reactor in the presence of the matrix (M) propylene, and ethylene to obtain an elastomeric propylene-ethylene copolymer (E), wherein said matrix (M) and said elastomeric propylene-ethylene copolymer (E) form the heterophasic propylene copolymer.

\* \* \* \* \*